(12) United States Patent
Perez et al.

(10) Patent No.: US 11,460,822 B2
(45) Date of Patent: Oct. 4, 2022

(54) SELF PERTURBING EXTREMUM-SEEKING CONTROL SYSTEM

(71) Applicant: Johnson Controls Technology Company, Auburn Hills, MI (US)

(72) Inventors: Carlos Felipe Alcala Perez, Milwaukee, WI (US); Timothy I. Salsbury, Mequon, WI (US); John M. House, Saint-Leonard (CA)

(73) Assignee: Johnson Controls Tyco IP Holdings LLP, Milwaukee, WI (US)

(*) Notice: Subject to any disclaimer, the term of this patent is extended or adjusted under 35 U.S.C. 154(b) by 119 days.

(21) Appl. No.: 16/711,080

(22) Filed: Dec. 11, 2019

(65) Prior Publication Data
US 2021/0181703 A1 Jun. 17, 2021

(51) Int. Cl.
*G05B 19/05* (2006.01)
*F24F 11/30* (2018.01)
*F24F 11/63* (2018.01)

(52) U.S. Cl.
CPC ............ *G05B 19/054* (2013.01); *F24F 11/30* (2018.01); *F24F 11/63* (2018.01); *G05B 19/058* (2013.01); *G05B 2219/2614* (2013.01)

(58) Field of Classification Search
CPC ............... G05B 19/054; G05B 19/058; G05B 2219/2614; F24F 11/63; F24F 11/30
See application file for complete search history.

(56) References Cited

U.S. PATENT DOCUMENTS

2015/0277444 A1* 10/2015 Burns .................. G06F 11/079 700/282
2018/0299839 A1* 10/2018 Salsbury ............ G05B 13/0255

FOREIGN PATENT DOCUMENTS

CN 106447136 A * 2/2017

OTHER PUBLICATIONS

Olalla et al. Analysis and Comparison of Extremum Seeking Control Techniques, Jun. 2007, pp. 1-6 (Year: 2007).*
Kumar et al. Extremum Seeking Control for Multi-Objective Optimization Problems, Dec. 2016, pp. 1-7 (Year: 2016).*
Fu et al. Variable Structure Extremum Seeking Control Based on Sliding Mode Gradient Estimation for a Class of Nonlinear Systems, Jun. 2009, pp. 1-6 (Year: 2009).*

* cited by examiner

*Primary Examiner* — Chad G Erdman
(74) *Attorney, Agent, or Firm* — Foley & Lardner LLP

(57) ABSTRACT

A self-perturbing extremum-seeking controller for a plant that includes at least a static portion includes a processing circuit. The processing circuit is configured to obtain a value of a performance variable characterizing a performance of the plant. The processing circuit is configured to determine a sign of a gradient of the performance variable with respect to an input to the static portion of the plant. The processing circuit is configured to adjust a control input for the plant using the sign of the gradient, and provide the control input to the plant to affect the performance variable.

19 Claims, 30 Drawing Sheets

SELF PERTURBING EXTREMUM-SEEKING CONTROL SYSTEM

BACKGROUND

The present disclosure relates generally to control systems for an HVAC system. More particularly, the present disclosure relates to extremum-seeking control for an HVAC system.

Extremum-seeking control (ESC) is a class of self-optimizing control strategies that can dynamically search for the unknown and/or time-varying inputs of a system for optimizing a certain performance index. It can be considered a dynamic realization of gradient searching through the use of dither signals. The gradient of the system output with respect to the system input is typically obtained by slightly perturbing the system operation and applying a demodulation measure. Optimization of system performance can be obtained by driving the gradient towards zero by using an integrator in the closed-loop system. ESC is a non-model based control strategy, meaning that a model for the controlled system is not necessary for ESC to optimize the system.

ESC has been used in many different engineering applications (e.g., combustion, circuitry, mining, aerospace and land-based vehicles, building HVAC, wind and solar energy, etc.) and has been shown to be able to improve the operational efficiency and performance for these engineering applications. A variety of different types of ESC have been developed including dither ESC, switching ESC, sliding-mode ESC, adaptive ESC, among others. Each type of ESC has its respective advantages and disadvantages. Each of these approaches to ESC is implemented to drive a gradient of a control system to zero.

Typical ESC controllers operate by finding a gradient of a performance variable with respect to a manipulated variable associated with different building equipment configurations and constantly updating the manipulated variable until the gradient is driven to zero. The controllers generally update the configurations of pieces of building equipment before determining the gradient of associated performance variables.

SUMMARY

One implementation of the present disclosure is a self-perturbing extremum-seeking controller for a plant having at least a static portion, according to some embodiments. In some embodiments, the controller includes a processing circuit configured to obtain a value of a performance variable characterizing a performance of the plant. In some embodiments, the processing circuit is configured to determine a sign of a gradient of the performance variable with respect to an input to the static portion of the plant. In some embodiments, the processing circuit is configured to adjust a control input for the plant using the sign of the gradient, and provide the control input to the plant to affect the performance variable.

In some embodiments, the plant is a dynamic plant including the static portion and a dynamic portion. In some embodiments, the input to the static portion of the plant is an output of the dynamic portion of the plant.

In some embodiments, the processing circuit is configured to determine a gradient of the performance variable with respect to time using one or more values of the performance variable. In some embodiments, the processing circuit is configured to estimate a gradient of the output of the dynamic portion of the plant with respect to time using a model of the dynamic portion of the plant. In some embodiments, the processing circuit is configured to determine the gradient of the performance variable with respect to the input to the static portion based on the gradient of the performance variable with respect to time and the gradient of the output of the dynamic portion with respect to time.

In some embodiments, the processing circuit is configured to mitigate an effect of the dynamic portion of the plant on the performance variable by holding the sign of the gradient at a positive state or a negative state until an amount of time has elapsed since the sign of the gradient last switched between the positive state and the negative state.

In some embodiments, the plant is a static plant and the input to the static portion is the control input provided by the controller.

In some embodiments, the processing circuit is configured to determine a gradient of the performance variable with respect to time using one or more values of the performance variable. In some embodiments, the processing circuit is configured to determine a gradient of the control input with respect to time, and determine the gradient of the performance variable with respect to the input to the static portion based on the gradient of the performance variable with respect to time and the gradient of the control input with respect to time.

In some embodiments, the processing circuit is configured to adjust a rate at which the performance variable moves toward a minimum or maximum of the performance variable by applying an adjustable gain parameter to the gradient.

In some embodiments, the processing circuit is configured to adjust at least one of a magnitude or frequency of oscillations of the performance by applying an adjustable gain parameter to the gradient.

Another implementation of the present disclosure is a self-perturbing extremum-seeking controller for a plant, according to some embodiments. In some embodiments, the controller includes a processing circuit configured to determine a gradient of a performance variable characterizing a performance of the plant using one or more values of the performance variable. In some embodiments, the processing circuit is configured to apply the gradient of the performance variable as an input to a relay that switches an output of the relay between a positive state and a negative state based on a sign of the gradient. In some embodiments, the processing circuit is configured to adjust a control input for the plant using the output of the relay, and provide the control input to the plant to affect the performance variable.

In some embodiments, the output of the relay is a discontinuous signal with respect to time that switches between the positive state and the negative state.

In some embodiments, the gradient of the performance variable is a time gradient indicating a rate of change of the performance variable with respect to time.

In some embodiments, the gradient of the performance variable is a gradient of the performance variable with respect to the control input to the plant.

In some embodiments, the plant includes a static portion and a dynamic portion. In some embodiments. In some embodiments, the processing circuit is configured to mitigate an effect of the dynamic portion of the plant on the performance variable by holding the output of the relay at the positive state or the negative state until a predetermined amount of time has elapsed since the output of the relay last switched between the positive state and the negative state.

In some embodiments, the processing circuit is configured to adjust a rate at which the performance variable moves toward a minimum or maximum of the performance variable by applying an adjustable gain parameter to the output of the relay.

In some embodiments, the processing circuit is configured to adjust at least one of a magnitude or frequency of oscillations of the performance variable by applying an adjustable gain parameter to the output of the relay.

Another implementation of the present disclosure is a method for adaptively perturbing a control input for a plant in an extremum-seeking control system, according to some embodiments. In some embodiments, the method includes determining a rate of change of a performance variable that characterizes a performance of the plant using one or more values of the performance variable. In some embodiments, the method also includes estimating a gradient of the performance variable with respect to a control input to the plant using the rate of change of the performance variable and an adaptive gain parameter indicating a rate of change of the control input to the plant. In some embodiments, the method includes adjusting the adaptive gain parameter using the gradient of the performance variable with respect to the control input to the plant. In some embodiments, the method includes perturbing the control input to the plant using the adjusted adaptive gain parameter and a sign of the gradient of the performance variable with respect to the control input to the plant.

In some embodiments, the method further includes normalizing the gradient relative to a range of the performance variable. The normalized gradient may be used to adjust the adaptive gain parameter.

In some embodiments, adjusting the adaptive gain parameter includes reducing a magnitude of the adaptive gain parameter as the performance variable approaches a minima or maxima of the performance variable.

In some embodiments, adjusting the adaptive gain parameter includes reducing a rate of convergence of the performance variable toward a minima or maxima of the performance variable as the performance variable approaches the minima or maxima and decreases a magnitude of oscillations of the performance variable about the minima or maxima.

In some embodiments, adjusting the adaptive gain parameter includes calculating a new value of the adaptive gain parameter using a current value of the adaptive gain parameter, the rate of change of the performance variable, and a non-adaptive gain parameter.

DETAILED DESCRIPTION

Overview

Figure 1:
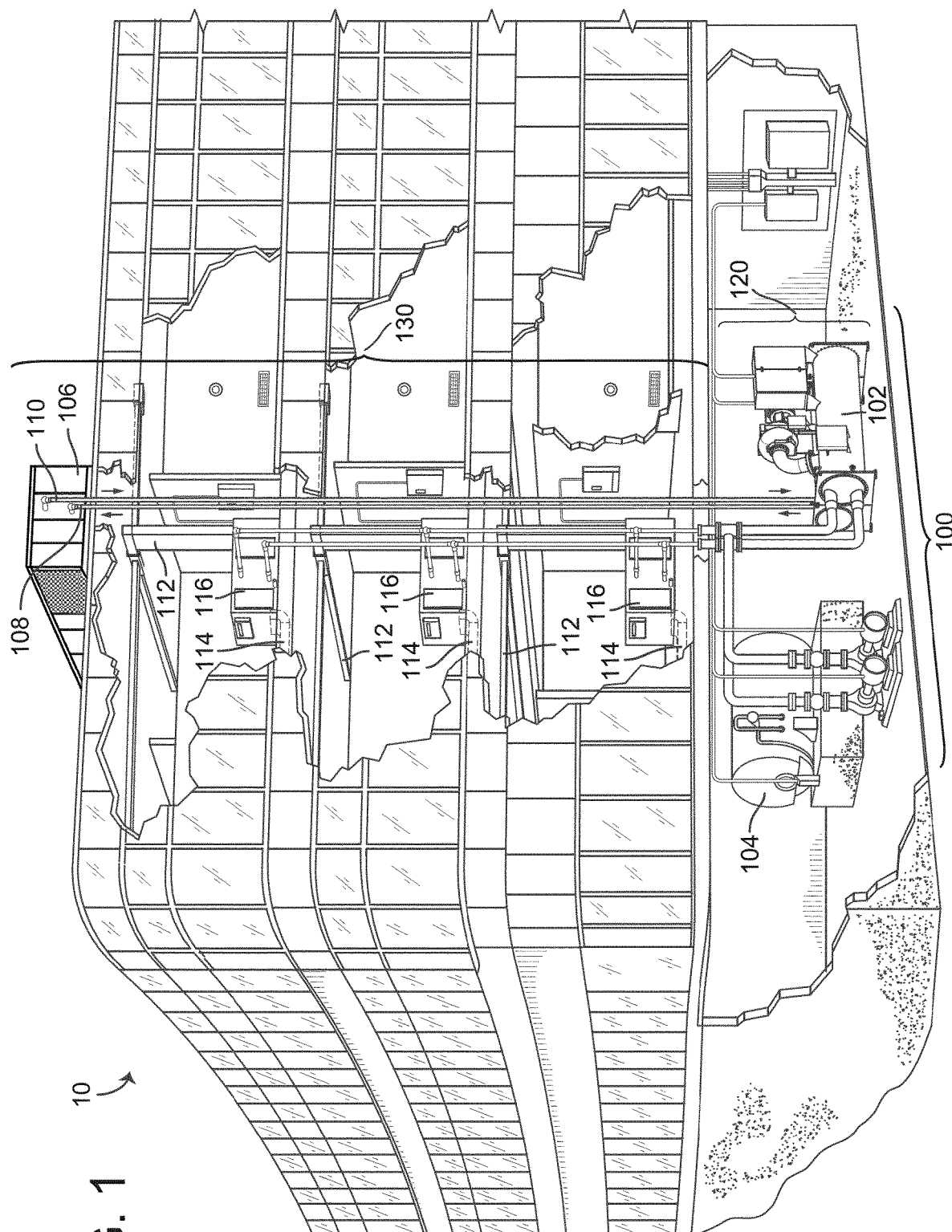
FIG. 1 is a drawing of a building equipped with a HVAC system, according to some embodiments.

Referring generally to the FIGURES, a self-perturbing extremum-seeking control (ESC) system includes a plant, and an extremum-seeking controller. The extremum-seeking controller is configured to generate an input for the plant so that equipment of the plant operates to affect an environmental condition of a conditioned space (e.g., a room, a zone, an area, etc.). The plant may be a static plant (e.g., represented by a static linearity) or may be a dynamic plant including a static portion and a dynamic portion. The extremum-seeking controller may be configured to obtain values of a performance variable (e.g., a cost or output variable) that characterizes a performance of the plant and may obtain a gradient (e.g., a time derivative) of the performance variable or output of the plant.

In some embodiments, the extremum-seeking controller uses a model of the dynamic portion of the plant to estimate the effect of the dynamic portion of the plant. The effect of the dynamic portion of the plant may be represented as a predicted output of the dynamic portion of the plant, which is provided as an input to the static portion of the plant. The extremum-seeking controller can determine a gradient (e.g., a time derivative) of the predicted output of the dynamic portion of the plant and can use this gradient in combination with the gradient of the performance variable to determine a gradient of the performance variable with respect to the predicted output of the dynamic portion of the plant. For example, the time-gradient of the performance variable can be divided by the time-gradient of the predicted output of the dynamic portion of the plant to calculate the gradient of the performance variable with respect to the output of the dynamic portion of the plant.

The extremum-seeking controller can use a filter to identify a sign (e.g., positive or negative) of the gradient of the performance variable with respect to the output of the dynamic portion of the plant. The sign of the gradient may be represented by $\varepsilon \in \{-1, 1\}$, which means that the sign of the gradient $\varepsilon$ is equal to 1 of the gradient is positive or $-1$ of the gradient is negative. Advantageously, the sign of the gradient can be used to perturb the control input for the plant without requiring a separate dither signal. The extremum-seeking controller may use the sign of the gradient to calculate an amount by which the control input for the plant should be adjusted. For example, the extremum-seeking controller may apply the sign of the gradient to a gain parameter k, which will result in a value of k if the gradient is positive or a value of $-k$ if the gradient is negative. The gain parameter k may be a fixed parameter or can by adaptively adjusted as described in greater detail below. The calculated value k or $-k$ represents an amount by which the control input to the plant should be adjusted. The extremum-seeking controller may adjust the control input by adding the calculated value k or $-k$ to the previous value of the control input (e.g., using an integrator block) to generate an adjusted control input for the plant.

Building HVAC Systems and Building Management Systems

Figure 2:
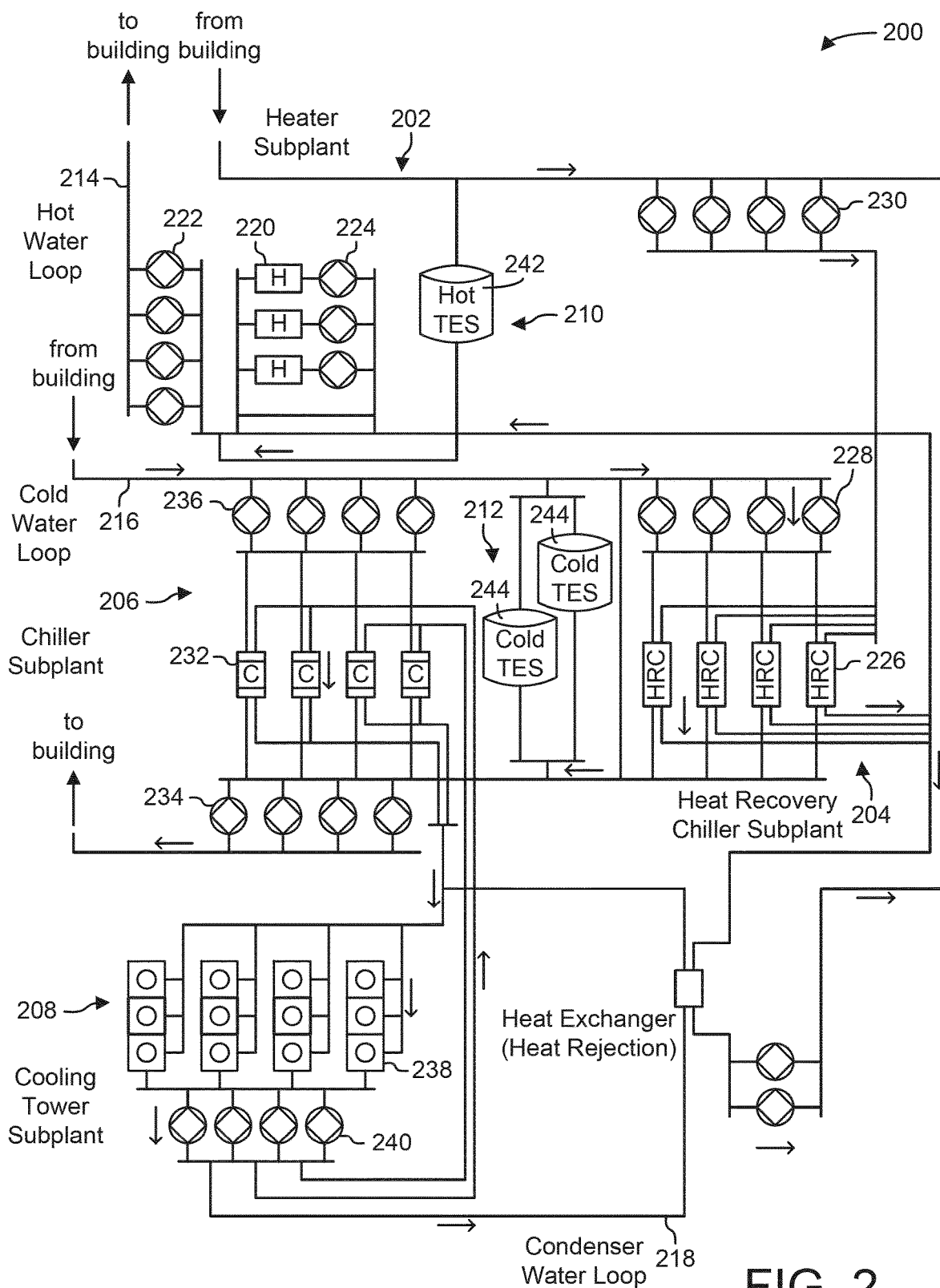
FIG. 2 is a block diagram of a waterside system which can be used to serve the building of FIG. 1, according to some embodiments.
Figure 3:
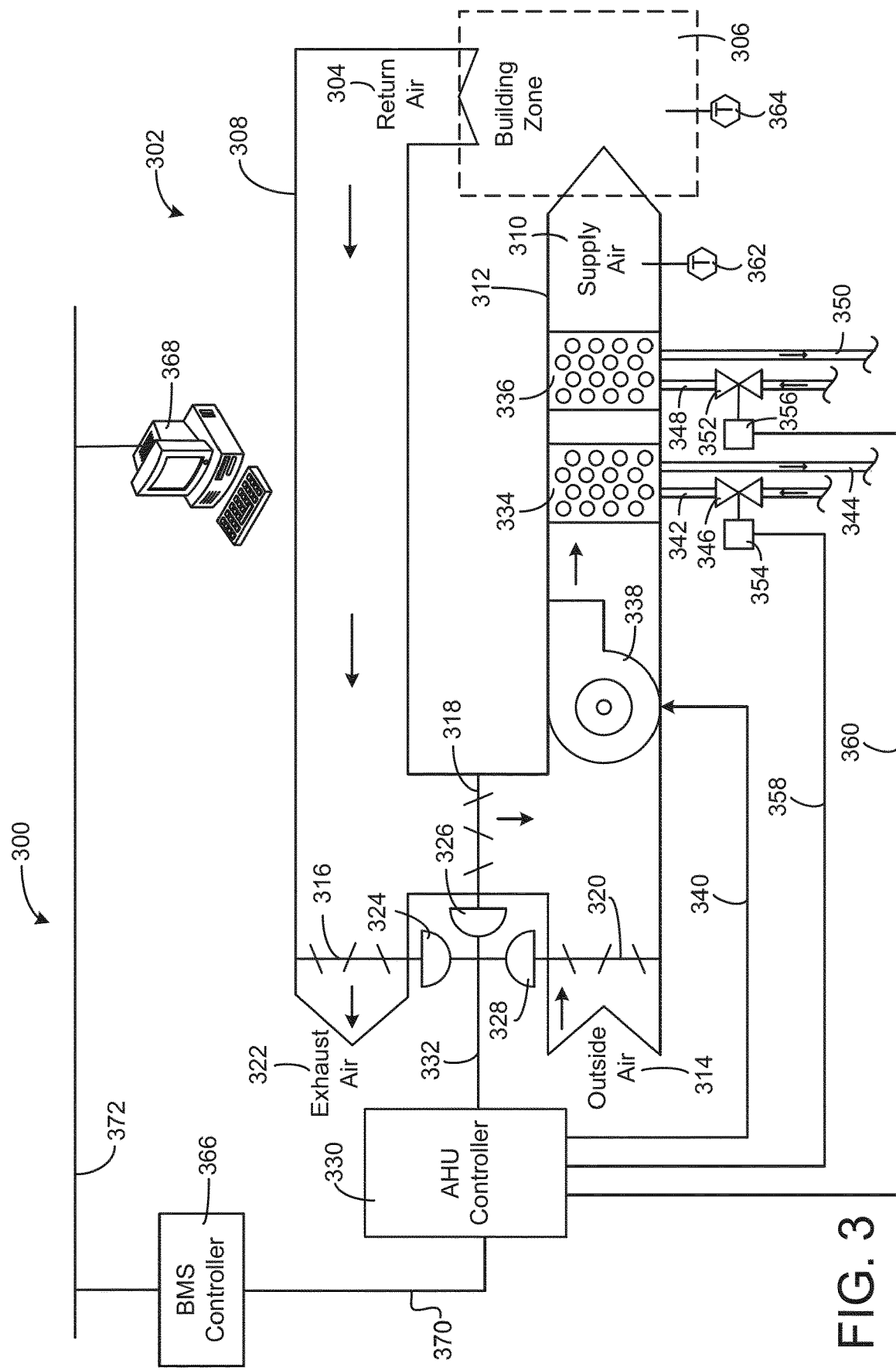
FIG. 3 is a block diagram of an airside system which can be used to serve the building of FIG. 1, according to some embodiments.
Figure 4:
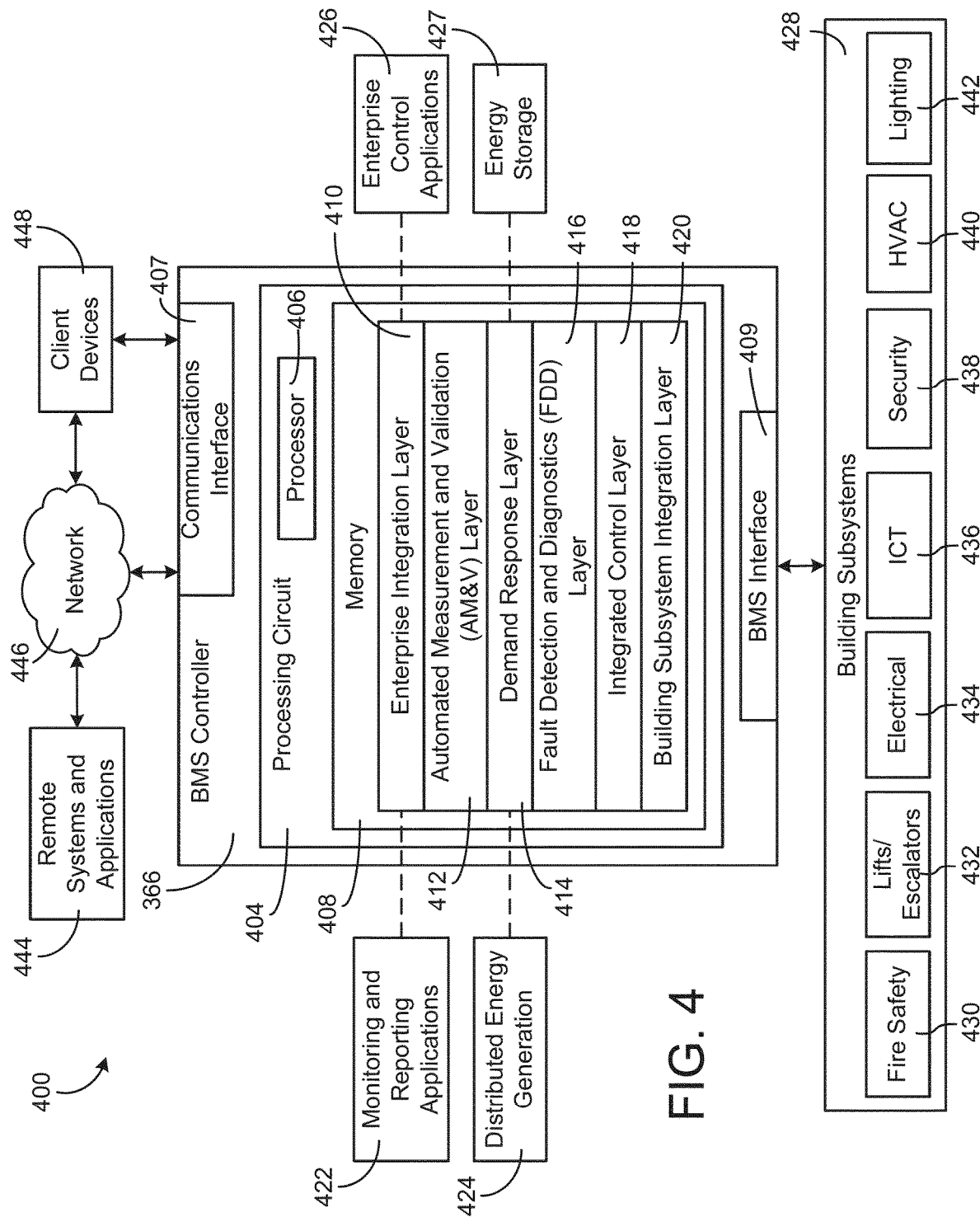
FIG. 4 is a block diagram of a building management system (BMS) which can be used to monitor and control the building of FIG. 1, according to some embodiments.
Figure 5:
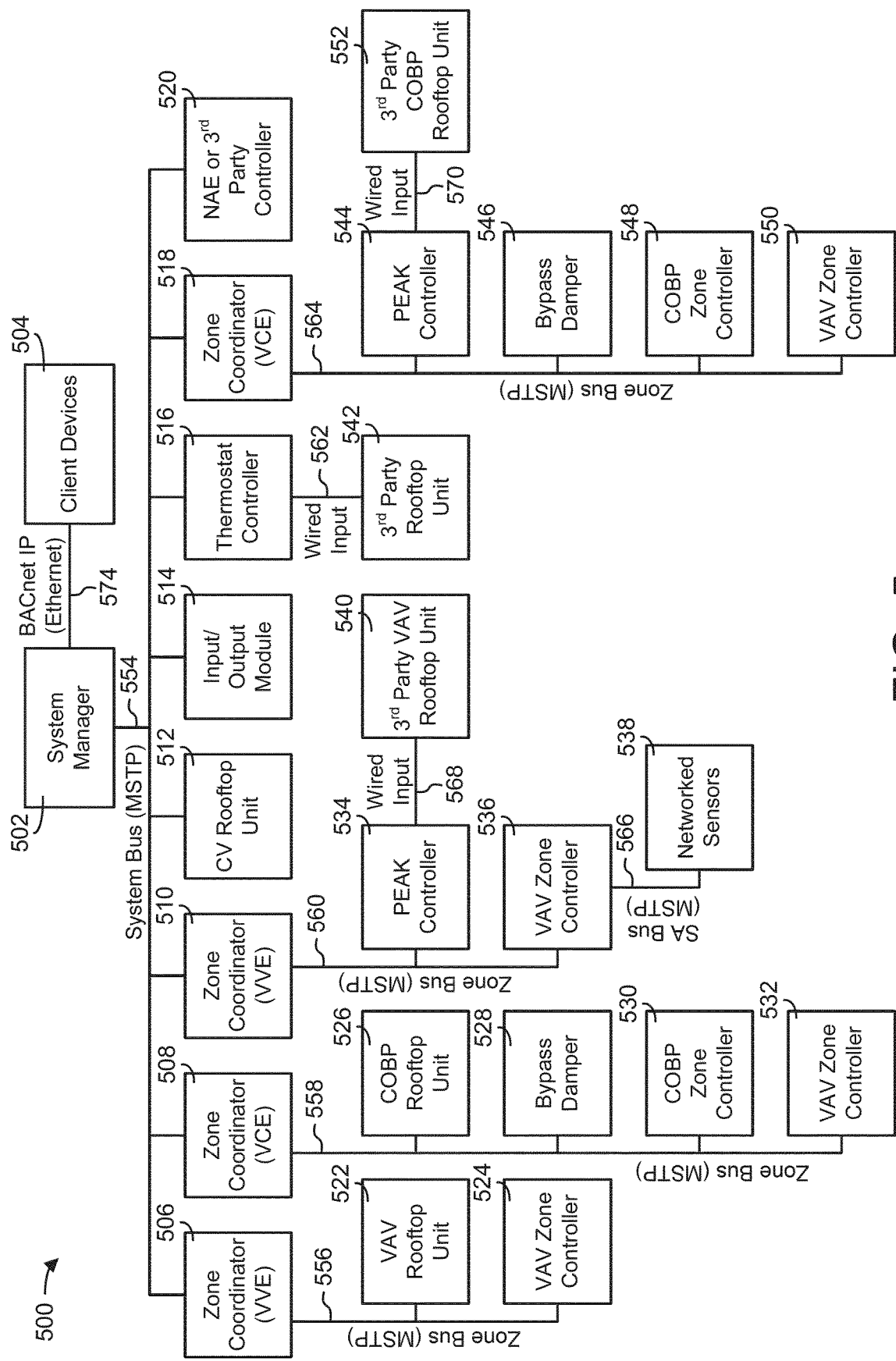
FIG. 5 is a block diagram of another BMS which can be used to monitor and control the building of FIG. 1, according to some embodiments.

Referring now to FIGS. 1-5, several building management systems (BMS) and HVAC systems in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10. FIG. 4 is a block diagram of a BMS which can be used to monitor and control building 10. FIG. 5 is a block diagram of another BMS which can be used to monitor and control building 10.

Building and HVAC System

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, ESC algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG.

3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Building Management Systems

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels.

For example, building subsystems 428 may generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Referring now to FIG. 5, a block diagram of another building management system (BMS) 500 is shown, according to some embodiments. BMS 500 can be used to monitor and control the devices of HVAC system 100, waterside system 200, airside system 300, building subsystems 428, as well as other types of BMS devices (e.g., lighting equipment, security equipment, etc.) and/or HVAC equipment.

BMS 500 provides a system architecture that facilitates automatic equipment discovery and equipment model distribution. Equipment discovery can occur on multiple levels of BMS 500 across multiple different communications busses (e.g., a system bus 554, zone buses 556-560 and 564, sensor/actuator bus 566, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 500 can begin interacting with the new device (e.g., sending control signals, using data from the device) without user interaction.

Some devices in BMS 500 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 500 store their own equipment models. Other devices in BMS 500 have equipment models stored externally (e.g., within other devices). For example, a zone coordinator 508 can store the equipment model for a bypass damper 528. In some embodiments, zone coordinator 508 automatically creates the equipment model for bypass damper 528 or other devices on zone bus 558. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 5, BMS 500 is shown to include a system manager 502; several zone coordinators 506, 508, 510 and 518; and several zone controllers 524, 530, 532, 536, 548, and 550. System manager 502 can monitor data points in BMS 500 and report monitored variables to various monitoring and/or control applications. System manager 502 can communicate with client devices 504 (e.g., user devices, desktop computers, laptop computers, mobile devices, etc.) via a data communications link 574 (e.g., BACnet IP, Ethernet, wired or wireless communications, etc.). System manager 502 can provide a user interface to client devices 504 via data communications link 574. The user interface may allow users to monitor and/or control BMS 500 via client devices 504.

In some embodiments, system manager 502 is connected with zone coordinators 506-510 and 518 via a system bus 554. System manager 502 can be configured to communicate with zone coordinators 506-510 and 518 via system bus 554 using a master-slave token passing (MSTP) protocol or any other communications protocol. System bus 554 can also connect system manager 502 with other devices such as a constant volume (CV) rooftop unit (RTU) 512, an input/output module (IOM) 514, a thermostat controller 516 (e.g., a TEC5000 series thermostat controller), and a network automation engine (NAE) or third-party controller 520. RTU 512 can be configured to communicate directly with system manager 502 and can be connected directly to system bus 554. Other RTUs can communicate with system manager 502 via an intermediate device. For example, a wired input 562 can connect a third-party RTU 542 to thermostat controller 516, which connects to system bus 554.

System manager 502 can provide a user interface for any device containing an equipment model. Devices such as zone coordinators 506-510 and 518 and thermostat controller 516 can provide their equipment models to system manager 502 via system bus 554. In some embodiments, system manager 502 automatically creates equipment models for connected devices that do not contain an equipment model (e.g., IOM 514, third party controller 520, etc.). For example, system manager 502 can create an equipment model for any device that responds to a device tree request. The equipment models created by system manager 502 can be stored within system manager 502. System manager 502 can then provide a user interface for devices that do not contain their own equipment models using the equipment models created by system manager 502. In some embodiments, system manager 502 stores a view definition for each type of equipment connected via system bus 554 and uses the stored view definition to generate a user interface for the equipment.

Each zone coordinator 506-510 and 518 can be connected with one or more of zone controllers 524, 530-532, 536, and 548-550 via zone buses 556, 558, 560, and 564. Zone coordinators 506-510 and 518 can communicate with zone controllers 524, 530-532, 536, and 548-550 via zone busses 556-560 and 564 using a MSTP protocol or any other communications protocol. Zone busses 556-560 and 564 can also connect zone coordinators 506-510 and 518 with other types of devices such as variable air volume (VAV) RTUs 522 and 540, changeover bypass (COBP) RTUs 526 and 552, bypass dampers 528 and 546, and PEAK controllers 534 and 544.

Zone coordinators 506-510 and 518 can be configured to monitor and command various zoning systems. In some embodiments, each zone coordinator 506-510 and 518 monitors and commands a separate zoning system and is connected to the zoning system via a separate zone bus. For example, zone coordinator 506 can be connected to VAV RTU 522 and zone controller 524 via zone bus 556. Zone coordinator 508 can be connected to COBP RTU 526, bypass damper 528, COBP zone controller 530, and VAV zone controller 532 via zone bus 558. Zone coordinator 510 can be connected to PEAK controller 534 and VAV zone controller 536 via zone bus 560. Zone coordinator 518 can be connected to PEAK controller 544, bypass damper 546, COBP zone controller 548, and VAV zone controller 550 via zone bus 564.

A single model of zone coordinator 506-510 and 518 can be configured to handle multiple different types of zoning systems (e.g., a VAV zoning system, a COBP zoning system, etc.). Each zoning system can include a RTU, one or more zone controllers, and/or a bypass damper. For example, zone coordinators 506 and 510 are shown as Verasys VAV engines (VVEs) connected to VAV RTUs 522 and 540, respectively. Zone coordinator 506 is connected directly to VAV RTU 522 via zone bus 556, whereas zone coordinator 510 is connected to a third-party VAV RTU 540 via a wired input 568 provided to PEAK controller 534. Zone coordinators 508 and 518 are shown as Verasys COBP engines (VCEs) connected to COBP RTUs 526 and 552, respectively. Zone coordinator 508 is connected directly to COBP RTU 526 via zone bus 558, whereas zone coordinator 518 is connected to a third-party COBP RTU 552 via a wired input 570 provided to PEAK controller 544.

Zone controllers 524, 530-532, 536, and 548-550 can communicate with individual BMS devices (e.g., sensors, actuators, etc.) via sensor/actuator (SA) busses. For example, VAV zone controller 536 is shown connected to networked sensors 538 via SA bus 566. Zone controller 536 can communicate with networked sensors 538 using a MSTP protocol or any other communications protocol. Although only one SA bus 566 is shown in FIG. 5, it should be understood that each zone controller 524, 530-532, 536, and 548-550 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 524, 530-532, 536, and 548-550 can be configured to monitor and control a different building zone. Zone controllers 524, 530-532, 536, and 548-550 can use the inputs and outputs provided via their SA busses to monitor and control various building zones. For example, a zone controller 536 can use a temperature input received from networked sensors 538 via SA bus 566 (e.g., a measured temperature of a building zone) as feedback in a temperature control algorithm. Zone controllers 524, 530-532, 536, and 548-550 can use various types of control algorithms (e.g., state-based algorithms, extremum-seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

Self-Perturbing Extremum-Seeking Control System

Plant Input/Output

Figure 6A:
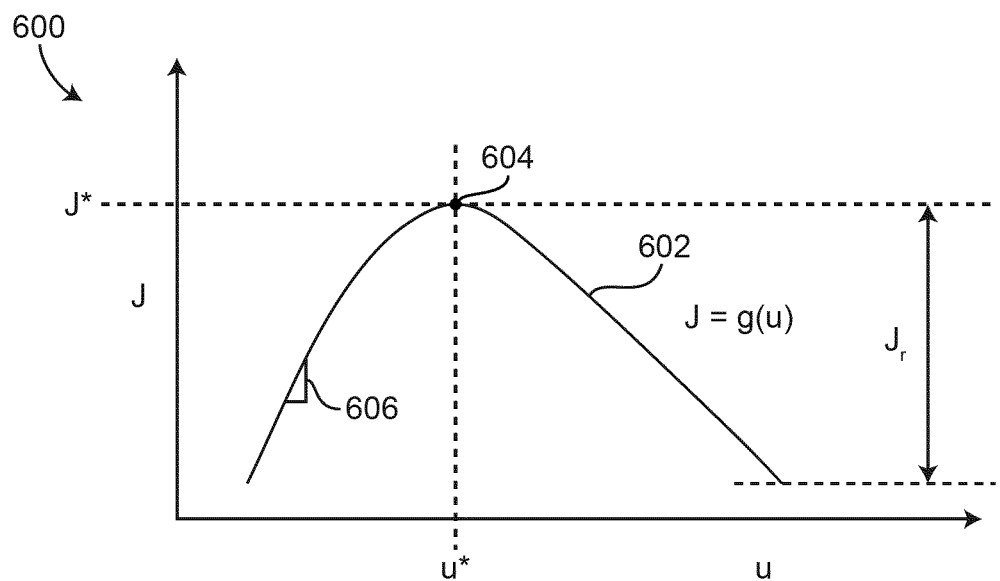
FIG. 6A is a graph of a static concave function, according to some embodiments.
Figure 6B:
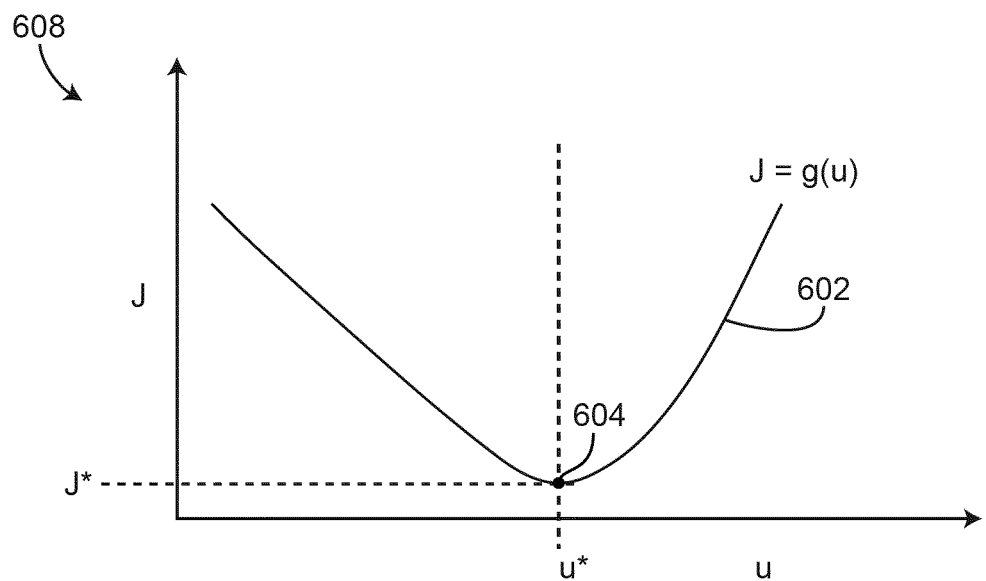
FIG. 6B is a graph of a static convex function, according to some embodiments.

Referring particularly to FIGS. 6A and 6B, graphs 600 and 608 shows an output J of a plant with respect to its control input, u, according to some embodiments. The Y-axis of graph 600 illustrates the cost or output or performance variable J of the plant, while the X-axis of graph 600 illustrates the control input u of the plant, according to some embodiments. The control input u may be a control signal for HVAC equipment or a setpoint for HVAC equipment (e.g., a temperature setpoint). The cost or output J of the plant may be power consumption, operating cost, efficiency, coefficient of performance, setpoint error, etc., or any other variable or parameter that characterizes the performance of a system including the plant that is sought to be maximized or minimized. Graph 600 includes a series 602 that shows an exemplary relationship between the output or cost J of the plant, and the control input u of the plant. As shown, series 602 may have a concave shape. In other embodiments, or for other plants, series 602 has a convex shape as shown in FIG. 6B. Since the relationship between the control input u of the plant and the output/cost J has a concave or convex shape, various extrema (e.g., local maxima and minima) can be found that minimize or maximize the cost J.

Graph 600 illustrates a single-control input (u), single-output (J) system that has a steady-state characteristic with a concave shape (or a convex shape). The objective of extremum-seeking control is to modulate the control input u to drive the output J to an extremum, shown as extremum point 604. Extremum point 604 is at an intersection between an optimal control input u* and an optimal output J*, according to some embodiments. The output J of the plant may be represented by the function:

$$J = g(u) \tag{1}$$

where g is a cost function (e.g., a transfer function) of the plant that relates the control input u to the output/cost/performance variable J.

Extremum-seeking control seeks to drive the control input/output (u,J) to extremum point 604 (e.g., such that u=u* and J=J*), according to some embodiments. In some embodiments, extremum-seeking control includes estimating a gradient 606 of the cost function g $$\left(\text{e.g., estimating } \frac{dJ}{du}\right)$$

and moving or adjusting the control input u in a direction that is proportional to a negative value of gradient 606 (e.g., if the plant exhibits a convex shape as shown in FIG. 6B) or in a direction that is proportional to a positive value of gradient 606 (e.g., if the plant exhibits a concave shape as shown in FIG. 6A). For example, the control input u for a future of subsequent timestep t+Δt can be determined using:

$$u(t + \Delta t) = u(t) - k \frac{dJ(t)}{du(t)} \tag{2}$$

where u(t+Δt) is a value of the control input u at a time t+Δt.

Figure 7:
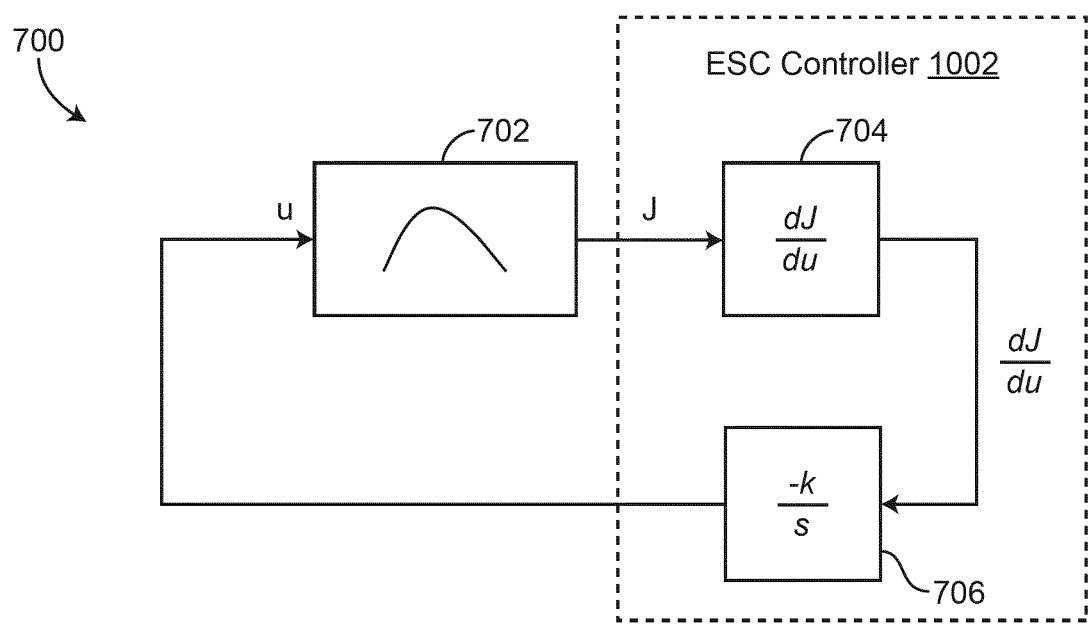
FIG. 7 is a block diagram of an extremum-seeking control system, according to some embodiments.

Referring now to FIG. 7, a single-input single-output extremum-seeking control system 700 includes a plant 702, a gradient block 704, and an integrator 706, according to some embodiments. In some embodiments, gradient block 704 and integrator 706 are components of ESC controller 1002 (described in greater detail below with reference to FIGS. 12A and 12B) and represent various functions of ESC controller 1002. Plant 702 receives the control input u and outputs the performance variable J. The performance variable J can be derived with respect to the input at gradient block 704 to determine $$\frac{dJ}{du}.$$

The gradient $$\frac{dJ}{du}$$

can be calculated by determining time derivatives of each of the control input u and the performance variable J. For example, applying the chain rule to $$\frac{dJ}{du}$$

yields:

$$\frac{dJ}{du} = \frac{dJ}{dt} \cdot \frac{dt}{du} \tag{3}$$

which can be rewritten as:

$$\frac{dJ}{du} = \frac{dJ}{dt} \div \frac{du}{dt} \tag{4}$$

according to some embodiments. In this way, if the time derivatives of the performance variable J and the control input u can be calculated, the gradient $$\frac{dJ}{du}$$

can also be calculated. The gradient $$\frac{dJ}{du}$$

may be integrated with a gain k (at integrator 706) and fed back to plant 702 as the control input u. In some embodiments, integrator 706 functions the same as or similar to integrator 812 as described in greater detail with reference to FIG. 8.

Typical ESC systems use a dither signal to perturb the control input u (e.g., using a sinusoidal dither signal). The dither signal is typically generated by a controller and added to the control input u to provide artificial or controlled oscillations in the control input. However, the systems and methods described herein do not require artificial generation of a dither signal, thereby simplifying the ESC system. Instead of using a separate dither signal, the systems and methods described herein utilize a sign of the gradient (e.g., the gradient of the output of the plant with respect to the control input of the plant, or the gradient of the output of the plant with respect to an effect that a dynamic portion of the plant has on an input). Additionally, the gradient of the output with respect to the control input for traditional ESC may be largely dependent upon a scale of the plant (e.g., a magnitude of the response of the plant) which may require normalization to account for variation in scale across different types of plants (thereby allowing the ESC to be applied across different plants). Advantageously, the systems and methods herein utilize the sign of the gradient, thereby providing an inherently normalized control input for the plant. This may reduce the need to adjust the ESC for different scale plants, or for normalization. In this way, the self-perturbing ESC systems and methods as described herein can be applied to any plant, regardless of a scale of the plant, without requiring artificial normalization and without requiring a dither signal.

In order to simplify the ESC, a sign of the gradient $$\frac{dJ}{du}$$

(i.e., whether the gradient is positive or negative) can be used as the feedback. Using the sign of the gradient $$\frac{dJ}{du}$$

eliminates scale from the ESC such that the ESC algorithm can be used without requiring knowledge of the range of the performance variable J. For example, using the sign of the gradient $$\frac{dJ}{du}$$

allows the ESC algorithm to be used with a plant or with equipment, regardless of scale or range of the performance variable J. Advantageously, this facilitates a more versatile extremum-seeking control scheme that can be used for various types of plants, different systems, different equipment, etc. Another advantage of using the sign of the gradient $$\frac{dJ}{du}$$

in the feedback is that the extremum-seeking control loop does not reach steady-state and persistent excitation is provided to the plant (e.g., plant 702). In this way, the switching strategy is self-perturbing and does not require an external perturbation signal. Advantageously, this reduces (or may completely remove) the need for analysis, computation, etc., associated with generating a perturbation signal.

Self-Perturbing Extremum-Seeking Control System for a Static Plant

Figure 8:
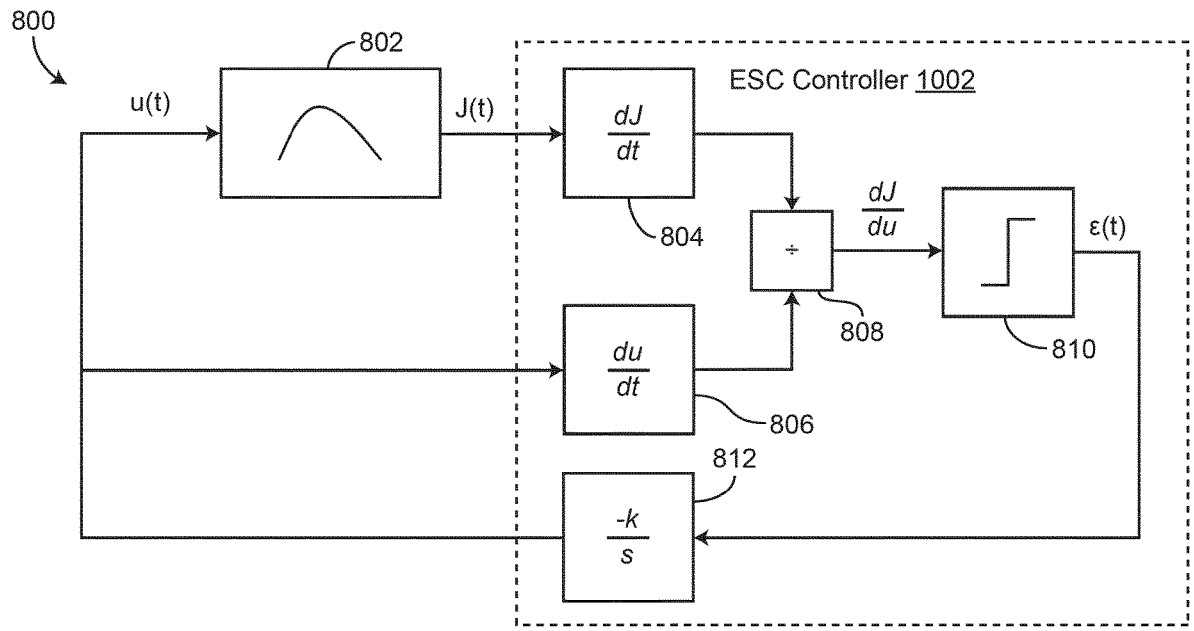
FIG. 8 is a block diagram of a self-perturbing or self-exciting extremum-seeking control system for a static plant, according to some embodiments.

Referring now to FIG. 8, a self-perturbing extremum-seeking control system 800 for a static plant 802 is shown, according to some embodiments. A static plant produces an output that is a function of a current value of the control input without regards to internal system states, past values, dynamics of the plant, etc. The self-perturbing extremum-seeking control system 800 includes static plant 802, a performance variable gradient block 804 (where the gradient $$\frac{dJ}{du}$$

or the time derivative $\dot{J}$ of the performance variable is calculated), an input gradient block 806 (where the gradient $$\frac{du}{dt}$$

or the time derivative $\dot{u}$ of the control input is calculated), a division block 808, a filter 810, and an integrator 812.

Static plant 802 receives a control input u(t) and outputs the performance variable J(t), according to some embodiments. The performance variable J(t) is derived with respect to time at performance variable gradient 804 to determine $$\frac{dJ}{du},$$

according to some embodiments. The control input u(t) is also derived with respect to time at input gradient block 806 to determine $$\frac{du}{dt},$$

according to some embodiments. The control input u(t) may be both provided to static plant 802 as the input and also derived with respect to time as shown in FIG. 8.

The gradient of the performance variable $$\frac{dJ}{du}$$

is divided by the gradient of the control input $$\frac{du}{dt}$$

at division block 808. Specifically, the gradient of the performance variable $$\frac{dJ}{dt}$$

is divided by the gradient of the control input $$\frac{du}{dt}$$

so that the time portions of the gradients cancel out, thereby determining the gradient of the performance variable J with respect to the control input u $$\left(\text{e.g.,}\ \frac{dJ}{du}\right).$$

The gradient of the performance variable J with respect to the control input u is provided to filter 810 (e.g., a sign filter) to determine a sign ε(t) of the gradient of the performance variable J with respect to the control input u $$\left(\text{e.g.,}\ \frac{dJ}{du}\right).$$

The sign ε(t) may be a binary value (e.g., −1 or +1) indicating a sign (e.g., positive or negative) of the gradient of the performance variable J with respect to the control input u $$\left(\text{i.e., } \frac{dJ}{du}\right).$$

The sign ε(t) is multiplied by a value −k and integrated at integrator 812 to determine the control input u(t), according to some embodiments. In some embodiments, integrator 812 has the effect of adding the value −k to the previous value of the control input u(t−1) if the sign ε(t)) is positive (e.g., u(t)=u(t−1)+(−k)=u(t−1)−k) or subtracting the value −k from the previous value of the control input u(t−1) if the sign of ε(t)) is negative (e.g., u(t)=u(t−1)−(−k)=u(t−1)+k).

The value of k can be adjusted to increase a rate of convergence of the self-perturbing extremum-seeking control system 800. However, while increasing the value of k may lead to faster convergence, increasing the value of k may also lead to greater oscillation about an optimal solution (e.g., an optimal control input u). Additionally, the self-perturbing extremum-seeking control system 800 is configured for use with static plant 802. However, in practice, plants are often dynamic and include dynamic responses/portions.

Self-Perturbing Extremum-Seeking Control System for a Dynamic Plant

Figure 9:
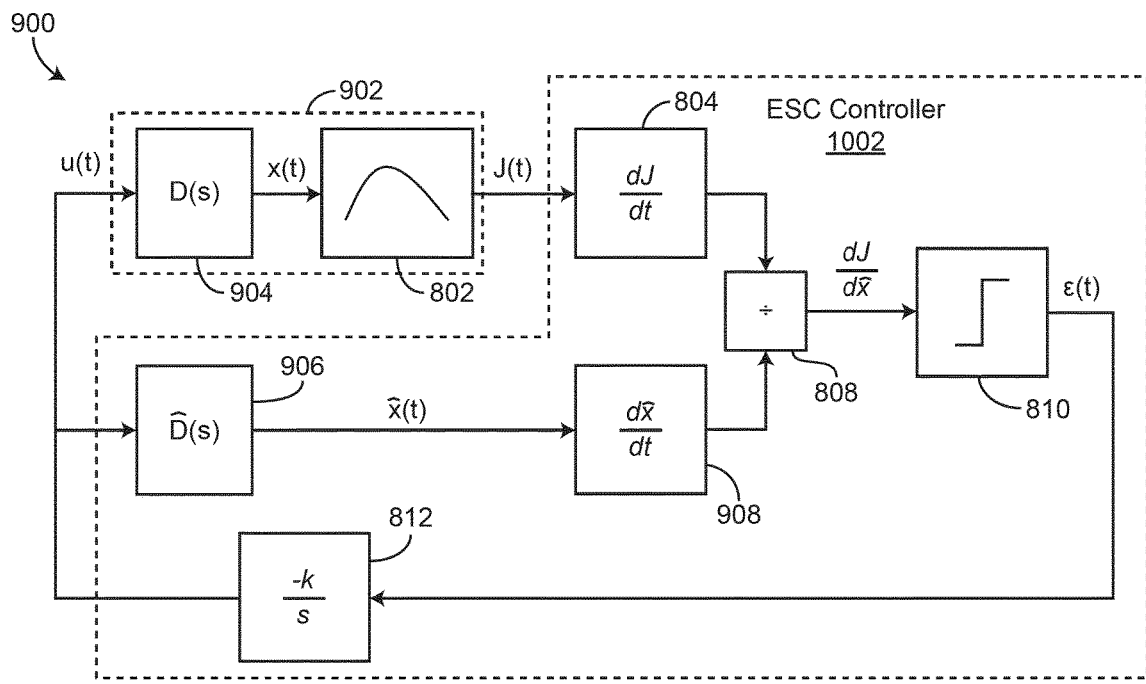
FIG. 9 is a block diagram of a self-perturbing or self-exciting extremum-seeking control system for a dynamic plant, according to some embodiments.

Referring now to FIG. 9, a self-perturbing extremum-seeking control system 900 for a dynamic plant 902 is shown, according to some embodiments. A dynamic plant produces an output given a current value of an input. The output of the dynamic plant may be affected by historical values, internal parameters, or internal dynamic parameters of the plant. For example, given a particular input, the output may vary or change over time before converging to an output value. The self-perturbing extremum-seeking control system 900 can be similar to the self-perturbing extremum-seeking control system 800.

System 900 includes dynamic plant 902, performance variable gradient 804, division block 810, filter 810, a static nonlinearity gradient block 908, integrator 812, and dynamic estimation block 906, according to some embodiments. Dynamic plant 902 includes a dynamic portion 904 and static plant 802. Dynamic plant 902 receives the control input u(t) at dynamic portion 904, according to some embodiments. Dynamic portion 904 may be the dynamic portions of the dynamic plant 902. Static plant 802 represents the static portions of the dynamic plant 902, according to some embodiments. Dynamic portion 904 may be a dynamic portion of dynamic plant 902 which accounts for various internal parameters of dynamic plant 902. Dynamic portion 904 may receive the control input u(t) and output x(t). The output x(t) is provided to static plant 802 which outputs the performance variable J(t). However, in order to provide a self-perturbing extremum-seeking control system using similar methodology as described in greater detail above with reference to FIG. 8, the output x(t) may need to be known or estimated/approximated. Because the output x(t) is not measurable, the output x(t) can be approximated with a model D̂(s) of the plant dynamics (e.g., a model of the dynamic portion 904 of the dynamic plant 902).

It should be understood that a "static portion" and a "dynamic portion" of a plant as used herein refer to different behaviors of the plant or different portions of a model of the plant. For example, the dynamic portion 904 of plant 902 and the static portion 802 may characterize different behaviors or responses of the plant 902 given a specific control input or time series of control inputs. Static portion 802 and dynamic portion 904 of plant 902 mathematically define or characterize how plant 902 responds to a given control input, and do not necessarily refer to different physical portions of plant 902.

The dynamic portion 904 of the dynamic plant 902 can be estimated or approximated using a low-pass filter with a single time constant as shown in Equation (5) below:

$$\hat{D}(s) = \frac{1}{1 + \tau s} \qquad (5)$$

where D̂(s) is a low-pass filter with a single time constant τ that can be used to estimate the dynamic portion 904 of the dynamic plant 902. For example, the output x(t) can be estimated as x̂(t) by: x̂(t)=D̂(s)u(t).

Time derivatives of the performance variable J(t) (e.g., the output of the static portion 802) and the output x(t) (e.g., the output of the dynamic portion 904 of the dynamic plant 902) can be used to determine a gradient of the performance variable J(t) with respect to the output x(t). In some embodiments, the gradient of the performance variable J(t) with respect to the approximation or estimation of the output x(t), namely $$\frac{dJ}{d\hat{x}}$$

is used to increase or decrease or determine the control input u(t) for dynamic plant 902.

The performance variable/output J from the dynamic plant 902 is derived with respect to time at performance variable gradient 804. Specifically, the gradient $$\frac{dJ}{dt}$$

of the performance variable/output J is determined by deriving J with respect to time. Likewise, the output x̂(t) is derived with respect to time at gradient block 908 to determine a gradient $$\frac{d\hat{x}}{dt}$$

of the output x̂(t) with respect to time t. In some embodiments, the output x̂(t) is an estimate of the output x(t) of the dynamic portion 904 of dynamic plant 902. The gradient $$\frac{dJ}{dt}$$

and the gradient $$\frac{d\hat{x}}{dt}$$

are divided by each other at division block 808, according to some embodiments. Specifically, the gradient $$\frac{dJ}{dt}$$

is divided by the gradient $$\frac{d\hat{x}}{dt}$$

such that the time differentials dt cancel each other out, thereby achieving a gradient $$\frac{dJ}{d\hat{x}}$$

of the performance variable/output J of the dynamic plant 902 with respect to the output $\hat{x}$ of the dynamic estimation block 906.

The gradient $$\frac{dJ}{d\hat{x}}$$

is then provided to filter 810, according to some embodiments. Filter 810 is configured to determine a sign ε(t) of the gradient $$\frac{dJ}{d\hat{x}},$$

according to some embodiments. The sign ε(t) can be a binary value (e.g., −1 or +1) indicating whether the gradient $$\frac{dJ}{d\hat{x}}$$

is positive or negative. The sign ε(t) is then integrated at integrator 812. Specifically, ε(t) is multiplied by the term $$-\frac{k}{s}$$

at integrator 812 to determine the control input u(t) for the dynamic plant 902 and the dynamic estimation block 906, according to some embodiments. In some embodiments, integrator 812 has the effect of adding the value −k to the previous value of the control input u(t−1) if the sign ε(t)) is positive (e.g., u(t)=u(t−1)+(−k)=u(t−1)−k) or subtracting the value −k from the previous value of the control input u(t−1) if the sign of ε(t)) is negative (e.g., u(t)=u(t−1)−(−k)=u(t−1)+k).

In this way, the self-perturbing extremum-seeking control system 900 can use the sign ε(t) of the gradient $$\frac{dJ}{d\hat{x}}$$

to determine the control input u(t) for the dynamic plant 902. Advantageously, the self-perturbing extremum-seeking control system 900 is viable for low-cost applications and can be implemented on processing circuitry without requiring large amounts of memory or computational resources as other extremum-seeking control systems do. Additionally, the control input u(t) can be determined without tuning the extremum-seeking control system to account for a size or a scale of the response of the dynamic plant 902. The self-perturbing extremum-seeking control system 900 does not require an external dither signal to excite the dynamic plant 902. Furthermore, the convergence of the system represented by system 900 can be controlled or adjusted by increasing or decreasing the value of the gain k at the integrator block 812. The system 900 may be globally stable. Additionally, the extremum-seeking control system 900 only requires a single configuration parameter, that is, an estimate of a time constant of the dynamic plant 902. Finally, the extremum-seeking control system 900 is a simple approach to extremum-seeking control that uses easily computable time derivatives.

Figure 16:
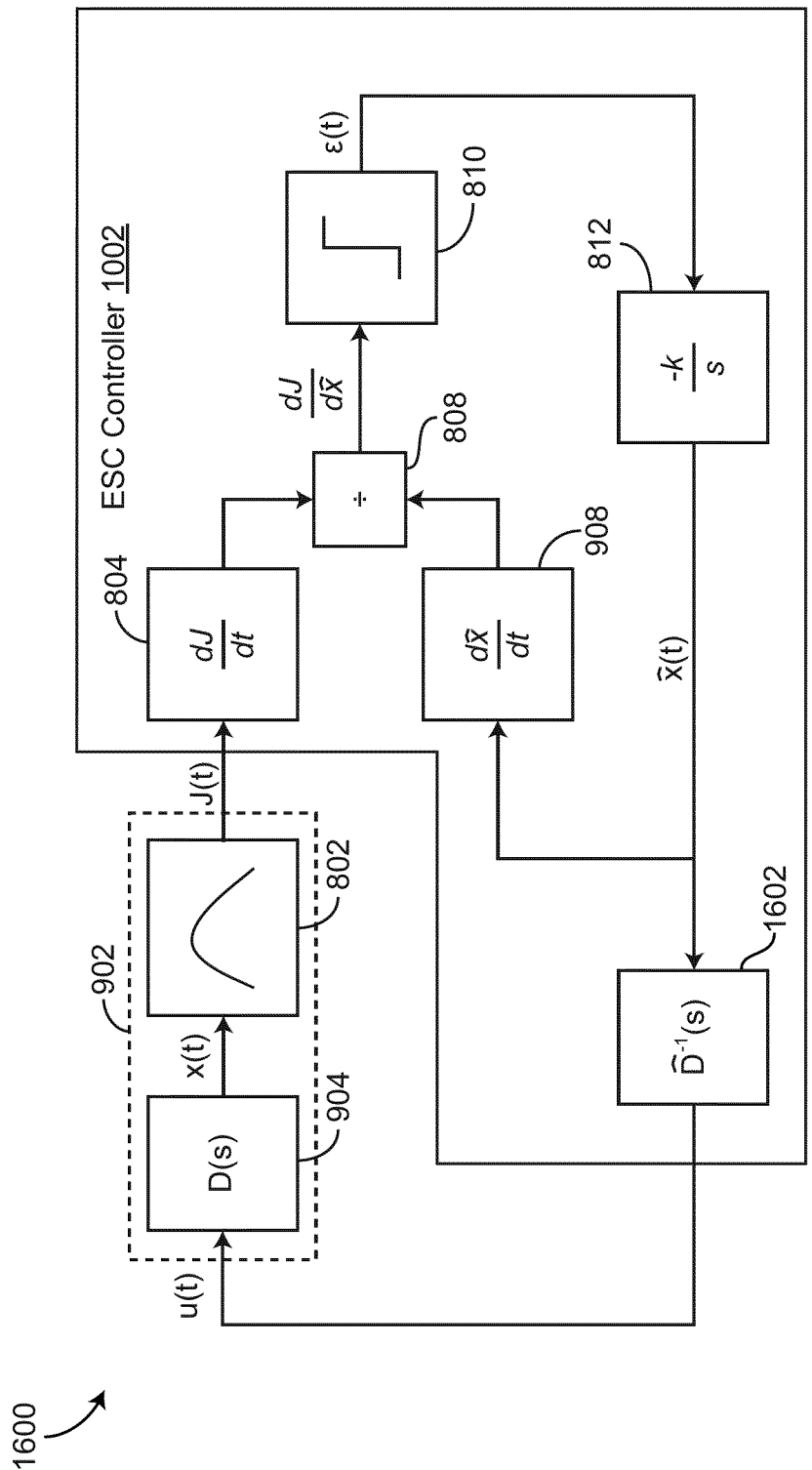
FIG. 16 is a block diagram of a self-perturbing or self-exciting extremum-seeking control system using an inverse dynamic estimation block that accounts for dynamic portions of the dynamic plant, according to some embodiments.

Referring particularly to FIG. 16, the self-perturbing extremum-seeking control system 900 can be modified to be similar to or the same as system 1600. In some embodiments, the self-perturbing extremum-seeking control system 1600 may include an inverse dynamic estimation block 1602. Inverse dynamic estimation block 1602 may replace dynamic estimation block 906. In some embodiments, inverse dynamic estimation block 1602 is configured to receive the estimation $\hat{x}$(t) of the output x(t) and output the control input u(t). In some embodiments, inverse dynamic estimation block 1602 is an inverse transfer function of the transfer function represented by dynamic estimation block 906. In some embodiments, inverse dynamic estimation block 1602 is an inverse representation of the linear plant dynamics of dynamic plant 902. In some embodiments, inverse dynamic estimation block 1602 can adjust a speed of the control input signal u(t) so that the cost/output J is synchronized with the estimation $\hat{x}$(t), thereby facilitating proper determination of the gradient $$\frac{dJ}{d\hat{x}}.$$

In some embodiments, inverse dynamic estimation block 1602 slows a speed of the control input u(t) so that the speed of the signal associated with the cost/output J(t) matches or is synchronized with the speed of the estimation $\hat{x}$(t), thereby facilitating proper determination of the gradient $$\frac{dJ}{d\hat{x}}.$$

In some embodiments, dynamic estimation block 906 may increase a speed of the signal associated with the estimation $\hat{x}$(t) so that the cost/output J(t) and the estimation $\hat{x}$(t) are synchronized with each other, thereby facilitating proper determination of the gradient $\frac{dJ}{d\hat{x}}$.

In some embodiments, both dynamic estimation block 906 and inverse dynamic estimation block 1602 are used. For example, the self-perturbing extremum-seeking control system may adjust the speed of the signals associated with both the estimation $\hat{x}(t)$ and the control input u(t) so that the estimation $\hat{x}(t)$ and the cost/output J(t) are synchronized, thereby facilitating proper determination of the gradient $\frac{dJ}{d\hat{x}}$.

Figure 17:
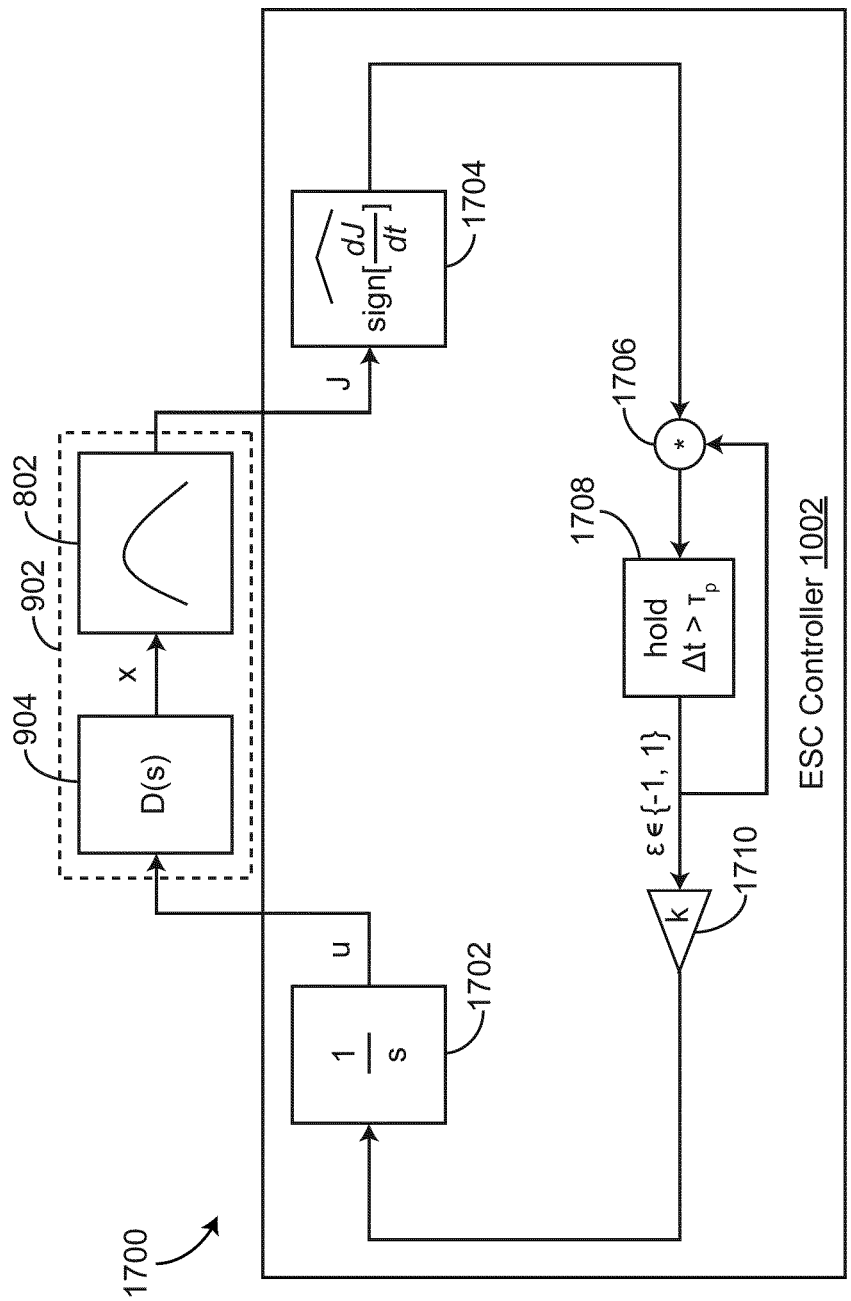
FIG. 17 is a block diagram of a self-perturbing or self-exciting extremum-seeking control system that uses a hold function, according to some embodiments.

Referring particularly to FIG. 17, a system 1700 of another embodiment of the self-perturbing extremum-seeking control system is shown. The self-perturbing extremum-seeking control system 1700 includes an integrator 1702, dynamic plant 902, a sign estimator 1704, a multiplier 1706, a hold block 1708, and a gain 1710. The feedback signal for the self-perturbing extremum-seeking control system 1700 is ϵ which represents an estimate of the sign of the gradient $\frac{dJ}{dx}$.

For example, the sign ϵ may be −1 or +1 and can be calculated using:

$$\text{sgn}[\epsilon] = \text{sgn}\left[\frac{du}{dt}\right] \quad (6)$$

according to some embodiments.

With assumptions regarding open loop stability, monotonic step response, etc., of D(s) (dynamic portion 904), and also assumptions regarding a sufficient hold time to enforce a sufficiently slow cyclical perturbation, the effect of the dynamics of dynamic plant 902 can be ignored, and it can be assumed that:

$$\text{sgn}[\epsilon] = \text{sgn}\left[\frac{dx}{dt}\right] \quad (7)$$

according to some embodiments.

Applying the chain rule to Equation (7) shown above yields:

$$\text{sgn}\left[\frac{dJ}{du}\right] = \text{sgn}\left[\frac{dJ}{dt}\right] \times \text{sgn}\left[\frac{dx}{dt}\right] \quad (8)$$

which can be expressed as:

$$\text{sgn}\left[\frac{dJ}{du}\right] = \text{sgn}\left[\frac{dJ}{dt}\right] \times \epsilon \quad (9)$$

according to some embodiments. In some embodiments, hold block 1708 holds or slows a frequency of the perturbation signal thereby creating time scale separation to reduce the effect of the dynamics of dynamic plant 902.

HVAC System with Self-Perturbing Extremum-Seeking Control

Figure 11:
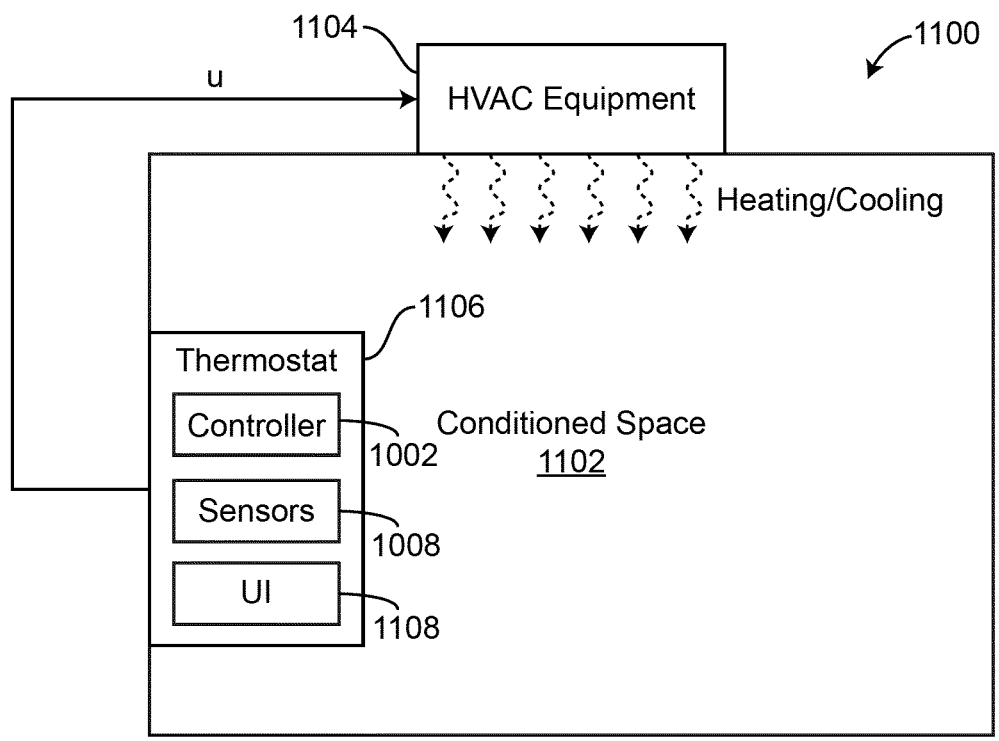
FIG. 11 is a block diagram of the plant of FIG. 10, according to some embodiments.

Referring now to FIG. 11, a block diagram of an HVAC system 1100 is shown, according to some embodiments. HVAC system 1100 includes a conditioned space 1102, HVAC equipment 1104, and a thermostat 1106. HVAC equipment 1104 is configured to provide heating and/or cooling to conditioned space 1102 to adjust a temperature or an environmental condition in conditioned space 1102. Thermostat 1106 can include an ESC controller 1002, one or more sensors 1008, and a user interface 1108.

Sensors 1008 can be configured to measure the environmental condition (e.g., the temperature) of conditioned space 1102. For example, sensors 1008 can be temperature sensors, humidity sensors, etc., or any other type of sensor configured to measure the environmental condition in conditioned space 1102. Sensors 1008 can be positioned locally at thermostat 1106 or may be positioned about conditioned space 1102. Sensors 1008 can be operatively or communicably coupled with ESC controller 1002 such that ESC controller 1002 receives measurements of the environmental condition of conditioned space 1102.

User interface 1108 can be configured to receive one or more user inputs and may provide the user inputs to controller 1002. In some embodiments, the user inputs indicate a desired value of the environmental condition (e.g., a temperature setpoint) of conditioned space 1102. ESC controller 1002 can use the user inputs received from user interface 1108 and the measurements obtained by sensors 1008 in a self-perturbing extremum-seeking control system (e.g., as shown in system 900) to generate control signals or inputs for HVAC equipment 1104. ESC controller 1002 provides the control inputs or the control signals to HVAC equipment 1104 such that HVAC equipment 1104 operates to affect the environmental condition (e.g., a variable state or a condition, a performance variable, etc.) of conditioned space 1102. In some embodiments, HVAC equipment 1104 is on-off equipment that is configured to transition between an on-state or an operational state, and an off-state or an inoperational state. The control inputs or the control signals provided to HVAC equipment 1104 by ESC controller 1002 may transition HVAC equipment 1006/1104 between the on-state and the off-state. The HVAC equipment 1104 can operate between the on-state and the off-state for various modes. For example, the HVAC equipment 1104 can be configured to operate in a heating mode and/or a cooling mode. The HVAC equipment 1104 can transition between the on-state and the off-state in the heating mode (e.g., to selectably provide heating to conditioned space 1102) or between the on-state and the off-state in the cooling mode (e.g., to selectably provide cooling to conditioned space 1102).

Figure 10:
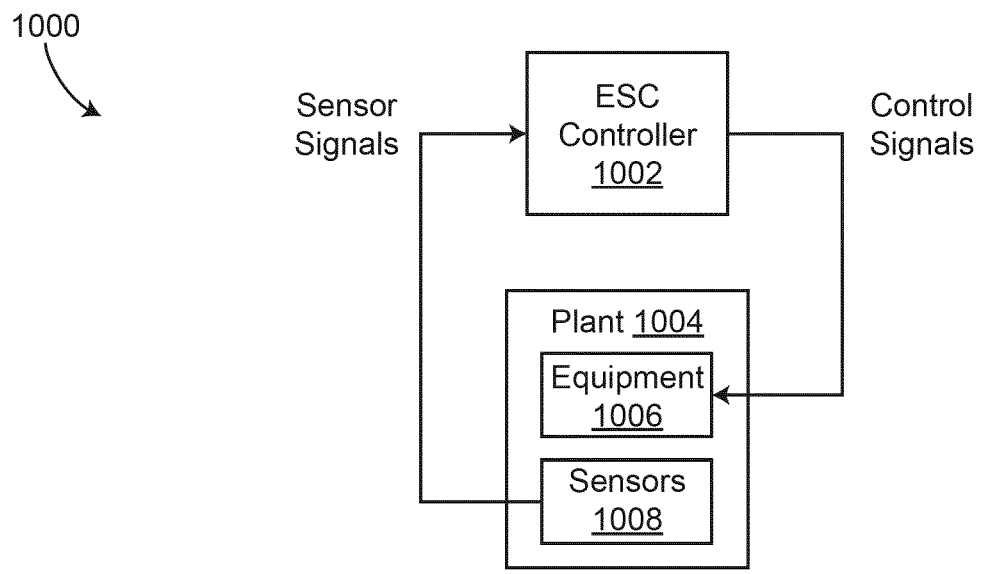
FIG. 10 is a block diagram of a self-perturbing or self-exciting extremum-seeking control system including a self-perturbing extremum-seeking controller and a plant, according to some embodiments.

Referring particularly to FIG. 10, a block diagram of a control system 1000 for a dynamic plant 1004 is shown, according to some embodiments. Control system 1000 can be the same as or similar to HVAC system 1100, but for a generalized dynamic plant 1004. Control system 1000 includes ESC controller 1002 and dynamic plant 1004. Dynamic plant 1004 can be the same as or similar to conditioned space 1102 and may receive an input (e.g., heating, cooling, energy, etc.) from equipment 1006. Dynamic plant 1004 can be a static plant or a dynamic plant that responds to the input from equipment 1006. Equipment 1006 can be HVAC equipment 1104, or any other equipment that is configured to affect a variable state or condition of dynamic plant 1004 (e.g., increase or decrease a temperature of conditioned space 1102, etc.).

Control system 1000 includes one or more sensors 1008 that are configured to measure a value of a measured variable y of dynamic plant 1004, according to some embodiments. Sensors 1008 can provide the value(s) of the measured variable y of dynamic plant 1004 (e.g., temperature, humidity, etc.) to ESC controller 1002. ESC controller 1002 can use the values of the measured variable y in a self-perturbing extremum-seeking control system to determine optimal operational parameters of equipment 1006 (e.g., HVAC equipment 1104).

ESC Controller

Figure 12A:
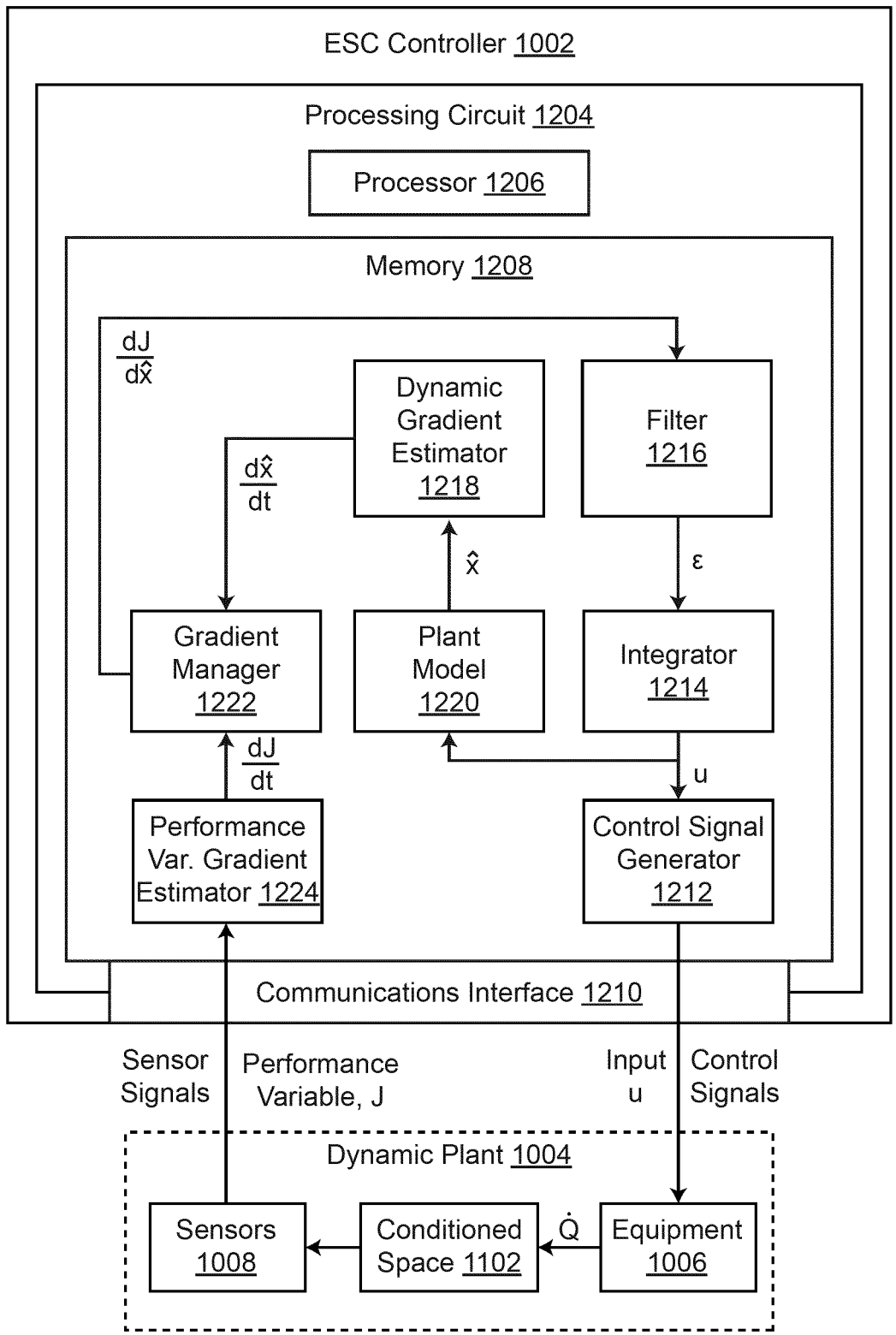
FIG. 12A is a block diagram of the self-perturbing or self-exciting extremum-seeking controller of FIG. 10, according to some embodiments.

Referring particularly to FIG. 12A, ESC controller 1002 configured for a dynamic plant is shown in greater detail, according to some embodiments. ESC controller 1002 is configured to provide control signals to equipment 1006 to affect the environmental condition or the performance variable of dynamic plant 1004. Specifically, ESC controller 1002 is configured to provide the control input u to equipment 1006 to affect a variable state or condition (e.g., an environmental condition) of conditioned space 1102.

ESC controller 1002 can be configured to implement the self-perturbing extremum-seeking control system 900 described in greater detail above with reference to FIG. 9. Referring still to FIG. 12A, ESC controller 1002 is shown to include a communications interface 1210. Communications interface 1210 may facilitate communications between ESC controller 1002 and external applications (e.g., equipment 1006 of dynamic plant 1004, sensors 1008 of dynamic plant 1004, etc.) for allowing control and monitoring of dynamic plant 1004 or any of the components, devices, equipment, sensors, etc., of dynamic plant 1004. Communications interface 1210 may also facilitate communications between ESC controller 1002 and client devices. Communications interface 1210 may facilitate communications between ESC controller 1002 and building subsystems (e.g., building subsystems such as HVAC, lighting security, lifts, power distribution, business, etc.).

Communications interface 1210 can be or include wired or wireless communications interfaces (e.g., jacks, antennas, transmitters, receivers, transceivers, wire terminals, etc.) for conducting data communications with dynamic plant 1004 or other external systems or devices. In various embodiments, communications via communications interface 1210 can be direct (e.g., local wired or wireless communications) or via a communications network (e.g., a WAN, the Internet, a cellular network, etc.). For example, communications interface 1210 can include an Ethernet card and port for sending and receiving data via an Ethernet-based communications link or network. In another example, communications interface 1210 can include a Wi-Fi transceiver for communicating via a wireless communications network. In another example, communications interface 1210 can include cellular or mobile phone communications transceivers. In one embodiment, communications interface 1210 is a power line communications interface. In other embodiments, communications interface 1210 is an Ethernet interface.

Still referring to FIG. 12A, ESC controller 1002 is shown to include a processing circuit 1204 including a processor 1206 and memory 1208. Processing circuit 1204 can be communicably connected to communications interface 1210 such that processing circuit 1204 and the various components thereof can send and receive data via communications interface 1210. Processor 1206 can be implemented as a general purpose processor, an application specific integrated circuit (ASIC), one or more field programmable gate arrays (FPGAs), a group of processing components, or other suitable electronic processing components.

Memory 1208 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 1208 can be or include volatile memory or non-volatile memory. Memory 1208 can include database components, object code components, script components, or any other type of information structure for supporting the various activities and information structures described in the present application. According to some embodiments, memory 1208 is communicably connected to processor 1206 via processing circuit 1204 and includes computer code for executing (e.g., by processing circuit 1204 and/or processor 1206) one or more processes described herein.

In some embodiments, ESC controller 1002 is implemented within a single computer (e.g., one server, one housing, etc.). In various other embodiments ESC controller 1002 can be distributed across multiple servers or computers (e.g., that can exist in distributed locations).

Referring still to FIG. 12A, memory 1208 of ESC controller 1002 includes a performance variable gradient estimator 1224, a gradient manager 1222, a dynamic gradient estimator 1218, a plant model 1220, a filter 1216, an integrator 1214, and a control signal generator 1212, according to some embodiments. In some embodiments, performance variable gradient estimator 1224 is the same as or similar to performance variable gradient block 804 or is configured to perform the operations of performance variable gradient block 804 as described in greater detail above. In some embodiments, dynamic gradient estimator 1218 is the same as or similar to static nonlinearity gradient block 908 or is configured to perform the operations of static nonlinearity gradient block 908 as described in greater detail above. In some embodiments, plant model 1220 is the same as or similar to dynamic estimation block 906 or is configured to perform the operations of dynamic estimation block 906 as described in greater detail above. In some embodiments, gradient manager 1222 is the same as or similar to division block 808 or is configured to perform the operations of division block 808 as described in greater detail above. In some embodiments, filter 1216 is the same as or similar to filter 810 or is configured to perform the operations of filter 810 as described in greater detail above. In some embodiments, integrator 1214 is the same as or similar to integrator 812 or is configured to perform the operations of integrator 812 as described in greater detail above.

Performance variable gradient estimator 1224 is configured to receive the performance variable J from the dynamic plant 1004, according to some embodiments. Specifically, performance variable gradient estimator 1224 is configured to receive sensor signals from sensors 1008 that indicate the performance variable J (e.g., power consumption), according to some embodiments. In some embodiments, performance variable gradient estimator 1224 is configured to determine the gradient or the time derivative of the performance variable J. Performance variable gradient estimator 1224 can receive the performance variable J at consecutive time steps and estimate, calculate, determine, etc., the gradient Performance variable gradient estimator 1224 can use a Savitzky-Golay filter (as shown in Equation (11) above) to determine the gradient $$\frac{dJ}{dt}.$$

Performance variable gradient estimator 1224 provides the gradient $$\frac{dJ}{dt}$$

to gradient manager 1222, according to some embodiments.

Gradient manager 1222 is configured to receive the gradient $$\frac{dJ}{dt}$$

(e.g., the time derivative of the performance variable J) from performance variable gradient estimator 1224 and a gradient $$\frac{d\hat{x}}{dt}$$

(e.g., the time derivative of $\hat{x}$) from dynamic gradient estimator 1218. Gradient manager 1222 can determine a gradient $$\frac{dJ}{d\hat{x}}$$

based on the gradient $$\frac{dJ}{dt}$$

and the gradient $$\frac{d\hat{x}}{dt}.$$

Gradient manager 1222 may divide the gradient $$\frac{dJ}{dt}$$

by the gradient $$\frac{d\hat{x}}{dt}$$

to determine a gradient $$\frac{dJ}{d\hat{x}}$$

of the performance variable J with respect to the output $\hat{x}$ of plant model 1220. Gradient manager 1222 can then provide the gradient $$\frac{dJ}{d\hat{x}}$$

to filter 1216.

Filter 1216 receives the gradient $$\frac{dJ}{d\hat{x}}$$

and determines a sign $\varepsilon$ of the gradient $$\frac{dJ}{d\hat{x}},$$

according to some embodiments. In some embodiments, filter 1216 determines or identifies if the sign of the gradient $$\frac{dJ}{d\hat{x}}$$

is positive or negative (e.g., +1 or −1) and outputs the sign $\varepsilon$ to integrator 1214. The sign $\varepsilon$ can be positive (e.g., $\varepsilon=+1$) if the performance variable J is increasing with respect to the output $\hat{x}$ or negative (e.g., $\varepsilon=-1$) if the performance variable J is decreasing with respect to the output $\hat{x}$ of plant model 1220. Filter 1216 provides the sign $\varepsilon$ to integrator 1214, according to some embodiments.

Integrator 1214 is configured to receive the sign $\varepsilon$ from filter 1216 and use the sign $\varepsilon$ to generate the control input u for dynamic plant 1004. Integrator 1214 may integrate the sign $\varepsilon$ by multiplying the sign $\varepsilon$ by $$-\frac{k}{s}.$$

In some embodiments, the parameter k is adjustable or adaptable to adjust (e.g., increase or decrease) a rate of convergence. Integrator 1214 provides the control input u to control signal generator 1212 and plant model 1220, according to some embodiments.

Plant model 1220 may be a model of the dynamic portion of dynamic plant 1004. For example, plant model 1220 can approximate the dynamic response of dynamic plant 1004. In this way, the output $\hat{x}$ can indicate or approximate the effect of the plant dynamics on the control input variable u. In some embodiments, plant model 1220 is an approximation of a Wiener system, or is a Wiener system. For example, plant model 1220 can be a transfer function such as the transfer function shown in Equation (13). Plant model 1220 can receive the control input u and determine or generate or output x̂ which is used to determine the gradient $$\frac{d\hat{x}}{dt}.$$

The output x̂ is provided to dynamic gradient estimator 1218.

Dynamic gradient estimator 1218 is configured to receive the output x̂ from plant model 1220 and determine a time derivative, a gradient, a derivative, etc., of the output x̂. Dynamic gradient estimator 1218 can be configured to use a Savitzky-Golay filter (as shown in Equation (11) below) to numerically calculate the gradient $$\frac{d\hat{x}}{dt}.$$

Control signal generator 1212 is configured to receive the control input u from integrator 1214 and generate control signals for equipment 1006 to implement or perform the control input u at dynamic plant 1004, according to some embodiments. In some embodiments, control signal generator 1212 is configured to provide the control input u to dynamic plant 1004. The control signals or the control input u can be setpoint decisions and may be provided to equipment 1006 to affect a variable condition, an environmental condition, etc., of dynamic plant 1004, or to affect an operation of equipment 1006. In some embodiments, the control signals or the control input u affect the performance variable J. The control input u or the control signals can be provided to equipment 1006 to adjust or affect a rate of heat transfer to/from conditioned space 1102 as driven by equipment 1006. For example, the control input u or the control signals may increase a rate of heat transfer that is provided into conditioned space 1102 by equipment 1006.

Equipment 1006 operates to affect an environmental condition or a performance variable (e.g., a variable state or condition) of conditioned space 1102. Sensors 1008 can be configured to measure the performance variable J or the performance variable or the environmental condition of conditioned space 1102 and provide sensor signals to performance variable gradient estimator 1224. In some embodiments, sensors 1008 are temperature sensors that are configured to measure a temperature within or at conditioned space 1102. Sensors 1008 may provide the measured temperature to performance variable gradient estimator 1224 as the performance variable J (e.g., the performance variable). Performance variable gradient estimator 1224 can then use the measurements or the performance variable J to determine the gradient $$\frac{dJ}{dt}.$$

Figure 12B:
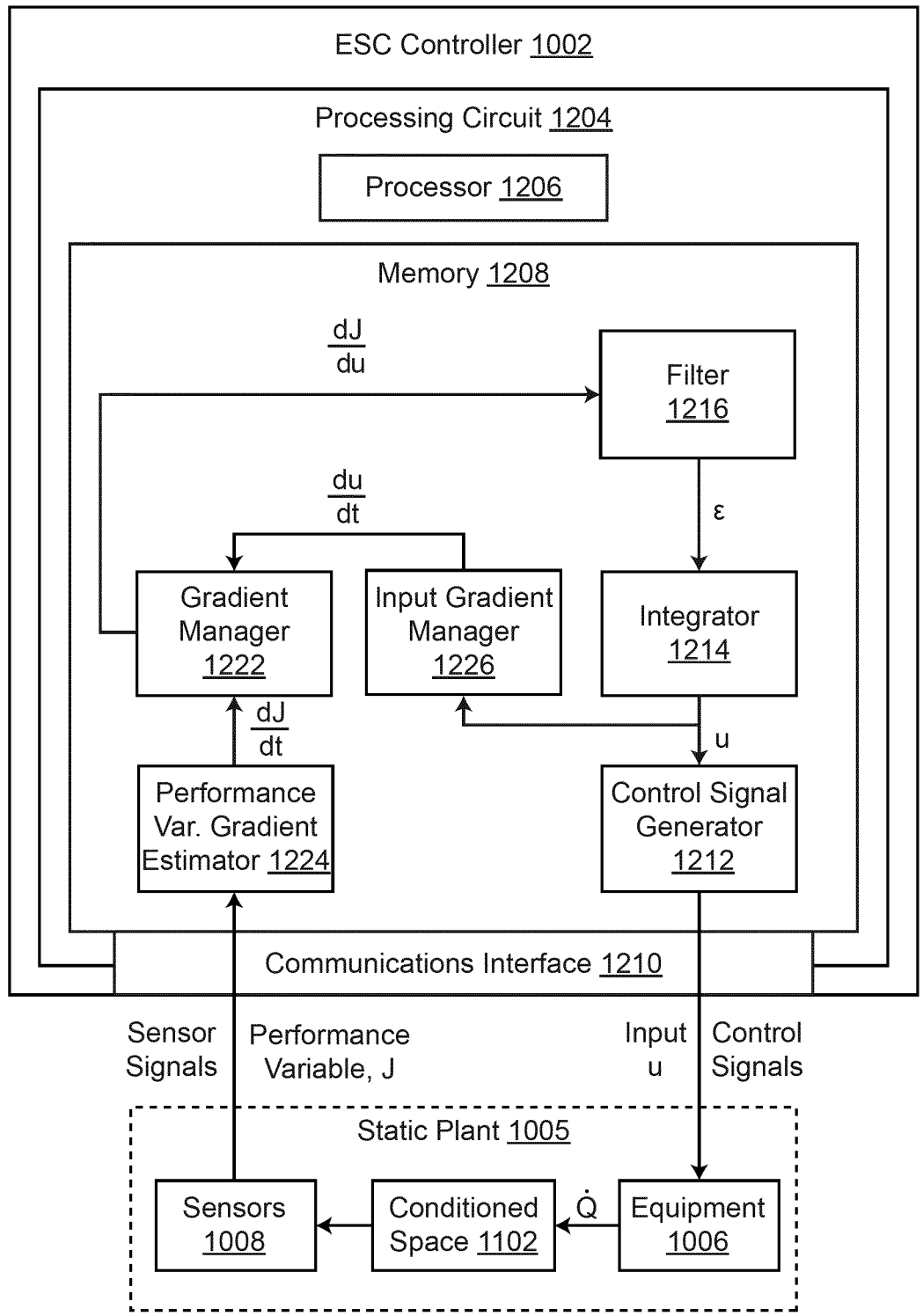
FIG. 12B is a block diagram of the self-perturbing extremum-seeking controller of FIG. 10 configured for use with a static plant, according to some embodiments.

Referring particularly to FIG. 12B, ESC controller 1002 is shown configured for use with a static plant 1005, according to some embodiments. In some embodiments, ESC controller 1002 as shown in FIG. 12B is configured to implement any of the functionality of the self-perturbing extremum-seeking control system 800 as shown in FIG. 8. In some embodiments, ESC controller 1002 as shown in FIG. 12B is configured to implement any of the functionality of ESC controller 1002 as shown in FIG. 12A.

Referring still to FIG. 12B, ESC controller 1002 is configured to receive the performance variable J from static plant 1005. In some embodiments, static plant 1005 is similar to dynamic plant 1004 but does not include various internal dynamic portions that are exhibited in dynamic plant 1004. In some embodiments, static plant 1005 is the same as or similar to static plant 802.

ESC controller 1002 receives values of the performance variable J from static plant 1005 at performance variable gradient estimator 1224 (e.g., from sensors 1008 of static plant 1005) and determines the gradient $$\frac{dJ}{dt}$$

of the performance variable J. In some embodiments, performance variable gradient estimator 1224 is configured to use values of the performance variable J to determine the gradient $$\frac{dJ}{dt}$$

and provide the gradient $$\frac{dJ}{dt}$$

to gradient manager 1222.

Input gradient manager 1226 is configured to receive the control input u for static plant 100 and output a gradient $$\frac{du}{dt}$$

of the control input u. In some embodiments, input gradient manager is configured to estimate, obtain, determine, calculate, etc., the gradient $$\frac{du}{dt}$$

using any of the techniques of performance variable gradient estimator 1224. Input gradient manager 1226 provides the gradient $$\frac{du}{dt}$$

to gradient manager 1222.

Gradient manager 1222 receives the gradient $$\frac{du}{dt}$$

from input gradient manager 1226 and the gradient $$\frac{dJ}{dt}$$

from performance variable gradient estimator 1224 and determines a gradient $$\frac{dJ}{du}.$$

The gradient $$\frac{dJ}{du}$$

is then provided to filter 1216 for determining the sign ε. Integrator 1214 and control signal generator 1212 can then function as described in greater detail above with reference to FIG. 12A to generate control signals for equipment 1006.

Test Results

Referring now to FIGS. 14-15 and 8-9, static plant 802 can be represented as a quadratic static non-linearity of the form:

$$J(t)=(x(t)-p(t))^2 \qquad (10)$$

where p(t) is a step function such that p(t)=0 for t<$t_{step}$ and p(t)=2 (or any other value) for t≥$t_{step}$. This means that, for the case when p(t)=2 for t≥$t_{step}$ and p(t)=0 for t<$t_{step}$, an optimum point (e.g., extremum point 604) starts at (J=0, u=0) and then steps to (J=0, u=2) (test results shown in FIGS. 14 and 15, described in greater detail below).

The time derivatives (e.g., the gradients $$\frac{dJ}{dt} \text{ and } \frac{d\hat{x}}{dt}\bigg)$$

can be calculated numerically using a Savitzky-Golay filter as shown in Equation (11) below:

$$\hat{y}(t) = \frac{1}{2}(y(t+1) - y(t-1)) \qquad (11)$$

where $\hat{y}(t)$ is the estimated derivative of a variable y (e.g., J and/or $\hat{x}$) at time t, y(t−1) is the value of the variable y at time t−1, and y(t+1) is the value of the variable y at time t+1.

The dynamic plant 902 can be represented as a Wiener process. Specifically, the dynamic portion 904 may be represented as:

$$D(s) = \frac{1}{(\tau_1 s + 1)(\tau_2 s + 1)} \qquad (12)$$

where $\tau_1$ is a first time constant and $\tau_2$ is a second time constant.

The dynamic plant 902 can be estimated as shown in Equation (13) below:

$$\hat{D}(s) = \frac{1}{(\tau_1 + \tau_2)s + 1} \qquad (13)$$

where $\tau_1$ is the first time constant and $\tau_2$ is the second time constant.

Figure 14:
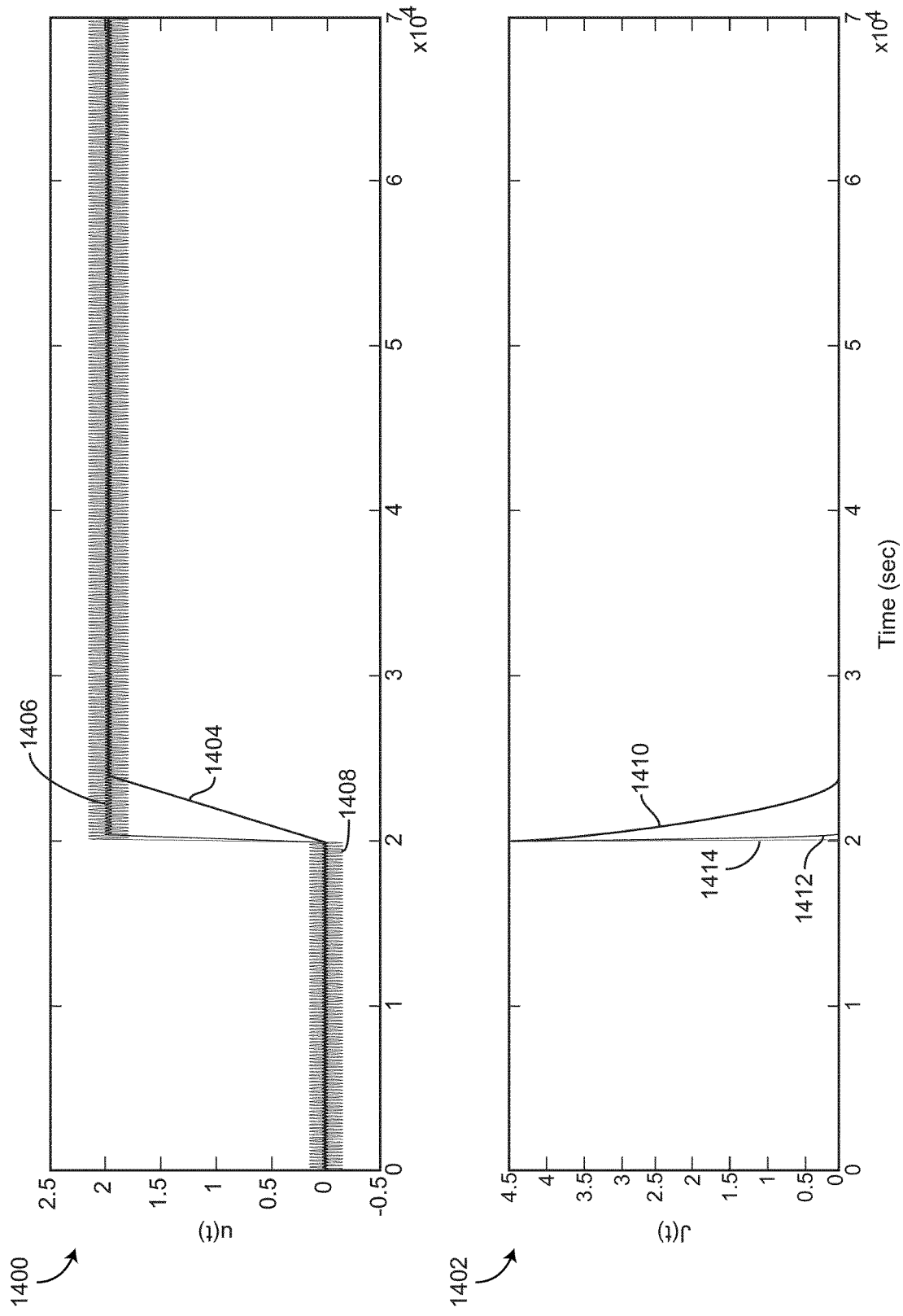
FIG. 14 is a graph of an input and an output of a dynamic plant over time for various gain values, according to some embodiments.
Figure 15:
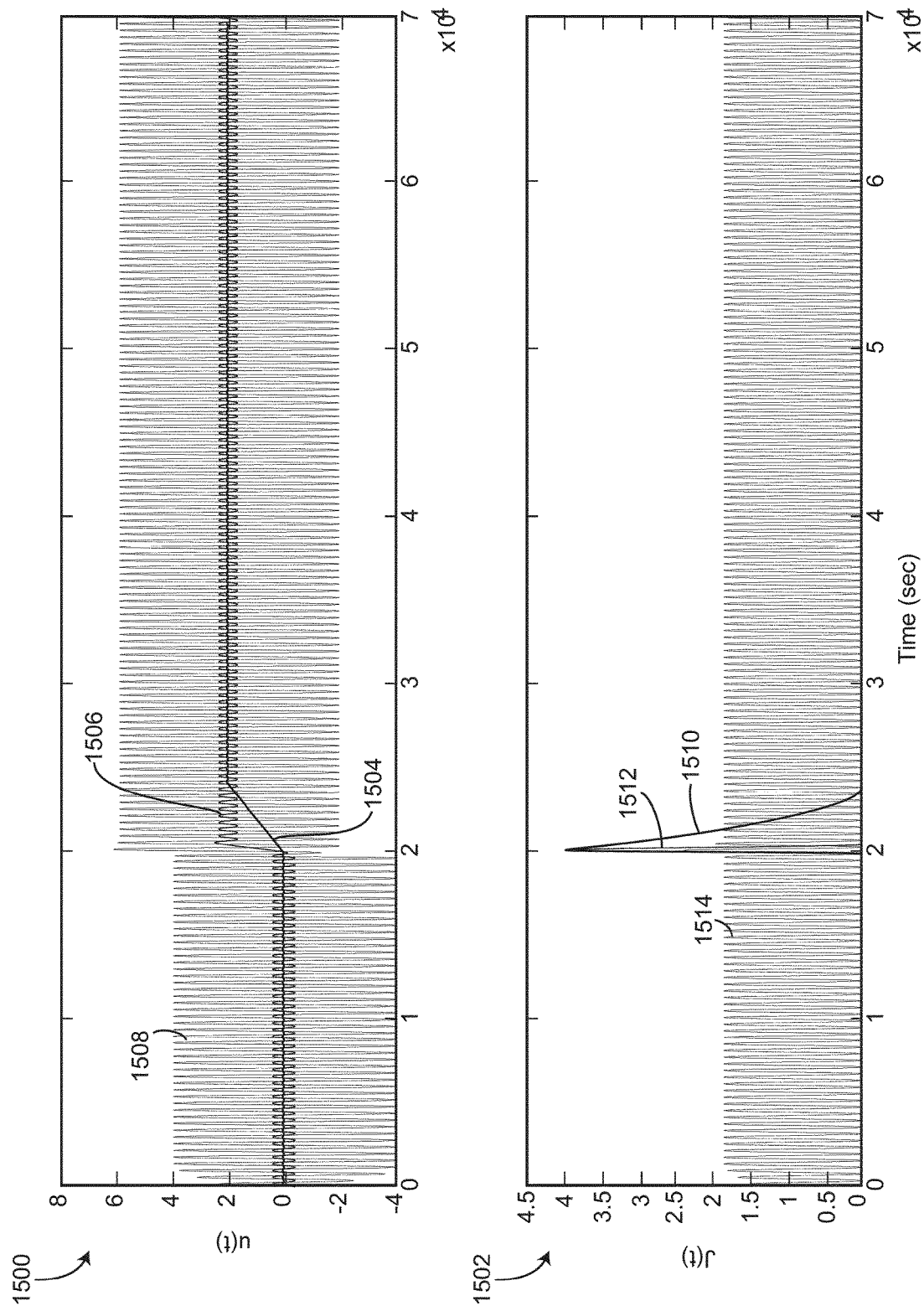
FIG. 15 is a graph of an input and output of a dynamic plant over time for various gain values, according to some embodiments.

Referring now to FIGS. 14-15, graphs 1400, 1402, 1500, and 1502 show test results for a static test and a dynamic test, according to some embodiments. In some embodiments, the graphs shown in FIGS. 14 and 15 show the control input u and the performance variable/output J over time as used or determined by ESC controller 1002 while configured to perform the self-exciting or self-perturbing extremum-seeking control of system 900 of FIG. 9.

In some embodiments, the test results shown in the graphs of FIGS. 14 and 15 result from a test simulation using a quadratic static non-linearity having the form shown in Equation (10) above. FIG. 14 shows test results for performing the self-exciting or self-perturbing extremum-seeking control for a plant without any dynamics. In some embodiments, the test results of FIG. 14 show the control input u and the performance variable/output J for system 800 as shown in FIG. 8 (e.g., a plant without any dynamic behaviors). For the test results shown in FIG. 14, the derivatives of the control input u and the performance variable/output J were calculated (e.g., by ESC 1002) using a Savitzky-Golay filter as shown in Equation (11) above.

For the test that results in graphs 1400 and 1402 of FIG. 14, the optimum point starts at J=0, u=0 and then steps to J=0 u=2. Graph 1400 includes series 1404, series 1406, and series 1408. Series 1404 corresponds to a gain k=0.0005, series 1406 corresponds to a gain k=0.005, and series 1406 corresponds to a gain k=0.05. Graph 1402 includes a series 1410 which corresponds to a gain k=0.0005, a series 1412 which corresponds to a gain k=0.005, and a series 1414 which corresponds to a gain k=0.05. As shown in FIG. 14, increasing the gain k results in a faster convergence upon the optimum point, but with greater oscillations in the control input u(t). Likewise, decreasing the gain k results in a slower convergence of the control input u to the optimum point but with less oscillations.

Referring particularly to FIG. 15, graphs 1500 and 1502 show test results from a dynamic test (e.g., a test that includes the dynamic behaviors of the plant). For example, FIG. 15 may show test results resulting from ESC controller 1002 configured to implement the self-perturbing extremum-seeking control system 900. FIG. 15 shows test results for similar values of the gain k. For example, graph 1500 includes series 1504 which corresponds to k=0.0005, series 1506 which corresponds to k=0.005, and series 1508 which corresponds to k=0.05. Likewise, graph 1502 includes series 1510 which corresponds to k=0.0005, series 1512 which corresponds to k=0.005, and series 1514 which corresponds to k=0.05. As shown in FIG. 15, the oscillations of the control input u (shown in graph 1500) and the output/performance variable J about the optimum are increased when the self-perturbing extremum-seeking control system operates to optimize a plant with dynamic behaviors. This is because the control input u(t) as generated by the self-perturbing extremum-seeking control system first passes through the plant dynamics (e.g., dynamic portion 904)

before reaching the static nonlinearity (e.g., static plant 802). Because of this, an extra delay is introduced in the loop, and as shown in Equation (13) above, the oscillations about the optimum are expected to be proportional to the gain that is multiplied by the delay.

For a first-order system, phase-lag is given by:

$$\phi = \tan^{-1}(-\omega\tau) \qquad (14)$$

according to some embodiments. The lag (delay) added by the input dynamics (e.g., by dynamic portion 904) is therefore a function of the frequency of the oscillation and the time constant of the plant (e.g., plant 902). Longer time constants in the plant will therefore increase the lag and thus also lead to greater amplitude of oscillation about the optimum as shown in FIGS. 14 and 15. In this way, the gain k can be adjusted to control or adjust a speed of convergence about the optimum with the trade-off being that faster convergence leads to greater variability around the optimum.

Self-Perturbing Process

Figure 13:
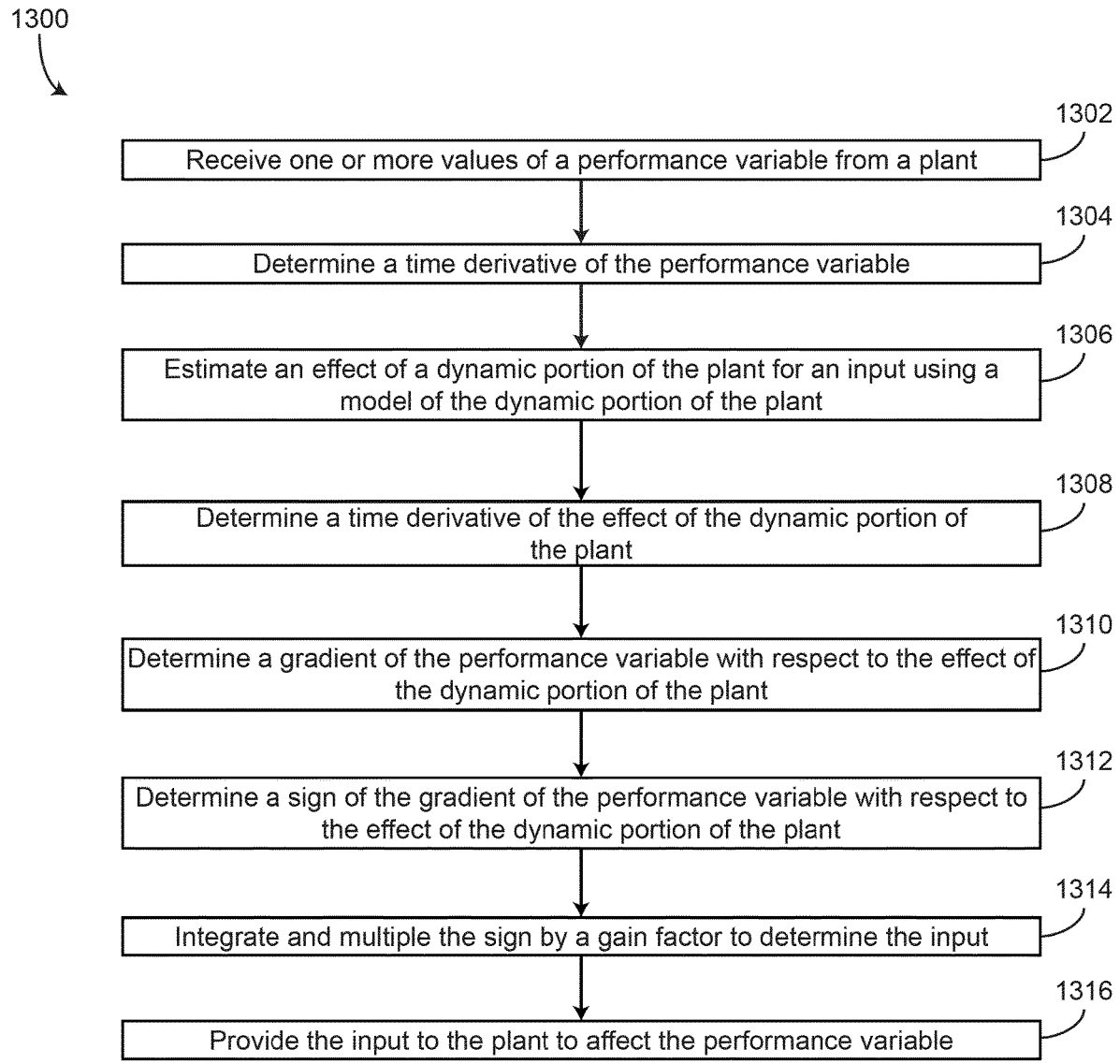
FIG. 13 is a flow diagram of a process for performing self-perturbing or self-exciting extremum-seeking control, according to some embodiments.

Referring now to FIG. 13, a process 1300 for performing self-perturbing or self-exciting extremum-seeking control is shown, according to some embodiments. In some embodiments, process 1300 includes steps 1302-1316. Process 1300 can be performed by ESC controller 1002 or the various components thereof and may incorporate any of the functionality or techniques of ESC controller 1002 as described in greater detail above with reference to FIGS. 6A-12 and 16-17.

Process 1300 includes receiving one or more values of a performance variable (e.g., a performance variable) from a plant (step 1302), according to some embodiments. In some embodiments, step 1302 is performed by ESC controller 1002, or more specifically, performance variable gradient estimator 1224. In some embodiments, the values of the performance variable or the performance variable are obtained by sensors 1008. For example, the values of the performance variable or the performance variable may be temperature values of an indoor temperature, an efficiency of an HVAC unit, a power consumption of the HVAC unit, etc. In some embodiments, the performance variable is referred to as J(t).

Process 1300 includes determining a time derivative of the performance variable or the performance variable (step 1304), according to some embodiments. In some embodiments, the time derivative of the performance variable is a gradient of the performance variable with respect to time, $$\frac{dJ}{dt}.$$

In some embodiments, step 1304 is performed by performance variable gradient estimator 1224 using the values of the performance variable J. In some embodiments, the time derivative of the performance variable $$\frac{dJ}{dt}$$

is determined or obtained by performance variable gradient estimator 1224 using a Savitzky-Golay filter or any other numerical technique to determine a derivative based on sampled values.

Process 1300 includes estimating an effect of a dynamic portion of the plant for an input using a model of the dynamic portion of the plant (step 1306), according to some embodiments. In some embodiments, the effect of the dynamic portion of the plant is estimated using dynamic estimation block 906. In some embodiments, the effect of the dynamic portion of the plant is estimated using inverse dynamic estimation block 1602. In some embodiments, step 1306 is performed by or using plant model 1220 of ESC controller 1002. In some embodiments, the estimation of the effect of the dynamic portion of the plant is referred to as $\hat{x}(t)$.

Process 1300 includes determining a time derivative of the effect of the dynamic portion of the plant (step 1308), according to some embodiments. In some embodiments, the time derivative of $\hat{x}(t)$ is a gradient of $\hat{x}(t)$ with respect to time. In some embodiments, step 1308 is performed by dynamic gradient estimator 1218. In some embodiments, the time derivative of the effect $\hat{x}(t)$ of the dynamic portion of the plant is referred to as $$\frac{d\hat{x}}{dt}.$$

In some embodiments, the time derivative of the effect $\hat{x}(t)$ is calculated or determined using a Savitzky-Golay filter or any other numerical technique.

Process 1300 includes determining a gradient of the performance variable with respect to the effect of the dynamic portion of the plant (step 1310), according to some embodiments. In some embodiments, the gradient of the performance variable with respect to the effect of the dynamic portion of the plant is referred to as $$\frac{dJ}{d\hat{x}}.$$

In some embodiments, step 1310 is performed by gradient manager 1222. In some embodiments, gradient manager 1222 receives the gradient $$\frac{d\hat{x}}{dt}$$

and the gradient $$\frac{dJ}{dt}$$

and divides the gradient $$\frac{dJ}{dt}$$

by the gradient $$\frac{d\hat{x}}{dt}$$

to obtain the gradient $$\frac{dJ}{d\hat{x}}.$$

Process 1300 includes determining a sign of the gradient of the performance variable with respect to the effect of the dynamic portion of the plant (step 1312), according to some embodiments. In some embodiments, the sign of the gradient $$\frac{dJ}{d\hat{x}}$$

expresses a relationship between the performance variable/output of the plant and the effect of the dynamic portion of the plant. In some embodiments, the sign of the gradient $$\frac{dJ}{d\hat{x}}$$

is referred to as ε(t). In some embodiments, step 1312 is performed by filter 1216.

Process 1300 includes integrating and multiplying the sign ε by a gain factor k to determine the control input u (step 1314), according to some embodiments. In some embodiments, step 1314 is performed by integrator 1214. Integrator 1214 may integrate and multiple the sign ε by the gain factor k to determine the control input u for the plant.

Process 1300 includes providing the control input to the plant to affect the performance variable (step 1316), according to some embodiments. In some embodiments, step 1316 includes generating control signals for equipment of the plant that operate to effect the performance variable. In some embodiments, step 1316 is performed by control signal generator 1212 and equipment 1006. In some embodiments, equipment 1006 of dynamic plant 1004 operates to effect conditioned space 1102 or to effect the performance variable J of dynamic plant 1004, which can be detected or measured by sensors 1008.

Self-Perturbing Extremum-Seeking Control with Holding Relay

Figure 18:
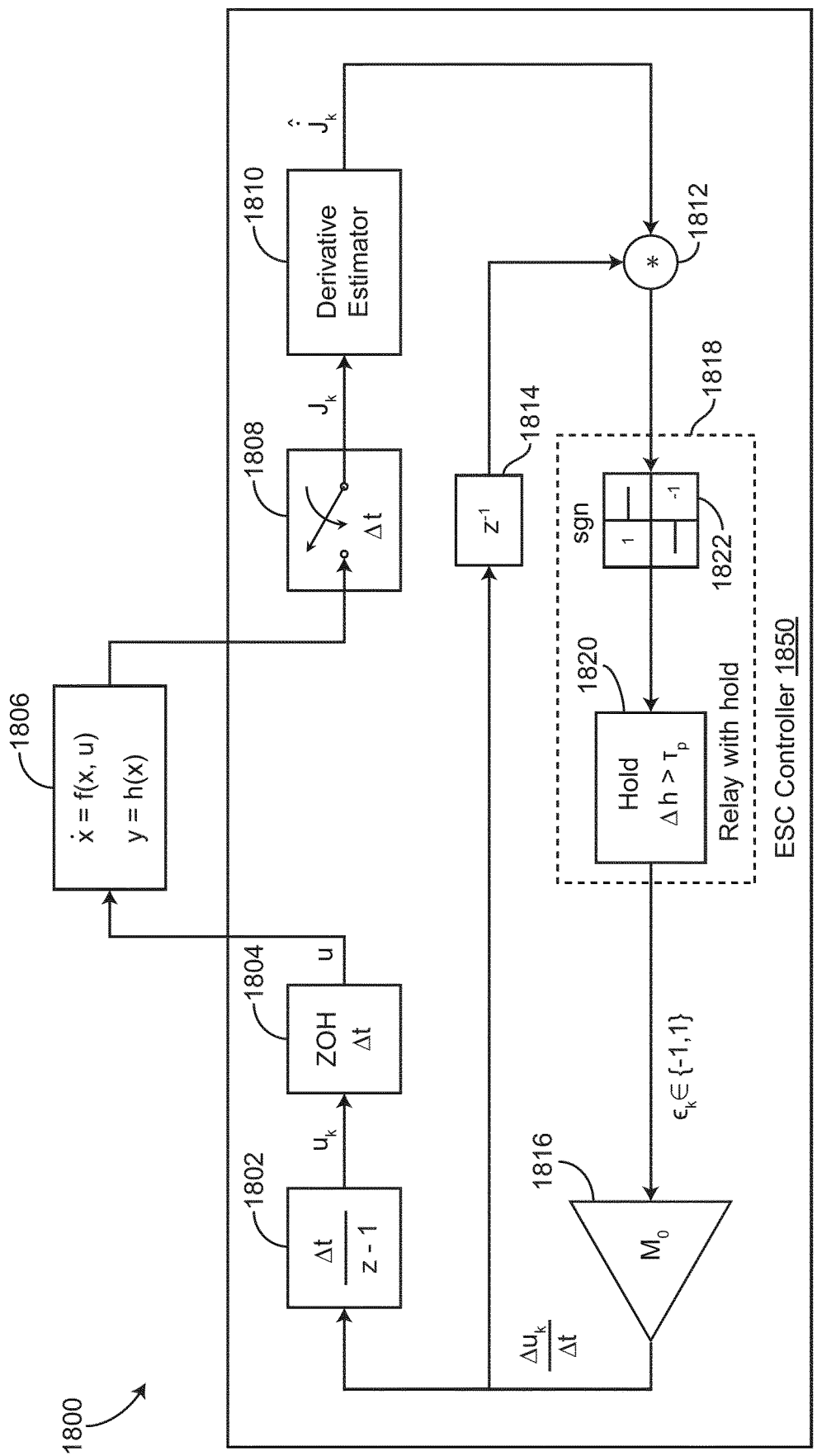
FIG. 18 is a block diagram of a self-perturbing or self-exciting extremum-seeking control system that uses a relay to hold a sign of a gradient, and a gain parameter to determine an input for the plant, according to some embodiments.

Referring now to FIG. 18, a self-perturbing extremum-seeking control system 1800 is shown, according to some embodiments. The self-perturbing extremum-seeking control system 1800 shown in FIG. 18 may function similarly to or the same as the self-perturbing extremum-seeking control systems described in greater detail above with reference to FIGS. 6A-12B and 16-17. The self-perturbing extremum-seeking control system 1800 in FIG. 18 uses a relay 1818 to hold a sign signal for a predetermined amount of time to achieve the self-perturbing extremum-seeking control system. Advantageously, the self-perturbing extremum-seeking control system 1800 in FIG. 18 does not require an artificially created dither signal to excite the plant. In some embodiments, using relay 1818 or hold block 1820 to hold the sign signal facilitates a model-free self-perturbing extremum-seeking control system.

Referring particularly to FIGS. 6A-6B and 18, the self-perturbing extremum-seeking control system 1800 includes a plant 1806 and an ESC controller 1850. In some embodiments, plant 1806 is the same as or similar to any of plants 702, 802, 902, 1004, 1005, etc. Plant 1806 may be a single-input single-output plant with a control input u and an output J that has a steady-state characteristic with a (locally) convex cost function shape (e.g., as shown in FIG. 6B) or a (locally) concave cost function shape (e.g., as shown in FIG. 6A). In some embodiments, the objective of the self-perturbing extremum-seeking control system of FIG. 18 is to drive the input/output (u,J) to the extremum (u*,J*) (e.g., extremum point 604 shown in FIGS. 6A and 6B).

For example, plant 1806 may be a non-linear plant that is defined or described as:

$$\dot{x}=f(x,u) \quad (15)$$

$$y=h(x) \quad (16)$$

where x is an n-dimensional state variable, u is the control input of plant 1806, y is a performance variable of plant 1806, $f$ is a function that relates x and u to $\dot{x}$, and h is a function that relates x to y.

It can be assumed that there is a differentiable function $l:R \rightarrow R^n$ such that:

$$f(x,u)=0, \text{ if } fx=l(u) \quad (17)$$

according to some embodiments. In some embodiments, a performance variable function J is defined as:

$$J(u)=h(l(u)) \quad (18)$$

where it is assumed that y≈J(u) if x≈l(u). Assuming that the equilibrium x=l(u) for each u or each value of u in the system of Equation (15) is globally stable, and that J(u) is the static map, it can further be assumed that there exists a unique u* that minimizes J where:

$$J'(u^*)=0 \quad (19)$$

$$J''(u^*)>0 \quad (20)$$

$$J'(u^*+\delta)(\delta>0, \forall \delta \neq 0 \quad (21)$$

according to some embodiments. The assumptions of Equations (18)-(21) shown above ensure that there is a locally unique minimum (or maximum, if considering a concave function) and that this is attainable as a stable point in the input space. It is also assumed that u, and correspondingly J(u), is bounded and locally Lipschitz continuous.

Figure 19:
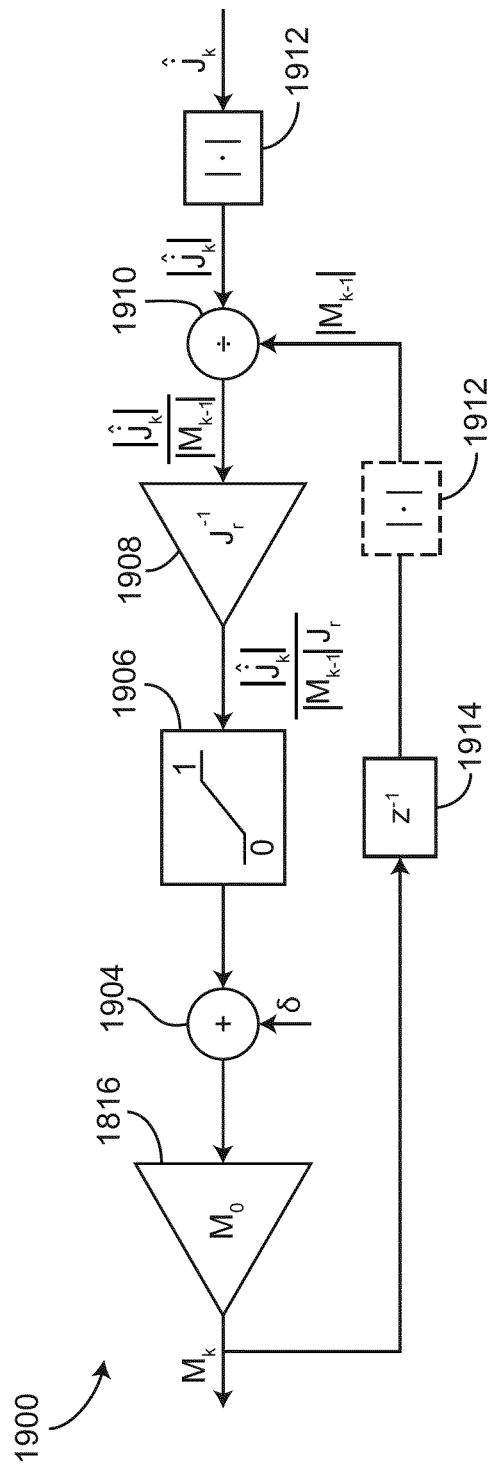
FIG. 19 is a block diagram of an adaptive gain parameter loop used to determine values of an adaptive gain parameter for a self-perturbing extremum-seeking control system, according to some embodiments.
Figure 20:
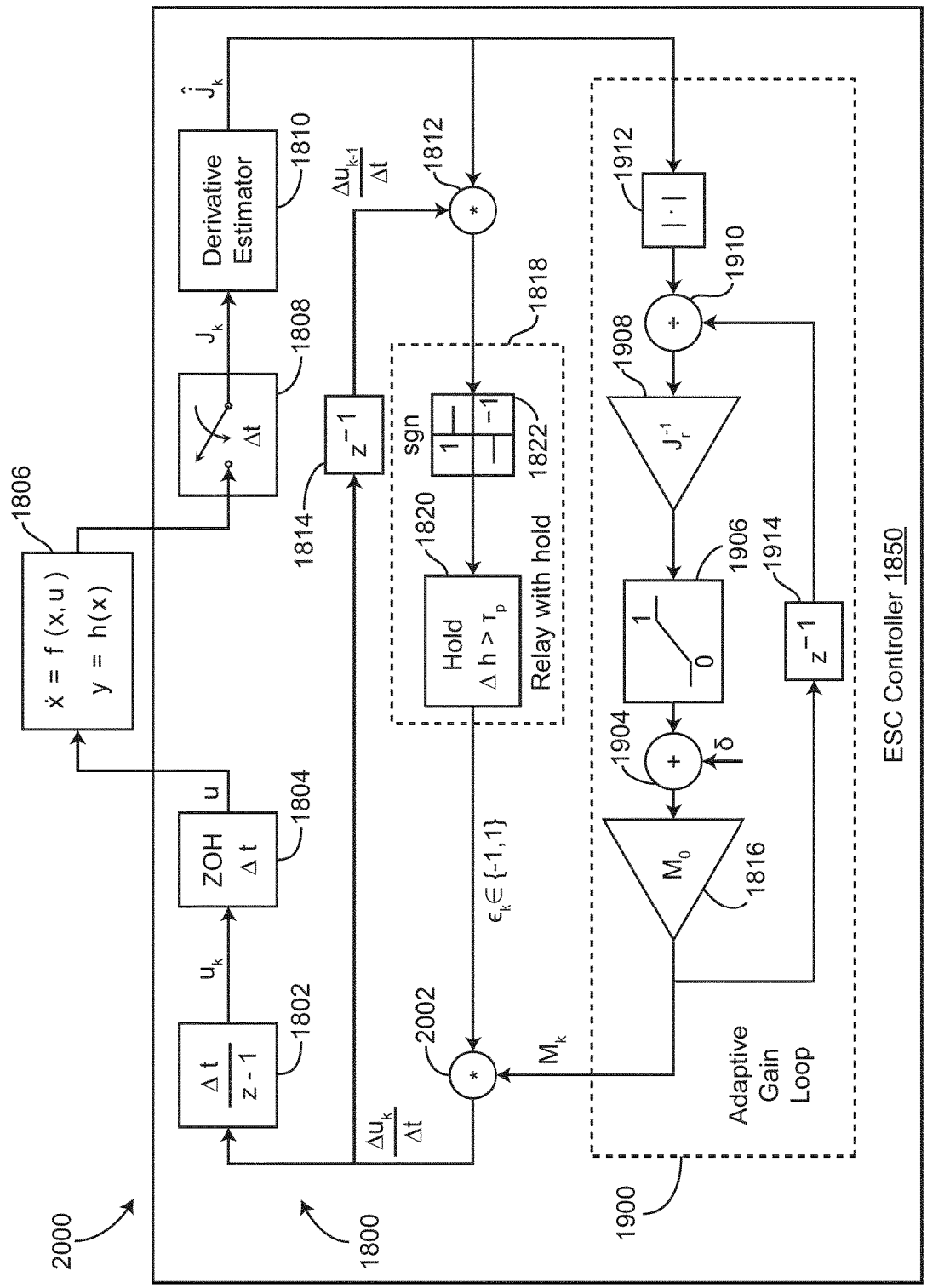
FIG. 20 is a block diagram of a self-perturbing extremum-seeking control system including the self-perturbing extremum-seeking control system of FIG. 18, and the adaptive gain parameter loop of FIG. 19, according to some embodiments.

Referring generally to FIGS. 18-20, the self-perturbing extremum-seeking control system 1800 may be configurable based on two macro plant characteristics: a first parameter $\tau_p$ that relates to the time scale of the plant dynamics and a second parameter $J_r$ that is an estimate of a difference between maximum and minimum expected values of the performance variable J. In some embodiments, the first parameter $\tau_p$ satisfies the condition that x≈l(u) when the frequency of plant excitation is slower than $$\frac{1}{2\tau_p}.$$

The parameter $\tau_p$ can be considered analogous to a dominant open loop time constant of the plant 1806 and could be estimated from an open loop step test or from prior knowledge. In some embodiments, various other parameters of the self-perturbing extremum-seeking control system can be configured from this parameter.

The second parameter is the range of the performance variable, $J_r$, which is an estimate of the difference between the maximum and minimum expected performance variable values:

$$J_r = J_{max} - J_{min} \tag{22}$$

according to some embodiments. In some embodiments, the second parameter $J_r$ is used for normalization in the adaptive loop that adjusts a relay gain.

Referring again to FIG. 18, system 1800 demonstrates an ESC relay loop for self-perturbing extremum-seeking control. The ESC relay loop shown in FIG. 18 can be performed by ESC controller 1850 which may be the same as or similar to ESC controller 1002 as described in greater detail above (e.g., including a processing circuit, processor, and memory). In some embodiments, the ESC relay loop is performed in discrete-time.

Plant 1806 outputs values of the performance variable y which may be obtained in discrete-time by a sensor, a collection of sensors, etc. In some embodiments, the obtaining of the values of the performance variable y in discrete-time is represented by discrete sampler 1808. In some embodiments, the performance variable y is sampled at a regular time interval $\Delta t$. In some embodiments, it is assumed that plant 1806 is perturbed at a slow enough frequency so that $y \approx J(u)$. In some embodiments, the output of discrete sampler 1808 is a discrete value $J_k$ at a timestep k of the performance variable J. The discrete value $J_k$ is then provided to a derivative estimator 1810, according to some embodiments. Derivative estimator 1810 can be configured to calculate a time derivative of the discrete value $J_k$ of the performance variable J, shown as $\hat{j}_k$. In some embodiments, derivative estimator 1810 is the same as or similar to performance variable gradient estimator 1224 and may be configured to use any of the techniques described herein to determine, estimate, calculate, obtain, etc., a time derivative of a signal (e.g., a Savitzky-Golay filter).

In some embodiments, the time derivative of the discrete value $\hat{j}_k$ is multiplied by a previous value of an output of the relay 1818 multiplied by the gain $M_0$ (e.g., an output of the relay 1818 at a timestep k−1, multiplied by the gain $M_0$ at gain block 1816) at multiplier 1812, and this signal is used to switch the relay 1818.

Relay 1818 includes a sign block 1822 that is configured to convert the input signal (e.g., the output of multiplier 1812) to a binary value of either +1 or −1 and a hold block 1820 that prevents relay 1818 from switching to a new state (e.g., switching from +1 to −1 or switching from −1 to +1) until a predetermined amount of time $\Delta h$ has elapsed that exceeds a threshold $\tau_p$ (e.g., the first parameter). In some embodiments, the threshold $\tau_p$ is a dominant time constant of the plant. By holding the output of sign block 1822 (i.e., the sign of the gradient) at a positive state or negative state for at least the threshold $\tau_p$, hold block 1820 may hold or slow a frequency of the perturbation signal thereby creating time scale separation to reduce the effect of the dynamics of dynamic plant 1806. This mitigates or reduces an effect of a dynamic portion of plant 1806 on the performance variable J and consequently any gradient based on the performance variable J.

Figure 31:
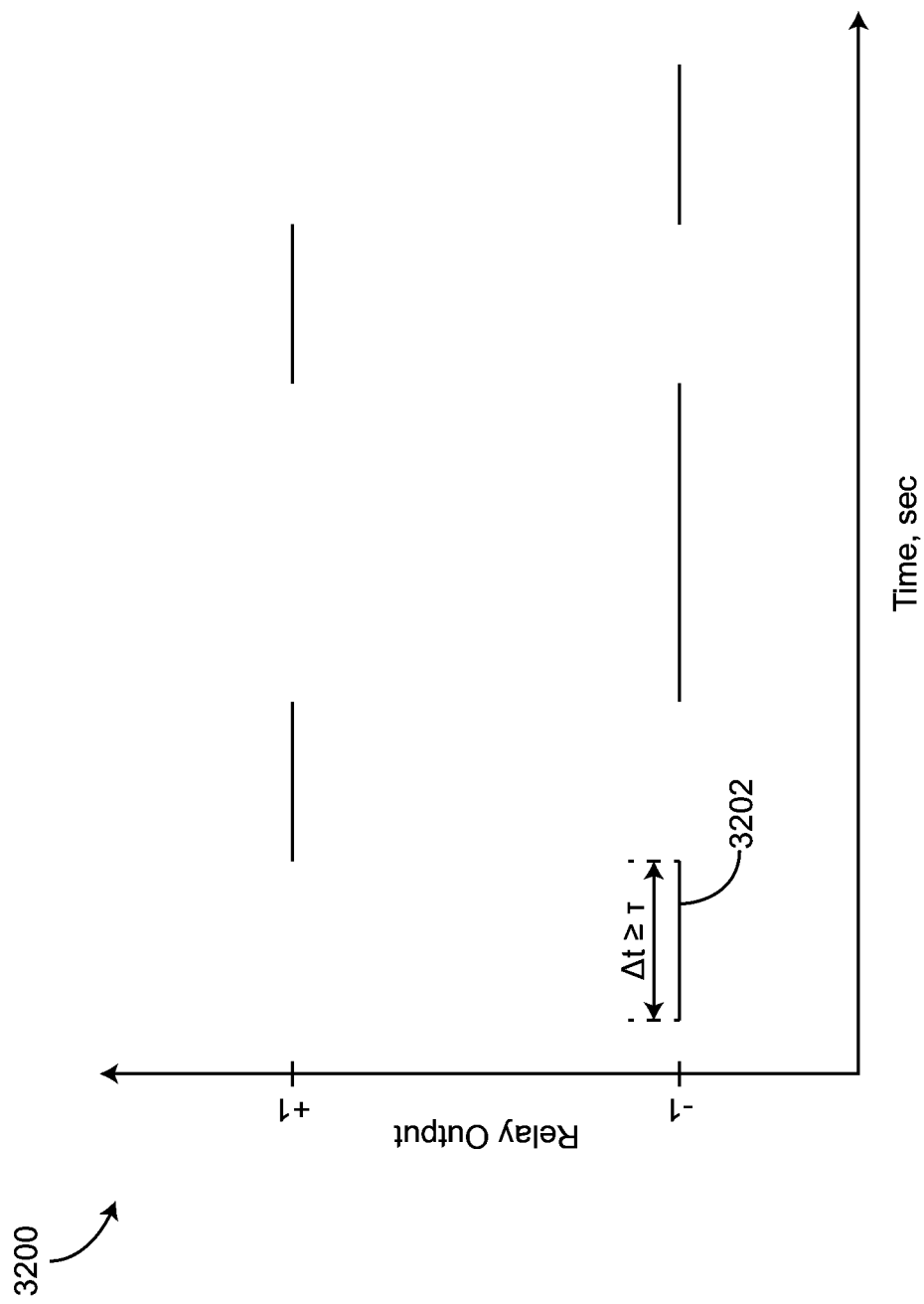
FIG. 31 is a graph of a discontinuous signal output by a relay of the self-perturbing extremum-seeking control system of FIG. 17, 18, or 20, according to some embodiments.

Referring particularly to FIG. 31, a graph 3200 includes a discontinuous series 3202 illustrating the output of relay 1818 (e.g., the value of the sign $\varepsilon$), according to some embodiments. As illustrated by series 3202, the output of relay 1818 is discontinuous and transitions between a value of +1 and a value of −1 over time. The output of relay 1818 may be held or maintained at the value of +1 or −1 for a time $\Delta t$ that is greater than or equal to the threshold $\tau_p$ since a previous change of the output of the relay 1818. Advantageously, the discontinuous output of the relay 1818 facilitates eliminating a need for an external or continuous perturbation signal. Although the output of relay 1818 is shown as +1 and −1, it should be appreciated that the output of relay 1818 can switch between any two values (e.g., −5 and +5, −1 and +4, etc.). In some embodiments, one of the two values is positive and the other of the two values is negative. This causes the control input to be adjusted in a first direction (e.g., positive or negative) if the sign of the gradient of the performance variable is positive and causes the control input to be adjusted in a second direction opposite the first direction if the sign of the gradient of the performance variable is negative.

Referring again to FIG. 18, the output of the relay 1818 is then passed through a gain block 1816 (e.g., a gain $M_0$) before being provided to an integrator block 1802, according to some embodiments. In some embodiments, the integrated output of the relay 1818 is then provided to a zero order hold (ZOH) block and provided to plant 1806 as a control input. The output of relay 1818 thus moves the plant input with a slope of $M_0$ in either a positive or a negative direction depending on the sign $\varepsilon_k$ of the gradient. The sign of the gain block 1816 (e.g., the sign of $M_0$) controls whether the self-perturbing extremum-seeking control system minimizes or maximizes the performance variable function J, according to some embodiments. In some embodiments, the performance variable function J is minimized when $M_0 < 0$ and is maximized when $M_0 > 0$.

Other ESC control systems use demodulation or perform regressions on J and u (e.g., the performance variable with respect to the input of the plant). However, using relay 1818 facilitates a simple technique to estimate the gradient based on the time derivative of the performance variable function, according to some embodiments. The gradient, G, is obtained via application of the chain rule:

$$G = \frac{\dot{j}}{\dot{u}} \tag{23}$$

according to some embodiments. Since the self-perturbing extremum-seeking control system shown in FIG. 18 only uses the sign of the gradient G, applying the chain rule yields:

$$\mathrm{sgn}[G] = \frac{\mathrm{sgn}[\dot{J}]}{\mathrm{sgn}[\dot{u}]} \tag{24}$$

which reduces to:

$$\mathrm{sgn}[G] = \mathrm{sgn}[\dot{j}]\mathrm{sgn}[\dot{u}] \tag{25}$$

according to some embodiments. The gradient G is determined at block 1812 using any of Equations (23)-(25) shown above. For example, block 1812 may be a multiplication block, a division block, or any other operation block that outputs a first type of value (e.g., a positive value) if $\dot{j}$ and $\dot{u}$ have a same sign (e.g., both are positive or both are negative), and outputs a second type of value (e.g., a negative value) if $\dot{j}$ and $\dot{u}$ have different signs (e.g., one is positive and the other is negative or vice versa).

As shown in FIG. 18, the output of relay 1818, $\varepsilon_k$ (the sign of the gradient G at timestep k) is passed through gain block 1816 and an integrator 1802 before being provided to plant 1806 as the control input u. This indicates that the input to the integrator 1802 represents u̇, according to some embodiments. In discrete time, this indicates:

$$\text{sgn}[G]_k = \text{sgn}[\dot{J}_k]\text{sgn}[\Delta u_{k-1}] \qquad (26)$$

where $\text{sgn}[G]_k$ is the sign of the performance variable function at timestep k, $\text{sgn}[\dot{J}_k]$ is the sign of the time derivative of the performance variable J at timestep k, and $\text{sgn}[\Delta u_{k-1}]$ is the sign of the control input u at a previous timestep k−1, according to some embodiments. In some embodiments, the gradient G can be estimated from the sign of the time derivative of the performance variable J and the previous value of Δu.

In some embodiments, the derivative estimator 1810 is configured to use a Savitzky-Golay method to estimate the derivative, which is more resistant to noise and is based on a moving window of samples:

$$\hat{\dot{J}}_k = \sum_{i=k-m}^{k} c_i J_i \qquad (27)$$

where $c_i$ are fixed coefficients and m is a window size. In some embodiments, the window size m determines the estimation time span which is shorter than the time constant $\tau_p$ of the plant 1806. For example, the window size m may be: $m = \tau_p/n$ where $2 \le n \le 10$ (as a suggested or possible range for n). Since the self-perturbing extremum-seeking control system shown in FIG. 18 requires only the sign of the derivative of the performance variable J, less data is required to estimate the sign of the gradient than to determine the full gradient (e.g., using other techniques such as demodulation or regression). Advantageously, the reduced data requirements of the self-perturbing extremum-seeking control system shown in FIG. 18 facilitate reduced processing requirements of ESC controller 1850 and facilitate improved convergence speed.

The estimated gradient G represents the gradient of the static non-linear map of plant 1806, and thus a rate of change in u(t) must be sufficiently slow so that the dynamics of plant 1806 are negligible, according to some embodiments. In some embodiments, the excitation of plant 1806 is limited to low frequency excitation to ensure that the dynamics of plant 1806 are negligible.

In some embodiments, a hold time is imposed on the relay 1818 (e.g., the hold block 1820) so that hold block 1820 of relay 1818 holds its current state for a minimum time period. For example, if the hold time in hold block 1820 is set to $\tau_p$, then the maximum frequency may be limited to $$\frac{1}{2\tau_p}.$$

Using relay 1818 may result in persistent excitation of plant 1806, thereby providing a self-perturbing extremum-seeking control system and reducing or removing the need for an artificially produced dither or excitation signal.

The output ∈ of the relay 1818 represents the sign of the gradient G, according to some embodiments. In some embodiments, the sign ∈ of the gradient G is scaled by a gain $M_0$ (at gain block 1816) before being integrated at integrator 1802 and transformed into a continuous-time signal at ZOH block 1804. The continuous-time signal u is then provided to plant 1806 as the control input. The output of gain block 1816

$$\left(\text{i.e., } \frac{\Delta u_k}{\Delta t}\right)$$

is then provided to multiplier 1812 before being delayed at delay block 1814.

In some embodiments, the operational range of the control input u is bounded $0 \le u \le 1$. The gain parameter $M_0$ may be based on the first parameter $\tau_p$ to limit a rate of change of the plant control input u and maintain time-scale separation. For example, the value of the gain parameter $M_0$ is:

$$M_0 = \pm \frac{1}{10\tau_p} \qquad (28)$$

according to some embodiments. Using the value of the gain parameter $M_0$ as shown in Equation (28) above would limit the rate of change of the control input u for plant 1806 so that it would take 10 time constants $\tau_p$ to move the control input u across its entire range. For the value of the gain parameter $M_0$ shown in Equation (28) above, the amplitude of the control input signal u perturbation would be 10% of its range. In some embodiments, if the plant 1806 reaches a natural limit cycle that exceeds the period enforced by hold time of relay 1818 or hold block 1820, the amplitude of the perturbation may increase and this may indicate that the value of $\tau_p$ should be increased.

Advantageously, the self-perturbing extremum-seeking control system shown in FIG. 18 can be easily configured from the time constant $\tau_p$ (e.g., the first parameter) of the plant 1806, and the range $J_r$ of the performance variable J. In some embodiments, a high value of the gain parameter $M_0$ at gain block 1816 results in a faster convergence but larger steady-state oscillations. Likewise, a lower value of the gain parameter $M_0$ at gain block 1816 results in a slower convergence but smaller steady-state oscillations, according to some embodiments. In some embodiments, the value of the gain parameter $M_0$ at gain block 1816 may be adaptively and/or automatically adjusted to facilitate fast convergence and smaller stead-state oscillations. For example, the value of the gain parameter $M_0$ may initially be high so that the self-perturbing extremum-seeking control system converges rapidly, and may be decreased when the self-perturbing extremum-seeking control system converges to facilitate smaller or negligible oscillations at steady-state.

Adaptive Gain Loop

Referring particularly to FIG. 19, a system 1900 for adaptively adjusting, updating, increasing, decreasing, controlling, etc., the value of the gain parameter $M_0$ of gain block 1816 is shown. System 1900 includes the gain block 1816, a summation block 1904, a saturation block 1906, a range gain block 1908, a division block 1910, a delay block 1914, and an absolute value block 1912.

The value of the gain parameter $M_0$ may be adjusted based on a state variable x and an incremental or small value δ. For example, system 1900 may output an updated value $M_k$ of the gain parameter $M_0$:

$$M_k = M_0(|x| + \delta) \qquad (29)$$

according to some embodiments. The state variable x may be an estimation $\hat{G}$ of the gradient G. An absolute value of the estimation of the gradient G can be obtained by substituting $\epsilon M_k$ (the sign of the gradient G multiplied by the updated gain parameter $M_k$), and applying the chain rule:

$$|\hat{G}| = \frac{|\hat{J}|}{|\dot{u}|} \quad (30)$$

$$|\hat{G}| = \frac{|\hat{J}|}{|\epsilon M_k|} \quad (31)$$

$$|\hat{G}| = \frac{|\hat{J}|}{|M_k|} \quad (32)$$

according to some embodiments. It should be noted that the sign $\epsilon$ drops out of Equation (31) since $|\epsilon|=1$, according to some embodiments. A normalized version $\tilde{J}$ of the estimated time derivative $\hat{J}$ is calculated using the range $J_r$:

$$\tilde{J} = \frac{\hat{J}}{J_r} \quad (33)$$

according to some embodiments. Substituting $\tilde{J}$ for $\hat{J}$ in Equation (32) yields a normalized gradient $\tilde{G}$ (since the bounded control input u is also normalized):

$$|\tilde{G}| = \frac{\tilde{J}}{|M_k|} \quad (34)$$

$$|\tilde{G}| = \frac{\hat{J}}{J_r|M_k|} \quad (35)$$

according to some embodiments.

The updated gain parameter $M_k$ can be formulated at a sample k using the following Equation:

$$M_k = M_0 \left( \frac{\hat{J}}{J_r|M_{k-1}|} + \delta \right) \quad (36)$$

where $J_{r_k}$ is the range (e.g., expressed in Equation (22) above), $|\hat{J}|$ is an absolute value of the estimate of the time derivative of the performance variable, and $|M_{k-1}|$ is an absolute value of a previous value (e.g., at timestep k−1) of the updated gain parameter, according to some embodiments.

Adjusting the gain parameter $M_k$ is performed by multiplying the sign $\epsilon$ of the gradient G by the magnitude of the normalized gradient $\tilde{G}$. For example, the control input u may be given by:

$$u_k = u_{k-1} + \Delta t M_0 \text{sgn}[G_k][\tilde{G}_k + \delta] \quad (37)$$

$$u_k = u_{k-1} + \Delta t M_0 \tilde{G}_k, \text{ for } \delta \to 0 \quad (38)$$

where $u_{k-1}$ is the control input to the plant at a previous timestep (e.g., at k−1), $\Delta t$ is a time duration or a time interval (e.g., between subsequent time steps), and $\tilde{G}_k$ is the normalized gradient at timestep k. Equation (38) shown above is therefore a gradient-descent procedure that has a fixed step size of $\Delta t M_0$. Convergence may occur if the step size satisfies $$\Delta t M_0 \leq \frac{1}{L},$$

where L is a Lipschitz constant. In some embodiments, this can be verified to be true using a general class of static non-linear functions H(u):

$$H(u) = d^c + b \quad (39)$$

$$d = |u - u^*| \quad (40)$$

where $0 \leq u^* \leq 1$ is the optimal point in the input space, $c \in \mathbb{R}_{>1}$ and b is a constant. The range of the performance variable defined in Equation (39) can be deduced to $H_r = H_{max} - H_{min} = d_{max}^c$ since $H_{max} = d_{max}^c + b$ and $H_{min} = b$.

The Lipschitz constant that corresponds to the maximum (magnitude) of the derivative of H(u) normalized by the performance variable function range $H_r$ within the bounded control input range is:

$$L = \frac{H'(u)}{H_r} \quad (41)$$

$$L = \frac{c d_{max}^{c-1}}{d_{max}^c} \quad (42)$$

$$L = \frac{c}{d_{max}} \quad (43)$$

where $0.5 \leq d_{max} \leq 1$.

Therefore, from a gradient-descent convergence standpoint, it should be ensured that:

$$\Delta t M_0 \leq \frac{1}{L} \quad (44)$$

$$\Delta t M_0 = \frac{d_{max}}{c} \quad (45)$$

according to some embodiments.

For an archetypal system where $d_{max}=0.5$ (the optimal point is in the middle of the bounded input range) and c=2 (e.g., locally quadratic), it follows that $$\Delta t M_0 \leq \frac{1}{4}.$$

For the value of the gain parameter $M_0$ shown in Equation (28) above:

$$\frac{\Delta t}{\tau_p 10} \leq \frac{1}{4} \quad (46)$$

where the sample period $\Delta t \ll \tau_p$ to ensure sufficient data are available to accurately estimate the time derivative, according to some embodiments.

In some embodiments, an optimum step size may depend on a location of the optimum control input u* in the bounded input range and also on the convexity of the static non-linearity of plant 1806.

Referring still to FIG. 19, the adaptive gain system 1900 receives an estimate $\hat{J}_k$ of the time derivative of the performance variable J and obtains, calculates, estimates, etc., an absolute value of the estimate $\hat{J}_k$ at absolute value block

1912. The absolute value of the estimate $|\hat{J}_k|$ is then provided to division block 1910, where the absolute value of the estimate $|\hat{J}_k|$ is divided by an absolute value or magnitude of a previous value $|M_{k-1}|$ of the adjustable gain parameter $M_k$. In some embodiments, $$\frac{|\hat{J}_k|}{|M_{k-1}|}$$

(the output of division block 1910) is then divided by the range $J_r$ (e.g., by multiplying $$\frac{|\hat{J}_k|}{|M_{k-1}|}$$

by $1/J_r$ at range gain block 1908) to obtain $$\frac{|\hat{J}_k|}{J_r|M_{k-1}|}.$$

The estimated range of J and the adjustable gain parameter $M_k$ are bounded by saturation block 1906 such that:

$$\frac{|\hat{J}_k|}{J_r|M_{k-1}|} \leq 1 \qquad (47)$$

according to some embodiments. In some embodiments, saturation block 1906 outputs a value of 1 if $$\frac{|\hat{J}_k|}{J_r|M_{k-1}|}$$

is equal to or greater than 1, and outputs a value of 0 if $$\frac{|\hat{J}_k|}{J_r|M_{k-1}|}$$

is less than or equal to 0.

The output of the saturation block 1906 is then provided to summation block 1904, where the incremental amount δ is added, according to some embodiments. Saturation block 1906 may cause the condition $\delta|M_0| \leq |M_k| \leq (1+\delta)|M_0|$ to be true. In some embodiments, adding the incremental amount δ to the output of saturation block 1906 facilitates enforcing a minimum gain so that persistent excitation of the plant is maintained (e.g., so that the adjustable gain parameter $M_k$ does not become zero). The incremental amount or value δ also provides a minimum amplitude of variation in the plant control input u of $\delta M_0 \tau_p$ and can thus be set according to tolerable minimum variations.

In some embodiments, the output of the saturation block 1906 is $$\frac{|\hat{J}_k|}{J_r|M_{k-1}|}$$

and the incremental value or amount δ is added to $$\frac{|\hat{J}_k|}{J_r|M_{k-1}|}$$

at summation block 1904 such that summation block 1904 outputs $$\frac{|\hat{J}_k|}{J_r|M_{k-1}|} + \delta.$$

In some embodiments, the output of summation block 1904 is then provided to gain block 1816, where it is multiplied by the gain parameter $M_0$ to obtain $$\left(\frac{|\hat{J}_k|}{J_r|M_{k-1}|} + \delta\right) M_0$$

which is equal to the adjustable gain parameter $M_k$ (shown in Equation (36) above). In some embodiments, the adjustable gain parameter $M_k$ at timestep k is then provided to delay block 1914, and used for subsequent calculations of the adjustable gain parameter (e.g., to calculate the adjustable gain parameter at a next timestep k+1). In some embodiments, the adjustable gain parameter $M_k$ is provided to an optional absolute value block 1912 before being provided to division block 1910 for use in determining or calculating the next value of the adjustable gain parameter $M_k$.

Self-Perturbing Extremum-Seeking Control with Holding Relay and Adaptive Gain Loop Referring now to FIG. 20, system 2000 illustrates a self-perturbing extremum-seeking control system including the functionality and components of the system 1800 and the system 1900. Specifically, the self-perturbing extremum-seeking control system 2000 includes a holding relay and an adaptive gain loop. The output of the derivative estimator 1810 of system 1800 is provided as the input to the adaptive gain loop represented by system 1900. The output of the adaptive gain loop is then provided to a multiplication block 2002, so that the output of the relay 1818 (e.g., the sign $\in_k$) is multiplied by the adjustable gain parameter $M_k$ to determine the time derivative of the control input u $$\left(\text{e.g., } \frac{\Delta u_k}{\Delta t}\right).$$

Advantageously, the self-perturbing extremum-seeking control system shown in FIG. 20 can be completely configured using the two parameters $\tau_p$ and $J_r$ of the plant 1806. The gain parameter $M_0$ (e.g., the non-adaptive parameter) can also be tuned as described in greater detail above with reference to FIG. 18. In some embodiments, the value of the gain parameter $M_0$ is $$M_0 = \pm \frac{1}{10\tau_p}.$$

In some embodiments, in the calculation of $\hat{J}$, the window size m (as shown in Equation (27) above) can be set to a fraction of the plant time constant $\tau_p$ such as:

$$m = \left[\frac{\tau_p}{n}\right]$$

and $2 \leq n \leq 10$. It should be understood that the incremental amount $\delta$ may also be selected (e.g., $\delta=0.01$, $\delta=0.1$, etc.) as any value that is greater than 0 (e.g., by a very small amount) to facilitate constant or persistent excitation of plant 1806.

Advantageously, the self-perturbing extremum-seeking control system shown in FIG. 20 does not require an artificially generated dither signal, does not a require a model of plant 1806, and can adaptively adjust or update the adaptive gain parameter $M_k$ to facilitate faster or improved convergence when the control input u is distant from the optimum control input u*, and reduced oscillations when the control input u is at or near or converging upon the optimum control input u*.

Test Results

Figure 21:
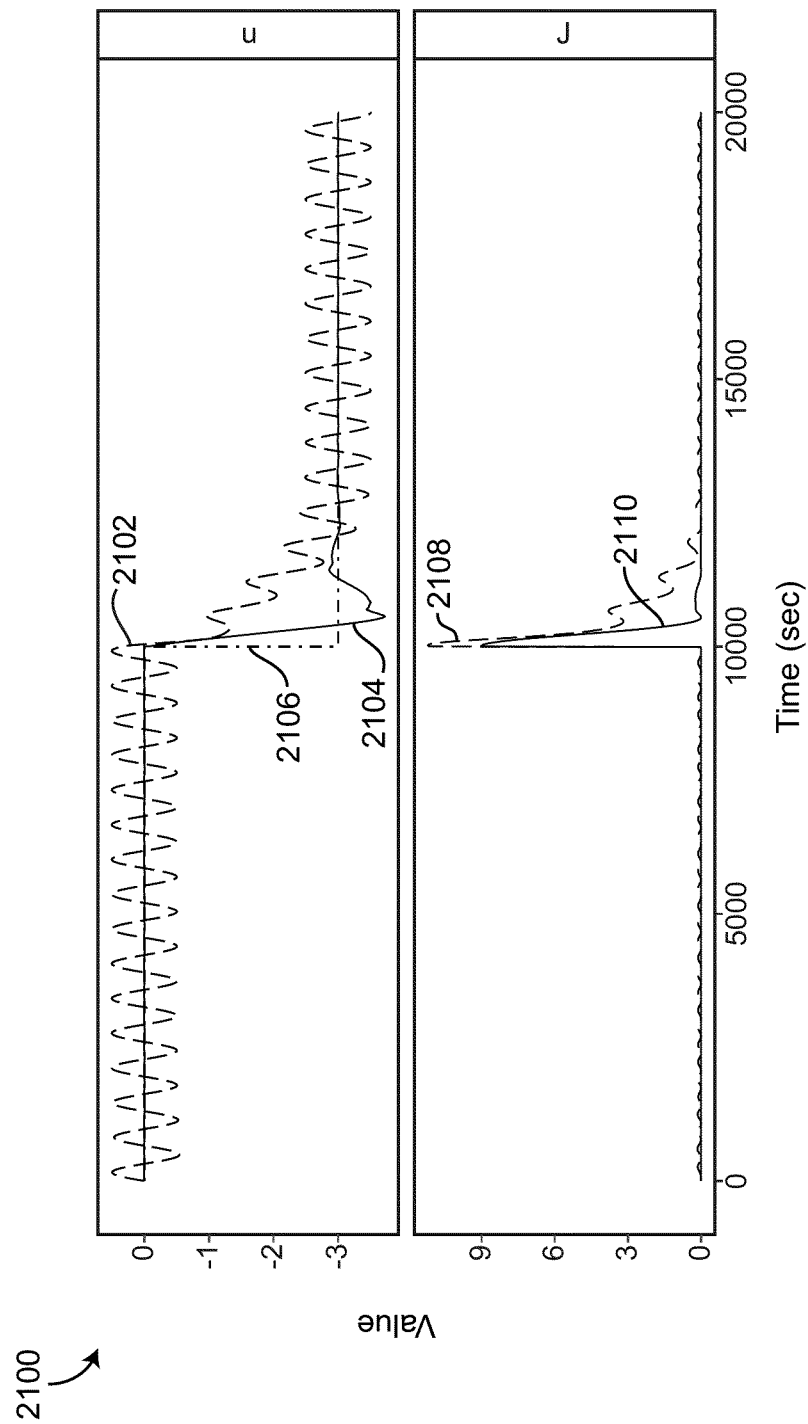
FIG. 21 is a graph showing an input of a plant and a performance variable of the plant over time for the self-perturbing extremum-seeking control system of FIG. 20 and a dither-signal based extremum-seeking control system, according to some embodiments.
Figure 22:
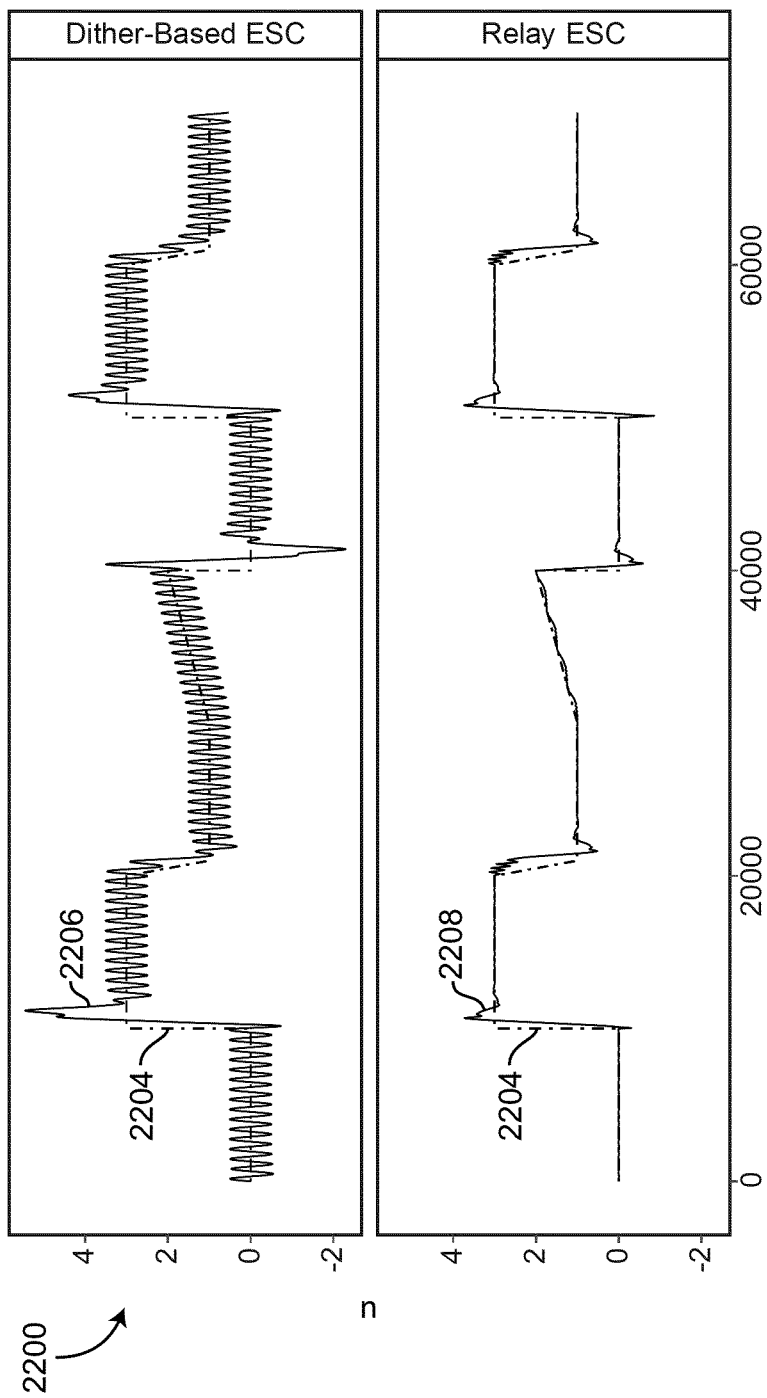
FIG. 22 is a graph showing an input of a plant over time for the self-perturbing extremum-seeking control system of FIG. 20 and a dither-signal based extremum-seeking control system for a changing optimal input, according to some embodiments.
Figure 23:
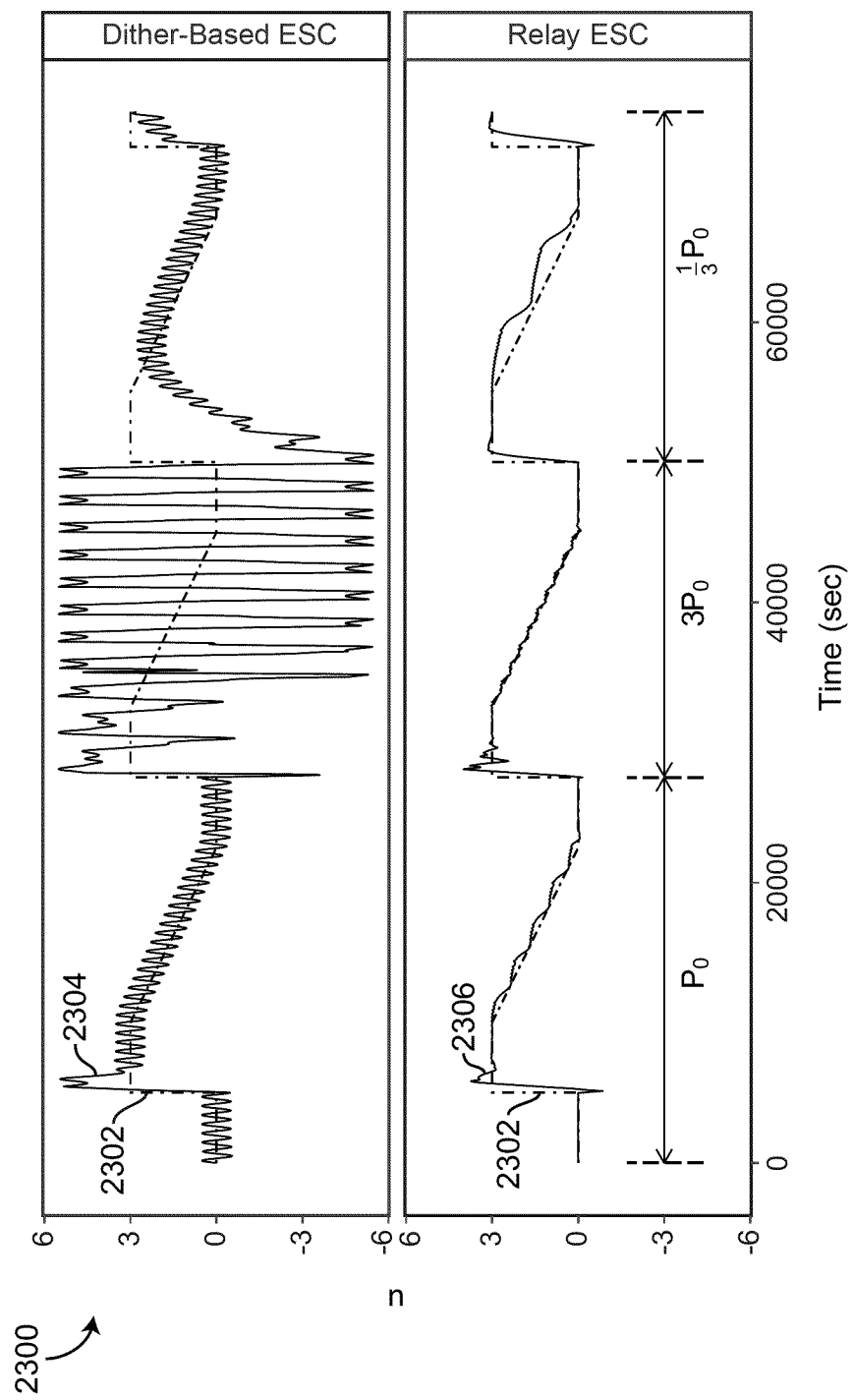
FIG. 23 is a graph showing an input of a plant over time for the self-perturbing extremum-seeking control system of FIG. 20 and a dither-signal based extremum-seeking control system when a gain of the plant changes over several time periods, according to some embodiments.

Referring particularly to FIGS. 21-23, various graphs show test results of the self-perturbing extremum-seeking control system of FIG. 20 as compared to traditional extremum-seeking control systems that use artificial dither signals to excite the plant. FIGS. 21-23 show simulation results for the self-perturbing extremum-seeking control system of FIG. 20. In the simulation, the plant (e.g., plant 1806) is based on a Wiener characterization having a linear dynamic part followed by a static non-linearity. For example, the plant 1806 is modeled for the simulation as having a static non-linearity of the form:

$$J(t) = P_0(u(t) - p(t))^2 \qquad (48)$$

where a default value of the parameter $P_0$ is 1. In some embodiments, the static non-linearity of the plant is preceded by a dynamic part with a linear transfer function as shown in Equation (49) below:

$$F(s) = \frac{1}{(\tau_1 s + 1)(\tau_2 s + 1)} \qquad (49)$$

where $\tau_1$ and $\tau_2$ are time constants of the plant (e.g., such that the plant in the simulation is second-order). For the simulation test, the first time constant has a value $\tau_1=100$ s and the second time constant has a value $\tau_2=30$ s. Second order dynamics of this sort may be typical in real-world HVAC systems. The parameter $\tau_p$ used to characterize the dynamics is $\tau_p = \tau_1 + \tau_2 = 130$ s, according to some embodiments.

In a first test, p(t) is a step function where p(t)=0 for t<$t_{step}$ and p(t)=−3 for t≥$t_{step}$. The optimum point starts at (J=0, u=0) and then steps to (J=0, u=−3), according to some embodiments. For the first test, the range of the plant control input u is −5≤u≤5 and a unity output from the extremum-seeking control system was mapped onto this range. The range of J is $J_r=25$ and the $M_0$ parameter was set to $-1/(10\tau_p)$ for the first test.

For a baseline comparison, a standard demodulation extremum-seeking control system with an artificially dither signal sin(ωt) was used. A dither amplitude of 5% of the input range with a period of $5\tau_p$ was used.

Referring particularly to FIG. 21, graph 2100 shows the control input u with respect to time and the performance variable J with respect to time for the first test, according to some embodiments. Graph 2100 includes series 2102 and series 2108 which illustrate the control input u and the performance variable J with respect to time for an ESC system that uses the dither signal described in greater detail above. Graph 2100 also includes series 2104 and 2110 which illustrate the control input u and the performance variable J with respect to time for the self-perturbing extremum-seeking control system of FIG. 20 (e.g., the relay-based extremum-seeking control system). Graph 2100 also includes series 2106 which illustrates the step input provided to both the dither-based ESC system and the self-perturbing extremum-seeking control system of FIG. 20.

As shown in FIG. 21, the self-perturbing extremum-seeking control system of FIG. 20 converges faster than the dither-based ESC system. The self-perturbing extremum-seeking control system of FIG. 20 has an integrated absolute performance variable function error $IAE = \int_{t_0}^{t_{end}} |J(t) - J_{opt}| dt$ of 3,549 (e.g., the area between series 2210 and the optimal performance to variable $J_{opt}$) as compared to 7,939 for the dither-based ESC system (e.g., the area between series 2108 and the optimal performance variable $J_{opt}$). Additionally, the self-perturbing extremum-seeking control system of FIG. 20 has reduced amplitude of oscillations about the optimal control input u after convergence, when compared to the dither-based ESC system. For the test results shown in FIG. 21, the incremental amount $\delta$ has a value of 0.005, thereby reducing the amplitude of the input to $|M_0| \times \delta = 0.0005$ of the control input range (e.g., $u_r = 10$).

Referring particularly to FIG. 22, graph 2200 illustrates the control input u (shown on the Y-axis) with respect to time (the X-axis) for dither-based ESC (shown in the top plot) and the self-perturbing extremum-seeking control system (relay based ESC, shown in the bottom plot), according to some embodiments. FIG. 22 represents test results when the optimum point is changed in a more complex manner including a series of steps and ramps.

Graph 2200 includes series 2204 which illustrates the optimum control input u* with respect to time (e.g., changing over time according to steps, ramps, etc.). Graph 2200 also includes series 2208 which illustrates the control input u of the self-perturbing extremum-seeking control system 2000 of FIG. 20 over time. Graph 2200 also includes series 2206 which illustrates the control input u of the dither-based ESC with respect to time. As shown in FIG. 22, the self-perturbing extremum-seeking control system 2000 of FIG. 20 tracks the changes in the optimum control input u* better than the dither-based ESC system (e.g., less overshoot). Additionally, the self-perturbing extremum-seeking control system 2000 of FIG. 20 does not oscillate about the optimum control input u* after convergence as the dither-based ESC system does. For the test shown in FIG. 22, the integrated absolute error for series 2206 is 28,510, while the integrated absolute error for series 2208 is 13,380.

Referring particularly to FIG. 23, graph 2300 shows an effect that changing a gain of the plant (e.g., the Wiener characterization n described in greater detail above) has on the control input u for both the dither-based ESC system and the self-perturbing extremum-seeking control system 2000 shown in FIG. 20. For the test shown in FIG. 23, the parameter $P_0$ (shown in Equation (48) above) is varied across several time intervals. Over the first time interval (0 to 25,000 seconds), the parameter $P_0$ is set to the default value of 1. Over the second time interval (25,000 to 50,000 seconds), the parameter $P_0$ is set to 3. Over the third time interval (50,000 to 75,000 seconds), the parameter $P_0$ is set to ⅓.

Graph 2300 includes a series 2302 that illustrates the optimum control input u* over time, a series 2304 that illustrates the control input u for the dither-based ESC system, and a series 2306 that illustrates the control input u for the self-perturbing extremum-seeking control system 2000 of FIG. 20. As shown in FIG. 23, the dither-based ESC system becomes unstable when the gain parameter $P_0$ is increased to $3P_0$ over the second time interval. However, the self-perturbing extremum-seeking control system 2000 of FIG. 20 (the relay-based extremum-seeking control system 2000) does not become unstable over the second time interval when the gain parameter $P_0$ is increased.

Figure 24:
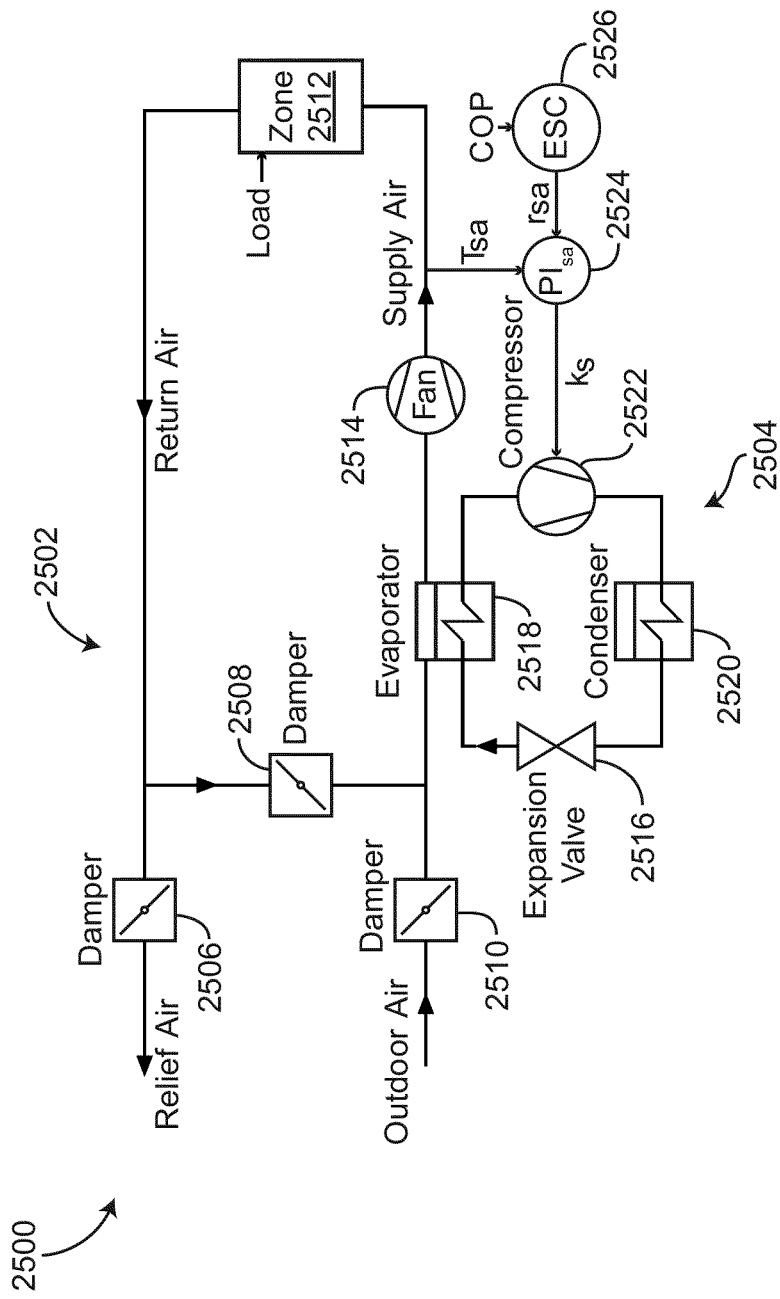
FIG. 24 is a block diagram of an air conditioning system for a test of the self-perturbing extremum-seeking control system of FIG. 20, according to some embodiments.

Referring particularly to FIG. 24, an air-conditioning system 2500 is shown, according to some embodiments. Air-conditioning system 2500 includes a cold air loop 2502, and a coolant loop 2504. Cold air loop 2502 includes dampers 2506-2510, a fan 2514, and a zone 2512, fluidly coupled with each other through various conduits as shown. Cold air loop 2502 and coolant loop 2504 are fluidly coupled with each other through an evaporator 2518. In some embodiments, cold air loop 2502 receives outdoor air at damper 2510, mixes the outdoor air with return air passed through damper 2508, and provides the mixed air to evaporator 2518. Heat is drawn out of the mixed air to a coolant that is circulated through coolant loop 2504. The cooled mixed air is then provided to fan 2514, which provides supply air having a supply air temperature $T_{sa}$ to zone 2512 for cooling.

The coolant loop 2504 includes evaporator 2518, a compressor 2522, a condenser 2520, and an expansion valve 2516, fluidly coupled with each other through conduit. Compressor 2522 is configured to drive a coolant through the coolant loop 2504 (e.g., through the condenser 2520, the expansion valve 2516, and then the evaporator 2518).

In some embodiments, air-conditioning system 2500 includes an extremum-seeking controller 2526 that is configured to implement the self-perturbing extremum-seeking control system 2000 of FIG. 20. Extremum-seeking controller 2526 can receive a coefficient of performance (COP) of the air-conditioning system 2500 and output a supply air temperature setpoint, shown as $r_{sa}$. Extremum-seeking controller 2526 may provide the supply air temperature setpoint $r_{sa}$ to a PI controller 2524. PI controller 2524 receives the supply air temperature $T_{sa}$ from a sensor downstream of the fan 2514, according to some embodiments, or before the supply air is provided to zone 2512.

The evaporator 2518 is one component of a basic vapor compression cycle air-conditioning system. Air flowing over fins of the evaporator 2518 transfer heat to the refrigerant flowing through tubes of the evaporator 2518, causing the liquid refrigerant of the coolant loop 2504 to evaporate. Refrigerant in a vapor state is then passes through compressor 2522, where it is compressed to a higher pressure and temperature before passing through condenser 2520. In the condenser 2520, the refrigerant rejects heat to the ambient air as it is condensed back to a liquid state. The refrigerant is then passed through expansion valve 2516 where the pressure decreases according to an isenthalpic process.

In some embodiments, air-conditioning system 2500 includes three PI controllers. One PI controller is used to modulate the expansion valve 2516 to maintain the superheat temperature (defined as a temperature different between the refrigerant and its saturation temperature) on a suction side of compressor 2522 above zero to prevent liquid refrigerant from entering compressor 2522. A second PI controller modulates the speed of compressor 2522 to maintain the supply air temperature $T_{sa}$ at the setpoint $r_{sa}$. A third PI controller controls a speed of the fan 2514 to satisfy the setpoint temperature in the zone 2512. The airflow rate over the condenser 2520 is typically controlled to prevent excessive compressor discharge pressure. In the test performed herein, the airflow rate is set to a constant value.

Figure 25:
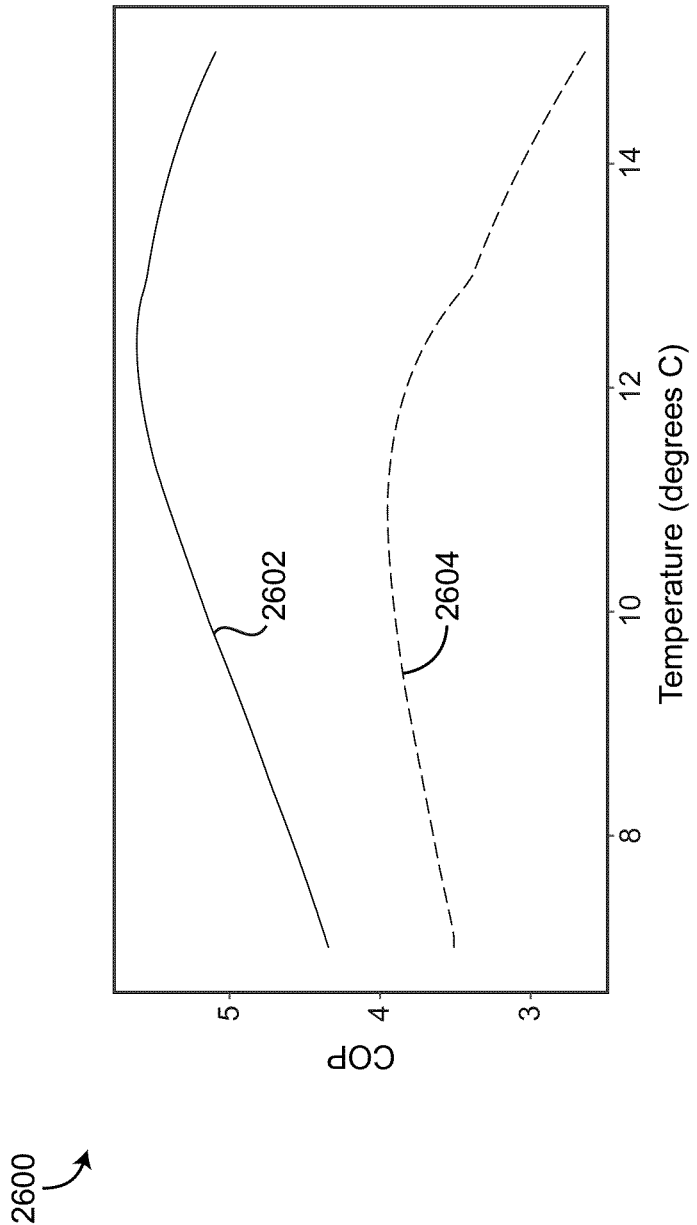
FIG. 25 is a graph showing a coefficient of performance of the air conditioning system of FIG. 24 over time, when operated by the self-perturbing extremum-seeking control system of FIG. 20, according to some embodiments.
Figure 26:
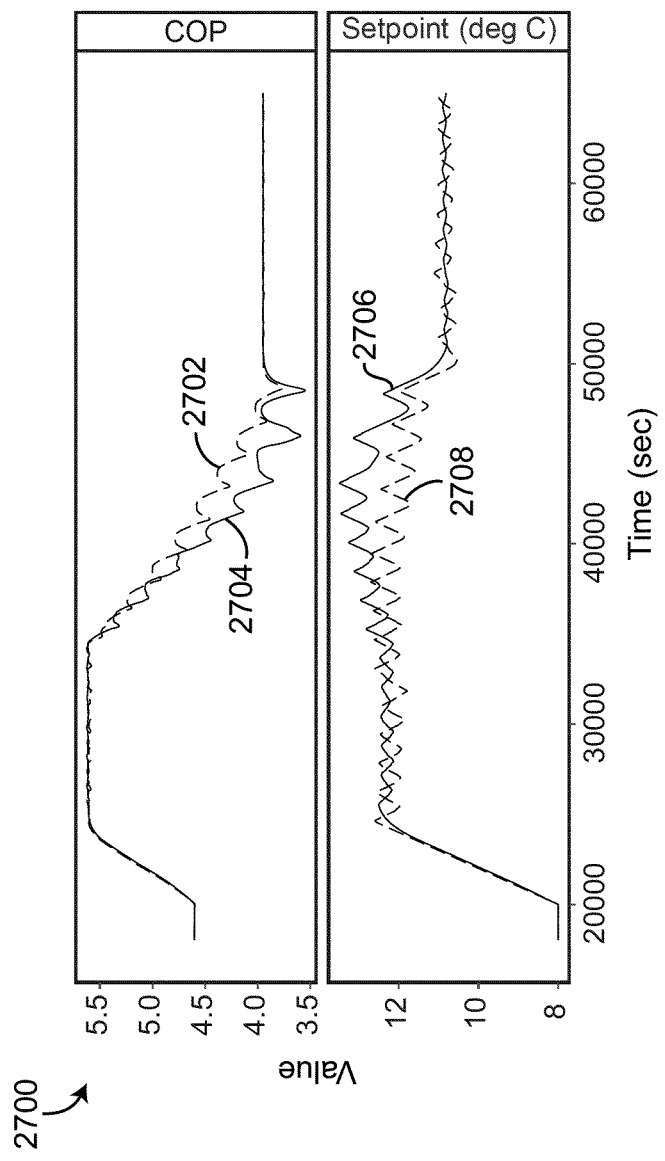
FIG. 26 is a graph showing a coefficient of performance and a setpoint of the air conditioning system of FIG. 24 over time, when operated by the self-perturbing extremum-seeking control system of FIG. 20, according to some embodiments.

A dynamic model of air-conditioning system 2500 was developed and tests are performed to generate graphs 2600 and 2700 shown in FIGS. 25 and 26. Referring particularly to FIGS. 25 and 26, graphs 2600 and 2700 show test results from performing a simulation of air-conditioning system 2500 with outdoor temperature of 30° C. and relative humidity of 35%. A cooling load on zone 2512 is 2400 Watts for the first five hours of the simulation. After the first five hours of the simulation, the cooling load on zone 2512 is then linearly increased to 4000 Watts over the next four hours and remains at 4000 Watts for the rest of the simulation. The superheat temperature is controlled to a constant value of 6° C. and the room temperature is controlled to a constant value of 24° C. The supply air temperature setpoint is adjusted by the self-perturbing extremum-seeking control system 2000 of FIG. 20 (the relay-based ESC system) to maximize the COP of the air-conditioning system 2500. The COP of air-conditioning system 2500 is defined as a ratio between the cooling performed in the evaporator 2518 and power required to achieve that cooling. The power used in the calculation of the COP is the sum of the power used by compressor 2522 and evaporator 2518. In some embodiments, the optimization problem is a trade-off of compressor power and evaporator fan power while ensuring that the load on evaporator 2518 is satisfied.

Referring particularly to FIG. 25, graph 2600 shows maps of the air-conditioning system 2500 at the initial (2400 Watts) and final (4000 Watts) load conditions, according to some embodiments. The static maps are obtained by calculating the steady-state value of the COP of the air-conditioning system 2500 as the supply air temperature $T_{sa}$ is stepped from 7° C. to 15° C. in 0.1° C. increments. The static map for a 2400 Watt load (represented by series 2602) shows that the COP is maximized at a value of approximately 5.62, corresponding to a supply air setpoint temperature of approximately 12.4° C. (shown on the X-axis). For a load of 4000 Watts (represented by series 2604), the COP is maximized at a value of 3.95 at a supply air setpoint temperature of approximately 10.9° C.

Referring particularly to FIG. 26, a graph 2700 shows the performance of the self-perturbing extremum-seeking control system 2000 of FIG. 20 for air-conditioning system 2500 for two different values of the performance variable function range parameter $J_r$, according to some embodiments. Graph 2700 shows the COP of air-conditioning system 2500 over time and the supply air temperature setpoint $r_{sa}$ over time. Graph 2700 includes series 2702 and series 2708 which illustrate the COP and the supply air temperature setpoint $r_{sa}$ over time, respectively, for $J_r$=0.5. Graph 2700 also includes series 2704 and 2706 that illustrate the COP and the supply air temperature setpoint $r_{sa}$ over time, respectively, for $J_r$=2.

For the test results shown in graph 2700, the time constant $\tau_p$ of the system 2000 is set to 800 seconds and the minimum and maximum values of the manipulated variable u (the supply air temperature setpoint) are 7 and 15 degrees Celsius. The self-perturbing extremum-seeking control system 2000 of FIG. 20 was configured to maximize the COP of air-conditioning system 2500 by giving the gain parameter $M_0$ a positive sign and setting $$M_0 = \frac{1}{10\tau_p}.$$

The simulation is initialized with a supply air temperature setpoint $r_{sa}=8°$ C. For the first hour of the simulation, the self-perturbing extremum-seeking control system 2000 of FIG. 20 is inactive and the air-conditioning system 2500 is allowed to achieve steady state. After an hour, the self-perturbing ESC system is activated. As shown in FIG. 26, the self-perturbing ESC system 2000 (shown in FIG. 20) converges to a neighborhood of the optimum setpoint temperature after approximately 4,000 seconds after the self-perturbing ESC system is activated. This convergence speed equates to approximately five times the estimated open loop time constant of air-conditioning system 2500.

Dither-Based ESC System

Figure 28:
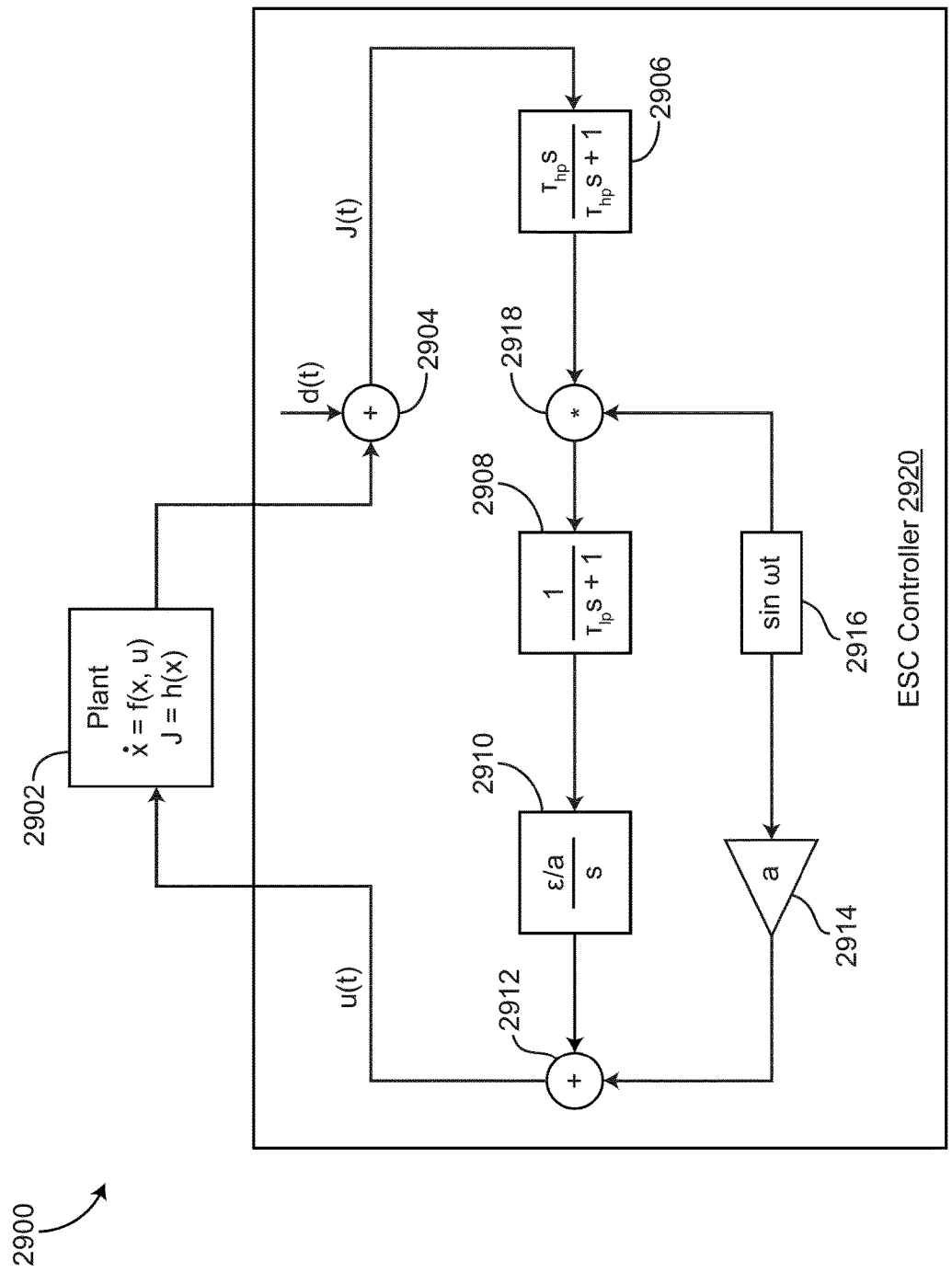
FIG. 28 is a block diagram of a dither-based extremum seeking controller, according to some embodiments.

Referring particularly to FIG. 28, a dither-based ESC system 2900 is shown, according to some embodiments. In some embodiments, dither-based ESC system 2900 includes a dither-based ESC controller 2920 and a plant 2902. Plant 2902 may be the same as or similar to plant 1806, plant 902, static plant 1005, dynamic plant 1004, plant 702, etc. ESC controller 2920 is a dither-based ESC controller and includes a sinusoidal wave generator 2916 that is configured to generate a dither signal. In some embodiments, the dither signal is provided to gain block 2914 to achieve a $\sin(\omega t)$. The dither signal a $\sin(\omega t)$ is then provided to summation block 2912.

ESC controller 2920 obtains values of the performance variable J from the plant 2902, according to some embodiments. In some embodiments, ESC controller 2920 provides a disturbance d (t) to the values of the performance variable J obtained from the plant 2902 at disturbance block 2904. In some embodiments, the performance variable J(t) that is obtained by ESC controller 2920 includes a disturbance d (t). The performance variable J(t) is then provided to transformation block 2906, according to some embodiments. The performance variable multiplied by the transfer function of transformation block 2906 is then multiplied or excited by the dither signal $\sin(\omega t)$ at multiplication block 2920. The signal is then provided to transformation block 2908 and integrator 2910, according to some embodiments. The signal is then added to the dither signal a $\sin(\omega t)$ at summation block 2912 to generate the input u(t), according to some embodiments. The test results shown in FIGS. 21-23 and 25-26 that refer to "dither-based" ESC result from performing ESC with ESC controller 2920 or a similar ESC.

Adaptive Gain ESC Controller

Figure 29:
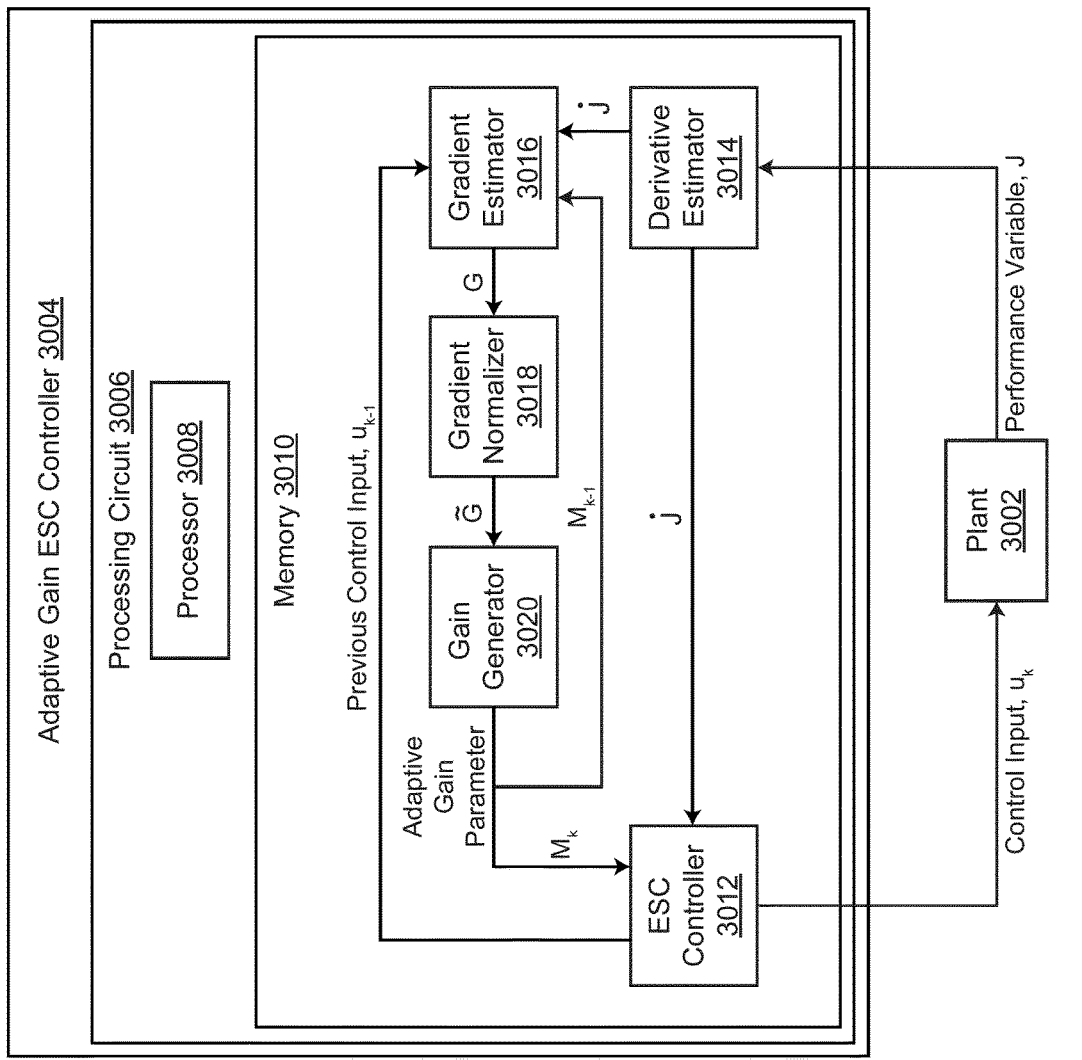
FIG. 29 is a block diagram of an adaptive gain extremum seeking controller, according to some embodiments.

Referring particularly to FIG. 29, a block diagram of a system 3000 includes a plant 3002 and an adaptive gain ESC controller 3004, according to some embodiments. In some embodiments, adaptive gain ESC controller 3004 is the same as or similar to ESC controller 1850 or ESC controller 1002.

Adaptive gain ESC controller 3004 is shown to include a processing circuit 3006 including a processor 3008 and memory 3010. Processing circuit 3006 can be communicably connected to a communications interface such that processing circuit 3006 and the various components thereof can send and receive data via the communications interface. Processor 3008 can be implemented as a general purpose processor, an application specific integrated circuit (ASIC), one or more field programmable gate arrays (FPGAs), a group of processing components, or other suitable electronic processing components.

Memory 3010 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 3010 can be or include volatile memory or non-volatile memory. Memory 3010 can include database components, object code components, script components, or any other type of information structure for supporting the various activities and information structures described in the present application. According to some embodiments, memory 3010 is communicably connected to processor 3008 via processing circuit 3006 and includes computer code for executing (e.g., by processing circuit 3006 and/or processor 3008) one or more processes described herein.

In some embodiments, adaptive gain ESC controller 3004 is implemented within a single computer (e.g., one server, one housing, etc.). In various other embodiments adaptive gain ESC controller 3004 can be distributed across multiple servers or computers (e.g., that can exist in distributed locations). Although several controllers are shown and described as separate devices throughout the present disclosure, it should be understood that any or all of these controllers can be combined into a single device or consolidated into a smaller number of devices configured to perform any or all of the functions described with respect to the individual controllers. Similarly, it should be understood that the functions described with respect to these controllers can be distributed across multiple controllers, servers, cloud computing devices, or any other type of computing devices and are not necessarily performed by physical controllers (e.g., field controllers) in a building management system. All of these possibilities are within the scope of the present disclosure.

Referring still to FIG. 29, memory 3010 includes an ESC controller 3012, a derivative estimator 3014, a gradient estimator 3016, a gradient normalizer 3018, and a gain generator 3020, according to some embodiments. In some embodiments, ESC controller 3012 is configured to perform any of the functionality of ESC controller 2920, ESC controller 1850, ESC controller 1002, etc., or any of the other ESC techniques described herein. In some embodiments, ESC controller 3012 is configured to use an adaptive gain parameter as output by gain generator 3020 for the extremum-seeking control to generate the control input $u_k$ for plant 3002. In some embodiments, ESC controller 3012 is configured to perform the relay-based ESC as described in greater detail above with reference to FIGS. 17-20. In some embodiments, ESC controller 3012 is configured to perform the self-perturbing extremum-seeking control as described in greater detail above with reference to FIGS. 8-9, 12A-12B, 13, and 16 (e.g., model-based self-perturbing ESC). If ESC controller 3012 is configured to perform the model-based self-perturbing ESC as described in greater detail above with reference to FIGS. 8-9, 12A-12B, 13, and 16, the adaptive gain parameter $M_k$ may be used in place of the gain k (e.g., at integrator 812). For example, ESC controller 3012 may perform the functionality of system 1600 and receive the adaptive gain parameter $M_k$ at integrator 812. In this way, adaptive gain ESC controller 3004 can perform the adaptive gain parameter functionality for either the relay-based self-perturbing ESC described herein, or for the model-based self-perturbing ESC described herein.

Referring still to FIG. 29, derivative estimator 3014, gradient estimator 3016, gradient normalizer 3018, and gain generator 3020 of adaptive gain ESC controller 3004 are configured to perform the functionality of system 1900 to generate values of the adaptive gain parameter $M_k$. In some embodiments, the adaptive gain parameter at a previous timestep $M_{k-1}$ is used to obtain, calculate, determine, estimate, adjust, etc., the adaptive gain parameter at a current timestep $M_k$.

Derivative estimator 3014 is configured to obtain one or more values of the performance variable J from plant 3002. Derivative estimator 3014 may determine, estimate, calculate, etc., a time derivative $\dot{J}$ of the performance variable J using any of the techniques described herein. For example, derivative estimator 3014 may use a Savitzky-Golay technique, or any other derivative estimation technique to obtain the time derivative $\dot{J}$ of the performance variable J.

Derivative estimator 3014 provides the time derivative $\dot{J}$ of the performance variable J to both gradient estimator 3016 and ESC controller 3012, according to some embodiments. In some embodiments, derivative estimator 3014 is configured to perform the functionality of derivative estimator 1810 as described in greater detail above with reference to FIG. 20. In some embodiments, ESC controller 3012 uses the time derivative $\dot{J}$ of the performance variable J in its respective functions to generate the control input u for plant 3002. Gradient estimator 3016 uses the time derivative $\dot{J}$ of the performance variable J to estimate the gradient G, according to some embodiments. In some embodiments, gradient estimator 3016 also uses a previously determined value of the adaptive gain parameter $M_{k-1}$ to estimate the gradient G. In some embodiments, the gradient G is determined by gradient estimator 3016 using the control input u or using a previous value of the control input u.

Gradient estimator 3016 can be configured to perform the functionality of division block 1910 to determine, estimate, calculate, obtain, the gradient G. For example, the gradient G can be obtained by dividing the derivative $\dot{J}$ of the performance variable J by the previous value of the adaptive gain parameter $M_{k-1}$ or by dividing the gradient G by the previous value of the control input $u_{k-1}$. It should be understood that since adaptive gain ESC controller 3004 may use only the sign of the gradient G, the previous value of the adaptive gain parameter $M_{k-1}$ and the derivative $\dot{J}$ of the performance variable J may be multiplied instead of divided to obtain the gradient G. Likewise, gradient estimator 3016 may be configured to perform any other operation so that the gradient G has a first sign (e.g., a positive sign) if the previous value of the adaptive gain parameter $M_{k-1}$ and the derivative $\dot{J}$ of the performance variable J have the same sign (e.g., both positive or both negative) and a second sign (e.g., a negative sign) if the previous value of the adaptive gain parameter $M_{k-1}$ and the derivative $\dot{J}$ of the performance variable J have different signs (e.g., one has a positive sign and the other has a negative sign). It should be understood that any of the description of gradient estimator 3016 described herein may use the previous control input $u_{k-1}$ in place of the previous value of the adaptive gain parameter $M_{k-1}$.

Gradient estimator 3016 provides the gradient G to gradient normalizer 3018, according to some embodiments. In some embodiments, gradient normalizer 3018 is configured to use a range $J_r$ of the performance variable J (e.g., shown in FIG. 6A) to normalize the gradient G relative to the range $J_r$ of the performance variable J. In some embodiments, gradient normalizer 3018 is configured to divide the gradient G by the range $J_r$ of the performance variable J to obtain a normalized gradient $\tilde{G}$. In some embodiments, gradient normalizer 3018 is configured to perform the functionality of range gain block 1908 as described in greater detail above with reference to FIGS. 19-20.

Gradient normalizer 3018 may output the normalized gradient G to gain generator 3020. In some embodiments, gain generator 3020 is configured to perform any of the functionality of saturation block 1906, summation block 1904, and gain block 1816 as described in greater detail above with reference to FIGS. 19-20 to generate, adjust, calculate, obtain, determine, etc., the adaptive gain parameter $M_k$. In some embodiments, gain generator 3020 is configured to output the adaptive gain parameter $M_k$ to ESC controller 3012 and a previous value of the adaptive gain parameter $M_{k-1}$ to gradient estimator 3016.

In some embodiments, the adaptive gain parameter $M_k$ is a magnitude or an absolute value of a rate of change of the control input $u_k$. For example, as shown in FIG. 20, the rate of change of the control input $$\frac{\Delta u_k}{\Delta t}$$

is equal to the adaptive gain parameter $M_k$ multiplied by the sign $\in_k$. In this way, the adaptive gain parameter $M_k$ defines an amount to increase or decrease (e.g., adjust) the control input u between consecutive steps.

In some embodiments, the adaptive gain parameter $M_k$ changes with respect to changes in the performance variable J or in response to changes in the derivative $\dot{J}$ of the performance variable J. For example, the adaptive gain parameter $M_k$ is proportional to the normalized gradient $\tilde{G}$ multiplied by the gain parameter $M_0$, according to some embodiments. As the performance variable J or the control input u approach an optimal point (e.g., a local minima or a local maxima), the adaptive gain parameter $M_k$ may decrease, thereby decreasing a rate of convergence of ESC controller 3012, but reducing oscillations about the optimal point. Likewise, the adaptive gain parameter $M_k$ may increase with respect to increased distance between the performance variable J or the control input u and the optimal point (e.g., the local minima or the local maxima), thereby resulting in faster convergence (e.g., when the optimization is first initiated).

Relay-Based Self-Perturbing ESC Process

Figure 27:
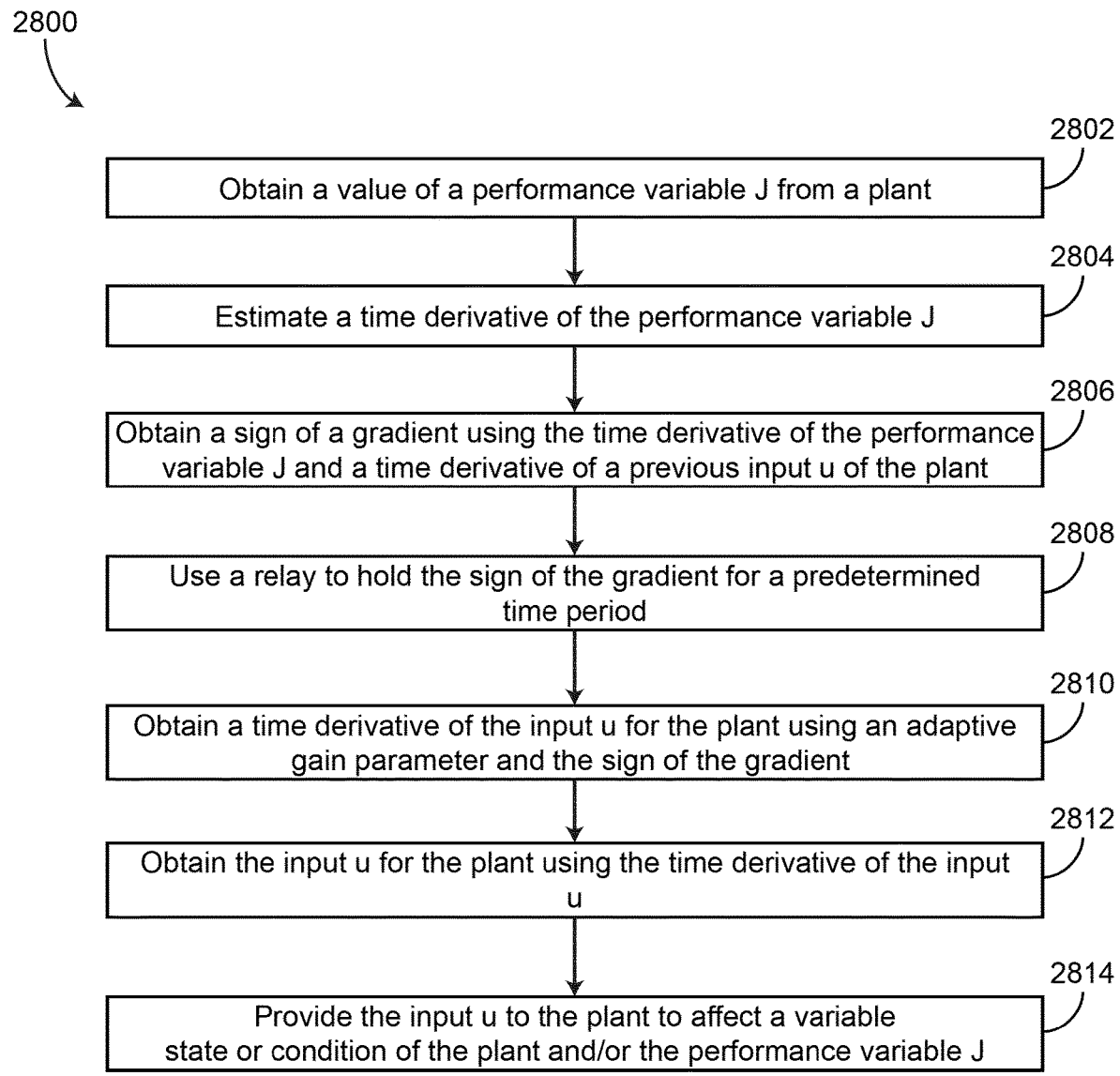
FIG. 27 is a flow diagram of a process for performing self-perturbing extremum-seeking control using a relay, according to some embodiments.

Referring particularly to FIG. 27, a flow diagram of a process 2800 for performing the relay-based self-perturbing extremum-seeking control of FIGS. 17-26. Process 2800 includes steps 2802-2814 and may be performed by ESC controller 1002 or ESC controller 1850, or any other similar controller, processing unit, computer device, thermostat, remote device, etc. In some embodiments, process 2800 or the various steps thereof is performed across multiple devices or are distributed across multiple processing units. Process 2800 may be similar to process 1300, and may include similar steps thereof.

Process 2800 includes obtaining a value of a performance variable J from a plant (step 2802), according to some embodiments. In some embodiments, the performance variable J is a value of an output of the plant such as power consumption, efficiency, coefficient of performance, etc. Step 2802 can include using a sensor measurement to obtain the value of the performance variable J. For example, the value of the performance variable J may be obtained from a sensor at building equipment, from a building management system, etc.

Process 2800 includes estimating a time derivative $\dot{J}$ of the performance variable J (step 2804), according to some embodiments. In some embodiments, the time derivative $\dot{J}$ of the performance variable J is estimated by ESC controller 1002 and/or ESC controller 1850. In some embodiments, the time derivative $\dot{J}$ of the performance variable J is estimated using a Savitzky-Golay method or filter. In some embodiments, the time derivative $\dot{J}$ of the performance variable J is obtained or estimated by derivative estimator 1810.

Process 2800 includes obtaining a sign $\in$ of a gradient G using the time derivative $\dot{J}$ of the performance variable J and a time derivative $\dot{u}$ of a previous control input u of the plant (step 2806), according to some embodiments. In some embodiments, step 2806 includes estimating the gradient G by dividing the derivative $\dot{J}$ performance variable J by the derivative $\dot{u}$ of the control input u. The gradient G may be a rate of change of the performance variable J with respect to changes in the control input u. In some embodiments, the sign $\in$ of the gradient G is obtained by sign block 1822. In some embodiments, the sign $\in$ is a binary value (e.g., +1 or −1) indicating whether the gradient G is increasing or decreasing. Step 2806 may be performed by ESC controller 1850 or by ESC controller 1002.

Process 2800 includes using a relay to hold the sign $\in$ of the gradient G for a predetermined time period (step 2808), according to some embodiments. In some embodiments, the relay is relay 1818 or hold block 1820. Step 2808 can be performed by ESC controller 1850 and/or ESC controller 1002. The sign $\in$ may be held by the relay for a time period $\Delta t$ until a next or subsequent time step.

Process 2800 includes obtaining a time derivative $\dot{u}$ of the control input u for the plant using an adaptive gain parameter $M_k$ and the sign $\in$ of the gradient G (step 2810), according to some embodiments. In some embodiments, the time derivative $\dot{u}$ of the control input u is obtained by multiplying the sign $\in$ by the adaptive gain parameter $M_k$. Step 2810 can be performed by ESC controller 1002 and/or by ESC controller 1850.

Process 2800 includes obtaining the control input u for the plant using the time derivative $\dot{u}$ of the control input u (step 2812), according to some embodiments. In some embodiments, step 2812 includes integrating the time derivative $\dot{u}$ to obtain the control input u. For example, step 2812 may be performed at integrator block 1802 and ZOH block 1804. In some embodiments, step 2812 is performed by ESC controller 1002 and/or ESC controller 1850.

Process 2800 includes providing the control input u to the plant to affect a variable state or condition of the plant and/or the performance variable J (step 2814), according to some embodiments. In some embodiments, step 2814 includes providing the control input u to plant 1806 or includes generating control signals for equipment of the plant.

Advantageously, process 2800 can be performed to provide self-perturbing extremum-seeking control for a plant without requiring an estimation of plant dynamics, and without requiring a model of the plant. Process 2800 utilizes a relay to hold a sign for a predetermined amount of time so that the value(s) of the performance variable J is/are obtained without requiring an artificial dither signal.

In some embodiments, the adaptive gain parameter $M_k$ is obtained by performing an adaptive gain parameter process. The adaptive gain parameter $M_k$ can be obtained by performing the functionality of system 1900. For example, the adaptive gain parameter $M_k$ can be obtained using a range $J_r$ of a performance variable J of the plant. The adaptive gain parameter $M_k$ can be obtained using a current timestep value of an estimate of a time derivative of the performance variable, a previous value of the adaptive gain parameter (e.g., $M_{k-1}$), the range $J_r$, an incremental amount $\delta$, and a non-adaptive gain parameter $M_0$. In some embodiments, the range $J_r$ is a difference between a maximum expected value $J_{max}$ of the performance variable J and a minimum expected value $J_{min}$ of the performance variable J (e.g., $J_r = J_{max} - J_{min}$).

Adaptive Gain Parameter Process

Figure 30:
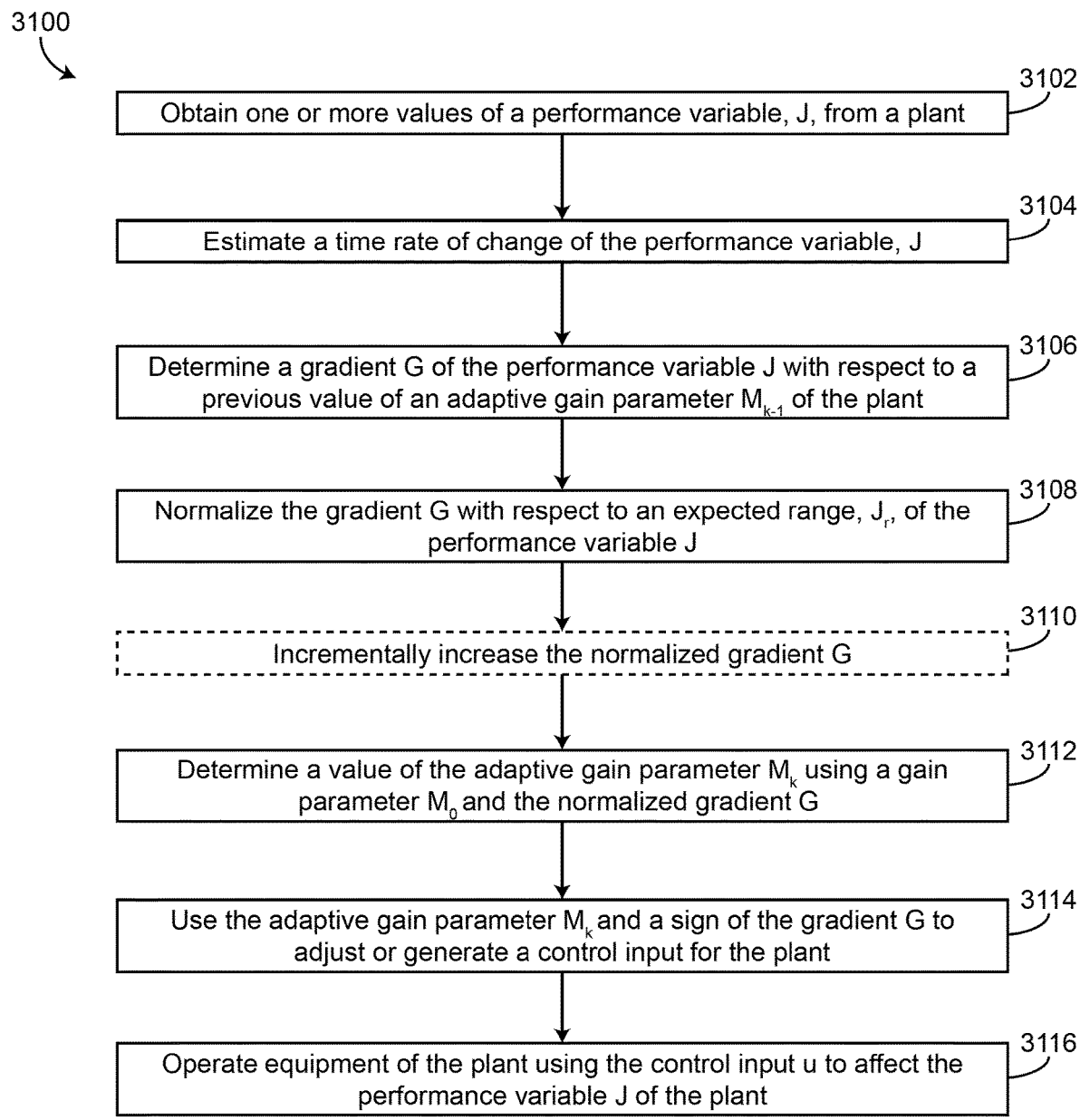
FIG. 30 is a flow diagram of a process for performing adaptive gain extremum seeking control, according to some embodiments.

Referring particularly to FIG. 30, a process 3100 for adaptively adjusting a gain parameter for an extremum-seeking control system is shown, according to some embodiments. Process 3100 include steps 3102-3118 and can be performed by adaptive gain ESC controller 3004, according to some embodiments.

Process 3100 includes obtaining one or more values of a performance variable J from a plant (step 3102), according to some embodiments. In some embodiments, step 3102 is performed by derivative estimator 3014 of memory 3010 of adaptive gain ESC controller 3004. Step 3102 can include obtaining the values of the performance variable J from sensors, equipment, etc., of plant 3002.

Process 3100 includes estimating a time rate of change of the performance variable J (step 3104), according to some embodiments. In some embodiments, the time rate of change of the performance variable J is referred to as $\dot{J}$. The time rate of change of the performance variable J can be obtained by derivative estimator 3014 using any of the analytical techniques described herein.

Process 3100 includes determining a gradient G of the performance variable J with respect to a previous value of an adaptive gain parameter $M_{k-1}$ of the plant (step 3106), according to some embodiments. In some embodiments, step 3106 is performed by gradient estimator 3016 using the previous value of the adaptive gain parameter $M_{k-1}$ and the time rate of change of the performance variable J.

Process 3100 includes normalizing the gradient G with respect to an expected or estimated range $J_r$ of the performance variable J (step 3108), according to some embodiments. In some embodiments, the gradient G is normalized so that the normalized gradient $\tilde{G}$ is a value between 0 and 1. The normalized gradient $\tilde{G}$ may be obtained by dividing the gradient G by the estimated range $J_r$ of the performance variable J. In some embodiments, step 3108 is performed by gradient normalizer 3018.

Process 3100 (optionally) includes incrementally increasing the normalized gradient $\tilde{G}$ (step 3110), according to some embodiments. In some embodiments, step 3110 is performed by gain generator 3020. The normalized gradient $\tilde{G}$ can be incrementally increased to ensure that the ESC step of process 3100 (e.g., step 3114) does not stagnate and maintains some degree of excitation.

Process 3100 includes determining a value (e.g., a current value) of the adaptive gain parameter $M_k$ using a gain parameter $M_0$ and the normalized gradient (step 3112), according to some embodiments. In some embodiments, step 3112 is performed by gain generator 3020 using any of the techniques or functionality as described in greater detail above with reference to FIG. 29. In some embodiments, step 3112 includes multiplying the normalized gradient $\tilde{G}$ by the gain parameter $M_0$.

Process 3100 includes using the adaptive gain parameter $M_k$ and a sign of the gradient G to adjust or generate a control input for the plant (step 3114), according to some embodiments. In some embodiments, step 3114 is performed by ESC controller 3012 using the adaptive gain parameter $M_k$. For example step 3114 can be performed by using the adaptive gain parameter $M_k$ in a relay-based self-perturbing extremum-seeking control system (e.g., as shown in FIG. 20 and described in greater detail above) or in a model-based self-perturbing extremum-seeking control system (e.g., as shown in FIG. 16 and described in greater detail above).

Process 3100 includes operating the equipment of the plant using the control input to affect the performance variable J of the plant (step 3116), according to some embodiments. In some embodiments, step 3116 is performed by providing the control input to equipment of the plant that operate to affect the performance variable J or a measured variable y of the plant.

CONFIGURATION OF EXEMPLARY EMBODIMENTS

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can include RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A self-perturbing extremum-seeking controller for a dynamic plant having at least a static portion and a dynamic portion that provides an input to the static portion, the controller comprising a processing circuit configured to:
    obtain a value of a performance variable characterizing a performance of the plant;
    determine a sign of a gradient of the performance variable with respect to the input to the static portion of the dynamic plant;
    adjust a control input for the dynamic plant using the sign of the gradient; and
    operate equipment of the dynamic plant using the control input to affect the performance variable.

2. The self-perturbing extremum-seeking controller of claim 1, wherein the processing circuit is configured to:
    determine a gradient of the performance variable with respect to time using one or more values of the performance variable;
    estimate a gradient of the output of the dynamic portion of the dynamic plant with respect to time using a model of the dynamic portion of the dynamic plant; and
    determine the gradient of the performance variable with respect to the input to the static portion based on the gradient of the performance variable with respect to time and the gradient of the output of the dynamic portion with respect to time.

3. The self-perturbing extremum-seeking controller of claim 1, wherein the processing circuit is configured to mitigate an effect of the dynamic portion of the dynamic plant on the performance variable by holding the sign of the gradient at a positive state or a negative state until a predetermined amount of time has elapsed since the sign of the gradient last switched between the positive state and the negative state.

4. The self-perturbing extremum-seeking controller of claim 1, wherein the processing circuit is configured to adjust a rate at which the performance variable moves toward a minimum or maximum of the performance variable by applying an adjustable gain parameter to the gradient.

5. The self-perturbing extremum-seeking controller of claim 1, wherein the processing circuit is configured to adjust at least one of a magnitude or frequency of oscillations of the performance by applying an adjustable gain parameter to the gradient.

6. A self-perturbing extremum-seeking controller for a dynamic plant, the controller comprising a processing circuit configured to:
    determine a gradient of a performance variable characterizing a performance of the dynamic plant using one or more values of the performance variable and a time-delayed value of a control input to the dynamic plant, wherein the dynamic plant comprises a static portion and a dynamic portion that provides an input to the static portion;
    apply the gradient of the performance variable as an input to a relay that switches an output of the relay between a positive state and a negative state based on a sign of the gradient;

adjust a control input for the dynamic plant using the output of the relay; and operate equipment of the dynamic plant using the control input to affect the performance variable.

7. The self-perturbing extremum-seeking controller of claim 6, wherein the output of the relay is a discontinuous signal with respect to time that switches between the positive state and the negative state.

8. The self-perturbing extremum-seeking controller of claim 6, wherein the gradient of the performance variable is a time gradient indicating a rate of change of the performance variable with respect to time.

9. The self-perturbing extremum-seeking controller of claim 6, wherein the gradient of the performance variable is a gradient of the performance variable with respect to the control input to the dynamic plant.

10. The self-perturbing extremum-seeking controller of claim 6, wherein:

the processing circuit is configured to mitigate an effect of the dynamic portion of the dynamic plant on the performance variable by holding the output of the relay at the positive state or the negative state until a predetermined amount of time has elapsed since the output of the relay last switched between the positive state and the negative state.

11. The self-perturbing extremum-seeking controller of claim 6, wherein the processing circuit is configured to adjust a rate at which the performance variable moves toward a minimum or maximum of the performance variable by applying an adjustable gain parameter to the output of the relay.

12. The self-perturbing extremum-seeking controller of claim 6, wherein the processing circuit is configured to adjust at least one of a magnitude or frequency of oscillations of the performance variable by applying an adjustable gain parameter to the output of the relay.

13. A method for adaptively perturbing a control input for a dynamic plant comprising a static portion and a dynamic portion that provides an input to the static portion in an extremum-seeking control system, the method comprising:

determining a rate of change of a performance variable that characterizes a performance of the dynamic plant using one or more values of the performance variable;

estimating a gradient of the performance variable with respect to a time-delayed value of a control input to the dynamic plant using the rate of change of the performance variable and an adaptive gain parameter indicating a rate of change of the control input to the dynamic plant;

adjusting the adaptive gain parameter using the gradient of the performance variable with respect to the control input to the dynamic plant;

perturbing the control input to the dynamic plant using the adjusted adaptive gain parameter and a sign of the gradient of the performance variable with respect to the control input to the dynamic plant; and operating equipment of the dynamic plant using the control input to affect the performance variable.

14. The method of claim 13, further comprising normalizing the gradient relative to a range of the performance variable, wherein the normalized gradient is used to adjust the adaptive gain parameter.

15. The method of claim 13, wherein adjusting the adaptive gain parameter comprises reducing a magnitude of the adaptive gain parameter as the performance variable approaches a minima or maxima of the performance variable.

16. The method of claim 13, wherein adjusting the adaptive gain parameter comprises reducing a rate of convergence of the performance variable toward a minima or maxima of the performance variable as the performance variable approaches the minima or maxima and decreases a magnitude of oscillations of the performance variable about the minima or maxima.

17. The method of claim 13, wherein adjusting the adaptive gain parameter comprises calculating a new value of the adaptive gain parameter using a current value of the adaptive gain parameter, the rate of change of the performance variable, and a non-adaptive gain parameter.

18. A self-perturbing extremum-seeking controller for a static plant having at least a static portion, the controller comprising a processing circuit configured to:

obtain a value of a performance variable characterizing a performance of the plant;

determine a sign of a gradient of the performance variable with respect to the input to the static portion of the plant;

adjust a control input for the plant using the sign of the gradient; and operate equipment of the plant to affect the performance variable by providing the control input as the input to the static portion of the plant.

19. The self-perturbing extremum-seeking controller of claim 18, wherein the processing circuit is configured to:

determine a gradient of the performance variable with respect to time using one or more values of the performance variable;

determine a gradient of the control input with respect to time; and determine the gradient of the performance variable with respect to the input to the static portion based on the gradient of the performance variable with respect to time and the gradient of the control input with respect to time.

* * * * *